US011755873B1

(12) United States Patent
Finn

(10) Patent No.: US 11,755,873 B1
(45) Date of Patent: Sep. 12, 2023

(54) RFID ENABLED METAL TRANSACTION CARDS

(71) Applicant: Federal Card Services, LLC, Cincinnati, OH (US)

(72) Inventor: David Finn, Füssen Weissensee (DE)

(73) Assignee: Federal Card Services, LLC, Cincinnati, OH (US)

(*) Notice: Subject to any disclaimer, the term of this patent is extended or adjusted under 35 U.S.C. 154(b) by 12 days.

(21) Appl. No.: 17/671,584

(22) Filed: Feb. 14, 2022

Related U.S. Application Data

(63) Continuation-in-part of application No. 17/147,488, filed on Jan. 13, 2021, now Pat. No. 11,250,305.

(60) Provisional application No. 63/040,544, filed on Jun. 18, 2020, provisional application No. 62/971,927, filed on Feb. 8, 2020, provisional application No. 62/969,034, filed on Feb. 1, 2020.

(51) Int. Cl.
*G06K 19/077* (2006.01)
*G06K 19/07* (2006.01)

(52) U.S. Cl.
CPC ... *G06K 19/07728* (2013.01); *G06K 19/0723* (2013.01); *G06K 19/07773* (2013.01)

(58) Field of Classification Search
CPC ............ G06K 19/07728; G06K 19/06; G06K 19/07773; G06K 19/00; G06K 19/04; G06K 19/0723; G06K 19/08
USPC .......................... 235/493, 492, 380, 487, 375
See application file for complete search history.

(56) References Cited

FOREIGN PATENT DOCUMENTS

WO  WO-2018034449 A1 *  2/2018  ............ B42D 25/22

* cited by examiner

*Primary Examiner* — Edwyn Labaze
(74) *Attorney, Agent, or Firm* — Michael D. Eisenberg

(57) ABSTRACT

Metal containing transaction cards or smartcards (SC) having a slit (S) formed in a metal layer (ML) or metal card body (MCB) which extends from a perimeter edge of the card body to a transponder chip module (TCM), wherein the path of the slit (S) extends to an area underneath a module antenna (MA) of the TCM. The slit (S) does not reach a module opening (MO) for the transponder chip module (TCM). The slit enters the area of the module antenna (MA) overlapping its windings or tracks and follows the form and path of the module antenna (MA). In some embodiments, the module opening (MO) may be omitted. The shape of the module opening (MO) may be other than rectangular, and it may have at least two parallel sides.

20 Claims, 11 Drawing Sheets

E113v3

A (10:1)

A (10:1)

B (10:1)

B (10:1)

FIG. 4A  FIG. 4B
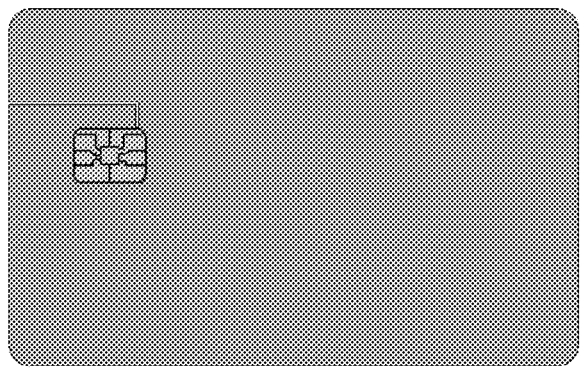 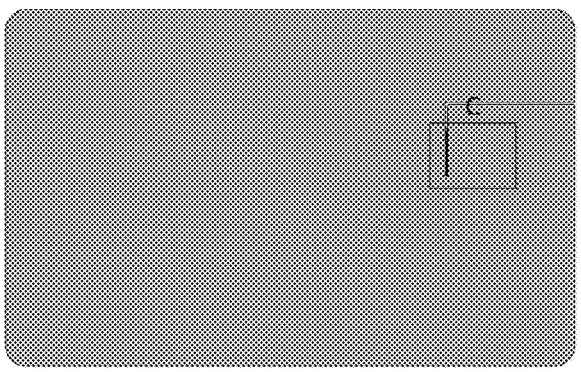
FIG. 4C  FIG. 4D
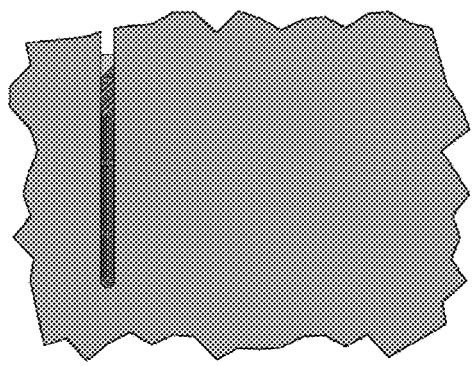 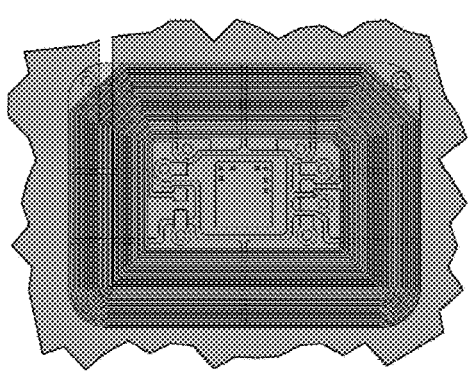
C (10:1)   C (10:1)
FIG. 4E
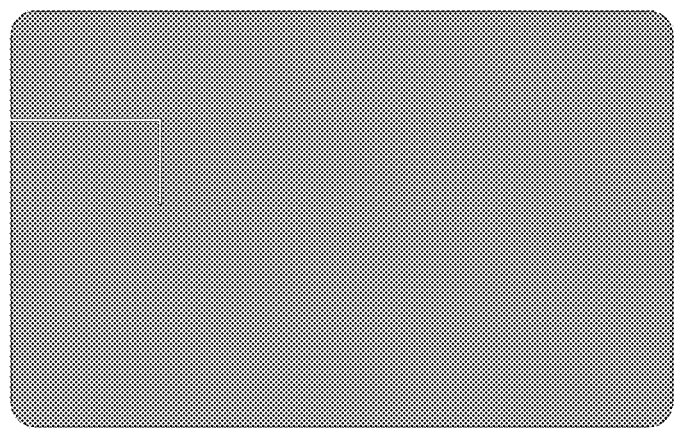

D (10:1)

D (10:1)

RFID ENABLED METAL TRANSACTION CARDS

CROSS-REFERENCES TO RELATED APPLICATIONS

The present application is a continuation-in-part of Ser. No. 17/147,488 filed 13 Jan. 2021, and Ser. No. 17/147,488 claims the benefit of 63/040,544 filed 18 Jun. 2020, and Ser. No. 17/147,488 claims the benefit of 62/971,927 filed 8 Feb. 2020, and Ser. No. 17/147,488 claims the benefit of 62/969,034 filed 1 Feb. 2020, all of which are incorporated by reference in their entirety herein.

TECHNICAL FIELD

The disclosure may relate broadly to passive RFID enabled metal transaction cards including "metal smartcards" such as encapsulated metal smartcards (aka encased metal cards), metal core smartcards (aka embedded metal or metal veneer smartcards—plastic front, edge to edge metal core, plastic back), metal face smartcards (aka metal hybrid cards—metal front, plastic back), full metal smartcards, and biometric metal smartcards, having an RFID chip (IC) capable of operating in a "contactless" mode (ISO 14443 or NFC/ISO 15693), including dual interface (DI) metal smartcards and metal payment objects (or "metal payment devices") which can also operate in "contact" mode (ISO 7816-2). Some of the disclosure(s) herein may relate to metal smartcards having only a contactless interface.

The disclosure(s) herein may further relate to biometric transaction cards and smartcards with a dynamic display.

BACKGROUND

A transponder chip module (TCM) or an inductive coupling chip module (ICM), which may be incorporated into a smartcard (SC), may comprise an array of typically 6 or 8 contact pads (CPs) for interfacing with an external reader (e.g., ISO 7816). One or more connection bridges (CBRs) in the transponder chip module (TCM) may be used for making interconnections between components within the transponder chip module (TCM). The contact pads (CPs) and connection bridges (CBRs) may be formed from a common conductive layer on the front (face-up) surface of the transponder chip module (TCM). Other isolated features may be formed from the conductive layer, such as decorative strips or areas where logos may be presented. The transponder chip module (TCM) may have both contact (ISO 7816) and contactless (ISO 14443, 15693) interfaces.

According to the prior art, contact pads (CP), connection bridges (CBR) and/or isolated metal features formed on the face-up side (contact side) of a double-sided chip carrier tape residing directly over an etched antenna structure on the face-down side, can be used to increase the amplitude of the resonance curve of the transponder chip module with minimal frequency shift when interrogated by a reader, and without the need to perforate or remove metal for enhanced activation distance. The enhanced performance of the transponder chip module (TCM) by maintaining a metal contact pad arrangement on the face-up side, similar to an arrangement on a standard contact smartcard module, may result in an activation distance with an etched antenna structure of approximately 2 cm.

To further boost the performance of a transponder chip module (TCM) in terms of activation distance with an arrangement of contact pads, connection bridges or isolated metal features on its face-up side and a chemical or laser-etched antenna structure connected to an RFID chip (IC) on its face-down side, a coupling frame (CF) comprising a metal layer (ML) or metal card body (MCB) with a discontinuity needs to inductively overlap a portion of the antenna structure (ideally 50%).

Some Patents and Publications of Interest

The following patents and/or publications ("references") may be of interest or relevant to the invention(s) disclosed herein, and some commentary may be provided to distinguish the invention(s) disclosed herein from the following references.

U.S. Pat. No. 10,193,211 (29 Jan. 2019; Féinics AmaTech Teoranta; Finn et al.) discloses Smartcards, RFID devices, wearables and methods. Coupling frames comprising a conductive (metal) surface with a slit (S) or non-conductive stripe (NCS) extending from an outer edge to an inner position thereof, and overlapping a transponder device. A coupling frame with slit for coupling with an inductive or capacitive device (inductor or capacitor) may be used at any ISM frequency band to concentrate surface current around the slit. The coupling frame can be tuned to operate at a frequency of interested by introducing a resistive, inductive or capacitive element. The resonance frequency of the coupling frame can be matched to that of the transponder chip module to achieve optimum performance. Coupling frames with or without a transponder device may be integrated, overlapping, stacked or placed adjacent to one another to enhance system performance. Multiple coupling frames may be electrically isolated from one another by the application of a dielectric coating such Diamond like Carbon (DLC).

FIG. 12 of U.S. Pat. No. 10,193,211 shows a diagram (plan view) of a coupling frame (CF) and module antenna (MA) of a transponder chip module (TCM) having an elongated form factor. FIG. 12 shows a coupling frame (CF) 1220 superposed over a module antenna (MA) 1212 of a transponder chip module (TCM) 1210. The overlap of the slit (S) 1230 of the coupling frame with at least a portion of the module antenna is very clearly illustrated and demonstrated in this figure.

In this example, the module antenna MA may have an elongated form factor (much longer than it is high), having an overall height of approximately 5 mm and an overall length of approximately 20 mm. An overall area covered by the antenna (including no-man's land) may be 5 mm times 20 mm=100 mm². The RFID chip (IC) is omitted from the view, for illustrative clarity.

The interior area (no-man's land) of the module antenna MA may be elongated,—i.e. narrow (5-8 mm) and long (20-25 mm). The slit (S) of the coupling frame (CF) is shown extending over one set of traces (for example, 10-16 traces) of the module antenna (on the left side thereof, as viewed), and into the no-man's land, covering substantially the entire area of the no-man's land. The slit (S) may be wide enough to also cover some inner traces on the top and bottom (as viewed) of the module antenna (MA). In other words, in the central area of the module antenna, the slit may be slightly larger than the non-man's land. The slit in the coupling frame may extend completely over the traces on one side (left, as viewed) of the module antenna, then continue into and across the non-man's land, and may overlap the innermost trace of each of the sets of traces on the other three sides (top, bottom and right, as viewed) of the module antenna. The slit (S) may extend along the center of the module antenna, extending from one edge of the module antenna (bottom) to an inner track on the opposite side (top). The module antenna may have 10 to 16 laser-etched conductive lines.

The coupling frame CF may be larger than the module antenna MA, for example having a length of at least approximately 30 mm and a height of at least approximately 20 mm. An overall area covered by the coupling frame may be 30 mm×20 mm=600 mm². The coupling frame may be at least twice as large (in overall area) as the module antenna, including at least three times as large, at least five times as large, and at least ten times as large as the module antenna.

As illustrated, the slit S of the coupling frame extends across the first set of antenna traces on the left (as viewed) side of the module antenna, continuing through the central area (no-man's land) of the module antenna which has no traces to the set of traces on the opposite, right (as viewed) side of the module antenna. The end of the slit may overlap one or more of the innermost traces of the set of traces on the right side of the module antenna.

The slit (S) may have a width corresponding to the vertical (as viewed in the figure) interior width of the antenna (the height of non-man's land), or the distance between the innermost trace of the top (as viewed) set of traces and the innermost trace of the bottom (as viewed) set of traces. In other words, the slit may cover at least a substantial portion of the entire central area of the antenna, including at least 50%, at least 60%, at least 90%, and at least 100% (the slit may be larger than the no-man's land) thereof. The slit may extend (to the right) past the central area devoid of traces (no man's land) further across some or all of the traces on the right side of the antenna.

For optimum performance, the slit (S) in the coupling frame may need to overlap or run adjacent to the inner traces of the module antenna (MA). In this case the slit (S) would traverse over one set of traces of the module antenna (MA) and run parallel to two sides of the module antenna (MA). This can be accomplished by widening the slit or by narrowing the height of the void central area of the antenna. FIG. 12 shows the slit running along or adjacent the inner tracks of the module antenna.

U.S. Pat. No. 9,836,684 (5 Dec. 2017; Féinics AmaTech Teoranta; Finn et al.) discloses smart cards, payment objects and methods. Smartcards having (i) a metal card body (MCB) with a slit (S) overlapping a module antenna (MA) of a chip module (TCM) or (ii) multiple metal layers (M1, M2, M3) each having a slit (S1, S2, S3) offset or oriented differently than each other. A front metal layer may be continuous (no slit), and may be shielded from underlying metal layers by a shielding layer (SL). Metal backing inserts (MBI) reinforcing the slit(s) may also have a slit (S2) overlapping the module antenna. Diamond-like-coating may fill the slit. Key fobs similarly fabricated. Plastic-Metal-Plastic smart cards and methods of manufacture are disclosed. Such cards may be contactless only, contact only, or may be dual-interface (contact and contactless) cards.

In order to prevent electrical shorting of the slit, the coupling frame may be coated in a non-conductive material. This coating may also cover the exposed surfaces of the slit and thereby prevent electrical shorting by materials or fluids that may ingress into the slit. For example a diamond-like-carbon (DLC) coating that is electrically insulating may be applied to a thickness in the range 1-10 micron as a decorative surface finish. The applied coating may also be selected/designed to reduce the overall width of the slit. For example a slit of 25 micron width with overall 4 micron DLC coating may be reduced in width to approximately 17 micron after coating.

The slit may be filled with a dielectric oxide. The slit may be hidden (or disguised) with a DLC (diamond-like carbon) coating. For example, a slit of 30 microns or less (i.e. width of the laser beam) may be coated with DLC having a thickness of 6 microns. The width of the slit may then be reduced in size by at least 12 microns. So, in essence, the slit resulting may be only 18 microns wide or less. However, DLC provides a gloss finish. To further conceal the slit, the metal layer or card body (such as titanium) may be sand blasted (or glass bead) blasted, such as before DLC or PVD (plasma vapor deposition) coating, and the finish will may turn out to be matte (not glossy) so that the slit is nearly impossible to see.

Alternatively, a pattern of lines may be provided, such as by burnishing the front of the card, to "camouflage" the slit.

FIG. 18A of U.S. Pat. No. 9,836,684 shows that a subsequent pulsed vapor deposition (PVD) of diamond-like carbon (DLC) coating 1832 may be applied to the card body as a decorative or protective layer. By tuning the thickness of the applied coating, the width of the slit and its appearance may be concealed further. For example, application of a 6 μm DLC coating to a metal card bearing a slit of 25 μm width may result in apparent slit widths of approximately 44 μm on one side and 12-13 μm on the other side, after coating.

FIG. 19A of U.S. Pat. No. 9,836,684 is a diagrammatic view (perspective exploded) of a solid metal card (RFID device) 1900A, generally comprising: an 8 pin transponder chip module (TCM) 1910 (The module does not form part of the card body per se, rather it is disposed in the card body) a metal card body (MCB) 1920 which may have an overall thickness of approximately 800 μm. A slit (S1) 1930 is shown extending from the left edge of the card to an opening (MO) 1908 for the transponder chip module (TCM). The metal card body (MCB) may comprise titanium. The metal card body may be milled out, or thinned, from the back of the card, so that an area ("slit area") to the left of the module opening and including the slit S1 is recessed and may have a thickness of only approximately 400 μm. The titanium card body may be DLC black coated after milling. a metal backing insert (MBI) 1950 or plate which may have a thickness of approximately 360 μm and corresponding in size to the milled area (recess) on the back of the card body. The MBI spans the slit (S1) and reinforces the card at the slit area. The metal backing insert (MBI) may comprise titanium, and may be DLC black coated. A layer of adhesive 1932 which may have a thickness of approximately 20 μm may secure the metal backing insert (MBI) into the milled recess in the slit area. A module cover (MC) 1916 which may comprise a non-conductive material such as ceramic having a thickness of approximately 200 μm may be inserted into the module opening in the back of the card body and may be secured (retained) therein by a layer of adhesive 1934 which may have a thickness of approximately 20 μm. The module cover may be metal, but this is not recommended.

FIG. 19B of U.S. Pat. No. 9,836,684 is a diagrammatic view (perspective exploded) of a solid metal card (RFID device) 1900B which may share some features and elements with the metal card 1900A. More particularly, the metal card 1900B may generally comprise: an 8 pin transponder chip module (TCM) 1910. (The module does not form part of the card body per se, rather it is disposed in the card body) a metal card body (MCB) 1920 which may have an overall thickness of approximately 800 μm. A slit (S1) 1930 is shown extending from the left edge of the card to an opening (MO) 1908 for the transponder chip module (TCM). The metal card body (MCB) may comprise titanium. The metal card body may be milled out, or thinned, from the back of the card, so that an area ("slit area") to the left of the module opening and including the slit S1 is recessed and may have a thickness of only approximately 400 µm. The titanium card body may be DLC black coated after milling. The MCB may be formed as two metal layers, such as 400 µm thick each. A top one of the metal layers may have a slit (S) in a slit area. A bottom one of the layers may be cut-out in the area of the silt in the top layer to accept a metal backing insert (MBI), such as described herein-below. In this embodiment, the back of the card may be further milled so that the thinned area surrounding the slit (S1) may extend further to the area of the transponder chip module (TCM), including surrounding the module opening. The thinned area on the back side of the card may be referred to as a "recessed area". a metal backing insert (MBI) 1950 or plate which may have a thickness of approximately 360 µm and corresponding in size to the milled area (recess) on the back of the card body. The metal backing insert (MBI) may comprise tungsten or steel, and may be DLC black coated. A layer of adhesive 1932 which may have a thickness of approximately 20 µm may secure the metal backing insert (MBI) into the milled recess in the slit area. The MBI spans the slit (S1) and reinforces the card at the slit area. In this embodiment, the metal backing insert (MBI) is larger than the MBI of the FIG. 19A embodiment, and covers not only the slit area but also the transponder area. The MBI may be provided with a module opening (MO) 1958, and may be provided with a slit (S2) 1952 extending from an edge of the MBI to the module opening. The slit S2 is shown extending to the right of the module opening MO, but it could as well extend upward or downward, but preferably not to the left. Note that the MBI is oriented in the card so that the slit (S2) does not extend to an edge of the card body, rather it is located in a central area of the card body. A module cover (MC) 1916 which may comprise ceramic having a thickness of approximately 200 µm may be inserted into the module opening in the back of the card body and may be secured (retained) therein by a layer of adhesive 1936 which may have a thickness of approximately 20 µm.

This embodiment may provide the best mechanical stability at the area of the slit S1, resisting flexing of the card. The metal backing insert (MBI) spans the slit S1, and may be approximately half the thickness of the overall card.

The metal card body may comprise two layers, each approximately 400 µm. A top layer may have the slit (S1) and the bottom layer may have an open area (corresponding to the aforementioned milled-out area) for accepting the metal backing insert (MBI).

The slit (S2) in the metal backing layer MBI is shown extending to the right, opposite from the slit (S1), but it may extend up or down, preferably not to the left, in other words, in any direction other than the slit (S1).

FIG. 19C is a diagrammatic view (perspective exploded) of a solid metal card (RFID device) 1900C, generally comprising: an 8 pin transponder chip module (TCM) 1910 (The module does not form part of the card body per se, rather it is disposed in the card body) a metal card body (MCB) 1920 which may have an overall thickness of approximately 800 µm. A slit (S1) 1930 is shown extending from the left edge of the card to an opening (MO) 1908 for the transponder chip module (TCM). The metal card body (MCB) may comprise titanium. The metal card body may be milled out, or thinned, from the back of the card, so that an area ("slit area") to the left of the module opening and including the slit S1 is recessed and may have a thickness of only approximately 400 µm. The titanium card body may be DLC black coated after milling. In this embodiment, the back of the card may be further milled so that the thinned area surrounding the slit (S1) may extend further to the area of the transponder chip module (TCM), including surrounding the module opening. The thinned area on the back side of the card may be referred to as a "recessed area". a metal backing insert (MBI) 1950 or plate which may have a thickness of approximately 360 µm and corresponding in size to the milled area (recess) on the back of the card body. The metal backing insert (MBI) may comprise tungsten or steel, and may be DLC black coated. A layer of adhesive 1932 which may have a thickness of approximately 20 µm may secure the metal backing insert (MBI) into the milled recess in the slit area. The MBI spans the slit (S1) and reinforces the card at the slit area. The slit S2 in the MBI is shown extending in the opposite direction from the slit S1, in the manner of the MBI in FIG. 19B, but does not have an opening.

In this embodiment, the metal backing insert (MBI) is larger than the MBI of the FIG. 22A embodiment, and covers not only the slit area but also the transponder area. In this embodiment, the MBI may be provided without a module opening, and may be provided with a slit (S2) 1952 extending from an edge of the MBI to a position at the interior of the MBI so that the slit is under a portion of (and overlaps) the module antenna. Note that the MBI is oriented in the card so that the slit (S2) extends to an edge of the card body. In this embodiment, a separate module cover (MC) is not needed since the MBI covers the module opening in the card.

US 2018/0341846 (29 Nov. 2018; Féinics AmaTech Teoranta; Finn et al.) discloses contactless metal card constructions. A metal smartcard (SC) having a transponder chip module (TCM) with a module antenna (MA), and a card body (CB) comprising two discontinuous metal layers (ML), each layer having a slit (S) overlapping the module antenna, the slits being oriented differently than one another. One metal layer can be a front card body (FCB, CH), and the other layer may be a rear card body (RCB, CF2) having a magnetic stripe (MS) and a signature panel (SP).

FIG. 4A of US 2018/0341846 is a diagram (perspective view) illustrating an assembly of a metal smart card composed primarily of two coupling frames (CF) with slits (S) featuring an insert to conceal the module openings (MO).

FIG. 4B of US 2018/0341846 is a diagram (rear view) illustrating the shape and features of the rear card body (RCB) featuring a module opening (MO), slit (S) and recesses to accommodate a magnetic stripe (MS) and signature panel (SP).

FIG. 4A is an exploded view of a solid metal smartcard comprising two metal layers (ML) attached together (joined with one another) by an adhesive film (AF) 405. The front card body (FCB) 402 composed of a metal layer (ML) contains a first module opening (MO1) 403 that accepts a specially designed transponder chip module (TCM) 401. The front card body (FCB) 402 may have thickness 760 µm to 800 µm. The rear card body (RCB) 408 fits into a pocket milled, etched, stamped or otherwise formed in the rear side of the front card body (FCB) 402. The front card body (FCB) 402 comprises a first slit (S1) 404 that allows the front card body (FCB) 402 to perform as a coupling frame (CF). The module antenna on the transponder chip module (TCM) 401 may have suitable overlap with the front card body (FCB) 402 to allow optimum performance of the device when operating in contactless communication with an external reader.

An insert 406 made of plastic or other suitable non-conductive material may be disposed behind the first module opening (MO1) 403 in the front card body (FCB) 402 and may be milled or otherwise shaped to accommodate the volume occupied by the chip IC and encapsulation from the transponder chip module (TCM) 401. An insert adhesive 407 in film or liquid form may be provided to bond the insert 406 to the card. The rear card body (RCB) 408 is composed of a metal layer (ML), featuring a second module opening (MO2) 412 and a second slit (S2) 409; it behaves as a coupling frame (CF). The rear card body (RCB) 402 may have thickness 300 µm to 400 µm. The insert 406 may be composed of multiple parts and may contain a tuning circuit with antenna windings and/or capacitors to influence the resonant characteristics of the smartcard.

FIG. 4B shows the outer face of the rear card body (RCB) 408 panel. The second slit (S2) 409 is shown in this example as commencing from an internal edge of the panel with respect to the overall perimeter of the assembled card. It is noted that a small gap is provided between the internal edges of the rear card body (RCB) 408 and the front card body (FCB) 402 in order to prevent electrical short circuiting of the second slit (S2) 409, this gap may be of the order of 10 µm to 50 µm. The rear card body (RCB) 408 also features two recesses that may be formed by any appropriate technique including laser ablation, chemical etching or milling. One recess may be used to accommodate a magnetic stripe, i.e. the magnetic stripe recess (MSR) 414. A second recess for a signature panel, i.e. signature panel recess (SPR) 413, may also be provided. These recesses may enable these features to sit flush with the card surface. The recesses may be, alternatively, simply textured regions to assist alignment and adhesion of the appropriate features.

Either one or both of the front card body (FCB) 402 and the rear card body (408) may be coated in a dielectric material. For example, the coating may be a hard wearing decorative black diamond-like-carbon (DLC) with characteristics of very high electrical resistivity. This may be achieved by control of the ratio of conductive carbon (e.g. graphitic $sp^2$ hybridized and amorphous carbon) to insulating carbon (e.g. diamond type $sp^3$ hybridized carbon). Alternative coatings may be considered and may be transparent or other color, this also includes the use of paints and lacquers or layers of coatings to achieve a desired finish. The coating(s) may be applied to any or all of the surfaces or edges of either of the front card body (FCB) 402 or rear card body (RCB) 408 in order to provide the necessary electrical isolation between the two panels and enable each to perform as a coupling frame (CF). The use of a dielectric or high resistivity coating in this manner enables the slit (S2) 409 to commence from an internal part of the overall card structure and extend towards the second module opening (MO2) 412. This is significant as this configuration can allow strengthening of the assembled card by offsetting the positions of the two slits (S1, 404; S2, 409), in this particular example allowing them to run perpendicular to one another, thereby stabilizing the card in the region of the module openings (MO1, 403; MO2, 412).

Either one or both of the front card body (FCB) 402 and the rear card body (RCB) 408 may be electrically connected, across their respective slits (S1, S2) or other locations to a device or circuit assembly in order to power a circuit or to improve the read/write performance of the smartcard with respect to a reader antenna. The additional circuit or device may be housed in a layer independent of the FCB and RCB and may, for example, reside between them, interacting with the induced eddy currents in each of the coupling frames (CF1, CF2).

The slits (S1, 404; S2, 409) may be made discrete and less visible by cutting them to a narrow width (e.g. 10 µm, 20 µm, 50 µm to 150 µm), this may be achieved by laser cutting for example. In addition, the apparent width of the slits (S1, 404; S2, 409) may be reduced by the thickness of coating applied to front or rear card bodies (FCB 402, RCB 408). For example for a diamond-like-carbon (DLC) coating each edge of the slits (S1, 404; S2, 409) may have a coating thickness of 5 microns thereby reducing the apparent slit width by 10 microns. Alternative coating types or use of multiple coating layers may have allow a greater reduction in apparent slit width.

Some Additional References

U.S. Pat. No. 6,452,563 (17 Sep. 2002; Gemplus aka Gemalto; Porte) incorporated by reference herein, discloses an antenna arrangement in a metallic environment which concerns an arrangement for an antenna (A) having the general shape of a loop, directly in the proximity of at least a metallic element (10). It is characterized in that each metallic element (10) comprises an orifice (18) arranged substantially opposite the surface defined by the antenna (A), and a slot (16) forming a gap width, arranged through the thickness of the metallic element (10), between the internal edge (21) delimiting the orifice (18) and the external edge (20) of said metallic element (10). It is applicable to scanners and radio frequency communication devices.

US 2011/0181486 (28 Jul. 2011; Kato; Murata) incorporated by reference herein, discloses a wireless IC device having a resonant frequency that is hardly altered or affected by external influences and reliably communicates with a reader/writer. The wireless IC device includes a wireless IC chip arranged to process a radio signal, a feeder circuit board coupled to the wireless IC chip and including a feeder circuit, and a radiation electrode arranged at least one principal surface of the feeder circuit board.

The feeder circuit board includes a magnetic material and has the feeder circuit disposed therein. The radiation electrode is disposed on at least one principal surface of the feeder circuit board so as to be electromagnetically coupled to the feeder circuit and includes at least two open ends. The wireless IC chip is coupled to the radiation electrode through the feeder circuit and communicates with a reader/writer using HF band frequency.

(Abstract) A wireless IC chip 5 is disposed on one (upper) side of a feeder circuit board 10 . . . . A radiation electrode 30 is disposed on a lower surface of the feeder circuit board 10 to be electromagnetically coupled to the feeder circuit 20 and has two adjacent open ends 30*a* and 30*b*.

Kato discloses a board with a chip, and various radiation electrodes. However, it should be noted that the board is not a smartcard. It does not have a card body; it does not have a transponder chip module with an RFID chip and an antenna. It does not have contact pads.

US 2012/0112971 (10 May 2012; Takeyama et al.; Panasonic) incorporated by reference herein, discloses an antenna unit and portable wireless device equipped with the same, wherein it is an object to provide an antenna unit capable of operating in response to a plurality of types of counterpart equipment that operate at different resonance frequencies while enhancing its passing characteristic, as well as providing a portable wireless device equipped with the antenna unit. An antenna unit that performs wireless communication originating from induction coupling includes a loop antenna coiled by a conductor in a planar shape; and a metallic plate that is positioned while displaced from the loop antenna in one direction and that partially encloses a circumference of the loop antenna when viewed from the direction, wherein each of ends of the metallic plate overlaps a portion of the loop antenna when viewed from the direction.

US 2013/0126622 (23 May 2013; Finn) incorporated by reference herein, discloses offsetting shielding and enhancing coupling in metallized smartcards. As disclosed therein (FIG. 4A), a conductive "compensation loop" CL may be disposed behind the booster antenna BA, extending around the periphery of the card body CB. The compensation loop CL may be an open loop having two free ends, and a gap ("gap") there-between. The compensation loop CL may be made of copper cladding.

It may be noted that the compensation loop (CL) of Finn is disposed below a booster antenna, and is sized accordingly. Typically, when a coupling frame (CF) is being used, there is no booster antenna. Moreover, the compensation loop (CL) does not overlap the antenna (MA) in the transponder chip module (TCM).

EP 2372840 (25 Sep. 2013; Hashimoto; Panasonic) discloses antenna portable terminal using the same. This is an antenna portable terminal based on a cell phone, not a smartcard. It describes problems associated with a loop antenna used in a portable terminal, like a portable phone and a smart phone, in order to read information from a non-contact IC card and an IC tag and exchange information with a reader/writer. A metallic body 7 has a slit 17 that overlaps an antenna pattern 3 (FIGS. 8, 9).

Panasonic does not disclose a smartcard. The antenna 3 is on a board 2, but there is no RFID chip on the board 2. There is no transponder chip module (TCM).

Moreover, in Panasonic, a magnetic sheet 4 appears to be critical. The magnetic sheet 4 is intended for lessening influence which arises when the metallic body is placed on the magnetic sheet 4. It is desirable that the magnetic sheet 4 shall completely cover the antenna pattern 3.

Claim 1 describes an antenna comprising: a loop antenna (1), comprising a loop antenna pattern (3) laid on an antenna substrate (2) that exhibits an insulation property, and having an aperture; a metallic body (7) that opposes the loop antenna and that is electrically insulated from the loop antenna; a notch (8) that is provided in the metallic body and that is coupled with a periphery of the metallic body, and a magnetic sheet (4) placed on the loop antenna pattern; wherein at least a portion of the loop antenna opposes the metallic body, and at least a portion of the notch is covered with the aperture; and the metallic body, the antenna substrate, the antenna pattern and magnetic sheet are stacked in sequence.

It should be noted that, according to some embodiments of the invention(s) disclosed herein, when using a coupling frame (CF), a magnetic sheet 4 is not required.

U.S. Pat. No. 8,608,082 (17 Dec. 2013; La Garrec et al.; Oberthur Technologies, aka IDEMIA) discloses microcircuit device including means for amplifying the gain of an antenna. An electronic device (10) comprising a microcircuit (18) module (20), a near-field communication antenna (36) electrically connected to the microcircuit (18) of the module (20), delimiting an antenna surface (S), and a body (12) incorporating the module (20). More precisely, the antenna (36) is arranged within the module (20) and the body (12) incorporates means (40) of amplifying the gain of the antenna (36) comprising an electrically conductive element (42) electrically isolated from the microcircuit (18) and the antenna (36), of an annular general shape arranged around an area (R) of the body (12) forming a volume generated by the projection of the antenna surface (S) along a direction (Z) substantially orthogonal to the surface (S).

IDEMIA's electrically conductive element (42) is analogous to a coupling frame (CF), and IDEMIA's antenna (36) corresponds to a module antenna (MA). However, it should be noted that IDEMIA's electrically conductive element (42) does not overlap the antenna. Rather, IDEMIA goes to great lengths to clarify that there is NO overlap. For example, IDEMIA states that [the] element 42 has . . . an annular general shape and is arranged so as to surround a region R of the body 12 constituting a volume generated by the projection of the antenna surface along a direction substantially orthogonal to the antenna surface S. O IDEMIA states that the metal layer can be the size of the card. IDEMIA does not talk about a metal card body.

IDEMIA's metal layer does not overlap the antenna structure of the transponder, nor does it consider such an overlap as being an enhancing factor: "In conformity with an embodiment of the invention, the element extends around the antenna outside of an area defined by the projection of the antenna along a direction substantially orthogonal to the antenna surface. Thus, the antenna and the ring must not extend facing one another so as not to mask the magnetic field flux through the antenna surface. In other words, the element extends outside the outer perimeter of the antenna in a plane parallel to that containing the antenna or part of the antenna, or possibly in the same plane. However, when the element extends within the same plane as the antenna or part of the antenna, a minimum spacing is provided between the element and the antenna to ensure electrical isolation."

U.S. Pat. No. 9,024,763 (5 May 2015; Hamedani Soheil) discloses arrangement comprising an object made at least partially of metal or precious metal and an RFID identification device. An arrangement including an object made at least partially of metal and/or precious metal and an RFID system, wherein the object and the RFID system are connected to one another in such a way that the transponder and the aerial of the RFID system are applied on a site of the object, on its surface, which is facing or can be caused to face an assigned reading device or are embedded into its surface in the form of an inlay, and means are provided which shield or attenuate the electrically conductive surface of the object against eddy currents induced in the conductor loop. Furthermore, the invention relates to a method for tracking and position-fixing objects of all kinds, which are made at least partially of metal and/or precious metal or are plated therewith, and into which a position-fixing device operating according to RFID technology is integrated. A transponder and, spaced apart from the latter, an aerial coupled with a reading device are disposed in or on the object at an application-specific conductive site and the transponder is shielded with respect to the conductive surface.

U.S. Pat. No. 9,390,366 (12 Jul. 2016; CompoSecure; Herslow et al.) incorporated by reference herein, discloses a metal smart card with dual interface capability. A dual interface smart card having a metal layer includes an IC module, with contacts and RF capability, mounted on a plug, formed of non-RF impeding material, between the top and bottom surfaces of the metal layer. The plug provides support for the IC module and a degree of electrical insulation and isolation from the metal layer. The resultant card can have contact and contactless operating capability and an entirely smooth external metal surface except for the contacts of the IC module.

U.S. Pat. No. 9,564,678 (7 Feb. 2017; Murata Manufacturing; Kato et al.) discloses antenna device and method of setting resonant frequency of antenna device. An antenna device in that a coil conductor of an antenna coil module and a conductor layer at least partially overlap. A current flows in the conductor layer to block a magnetic field generated by a current flowing in the coil conductor. A current flows along the periphery of a slit and around the periphery of the conductor layer due to a cut-edge effect. Since magnetic flux does not pass through the conductor layer, magnetic flux attempts to bypass the conductor layer along a path in which the conductor opening of the conductor layer is on the inside and the outer edge of the conductor layer is on the outside. As a result, the magnetic flux generates large loops that link the inside and the outside of a coil conductor of an antenna on a reader/writer side to couple an antenna device and the antenna on the reader/writer side.

Reference is also made to U.S. Pat. Nos. 8,976,075 and 9,203,157.

US 2015/0206047 (23 Jul. 2015; CompoSecure; Herslow) discloses metal card with radio frequency (RF) transmission capability. A smartcard with a metal layer which can capture radio-frequency (RF) signals via an antenna system is made operable by modifying the metal layer to enable passage of RF signals through the metal layer and/or by introducing a ferrite layer to enhance the efficient reception/transmission of RF signals by the antenna system. In one embodiment apertures are formed in and through the metal layer to allow RF signals to pass through the metal layer without negatively impacting the decorative or esthetic and/or reflective nature of the metal layer. These modifications allow for dual interface and contactless smartcard formats. In other embodiments of the invention, a ferrite layer is formed between the metal layer and the inductors/antennas mounted within the smartcard to enhance the efficient reception/transmission of RF signals.

U.S. Pat. No. 9,721,200 (1 Aug. 2017; CompoSecure; Herslow et al.) incorporated by reference herein, discloses a smartcard having an antenna structure and a metal layer. An insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

A method is described in CompoSecure '200 which comprises forming said insulator layer, wherein the thickness of the insulator layer affects the value of the capacitance between said antenna structure and said metal layer; varying the thickness of the insulator for varying the capacitance; transmitting RF signals to the antenna structure (and insulating layer and metal layer); sensing the amplitude of the signals received at the antenna structure; and identifying the insulator thickness which results in the highest amplitude of signal being received at the antenna structure.

U.S. Pat. No. 9,898,699 (20 Feb. 2018; CompoSecure; Herslow et al.) incorporated by reference herein, discloses a smart metal card with radio frequency (RF) transmission capability. Ferrite material utilized in a smart metal card as a shield between a metal layer and an antenna does not occupy a complete layer. Instead, only sufficient ferrite material is utilized to track and conform to the antenna.

WO 2017/090891 (1 Jun. 2017; Biosmart; Yoon et al.) discloses non-contact type metal card having an antenna embedded therein. A non-contact metal card which is characterized in that a first body sheet and a second body sheet, which are formed of a metal flat plate, are vertically stacked, and an antenna inlay, which has an antenna, is disposed there-between. A hole is formed in a main body of each of the first body sheet and the second body sheet, and a slot is formed by incising a gap between one side surface of each hole and the side surface of the main body. The hole is positioned in the internal area of the antenna, and the locations of the hole of the first body sheet and the hole of the second body sheet have a gap of a predetermined distance. By the aforesaid structure, the non-contact type metal card has a hole of which a part of one side surface is opened by a slot on the main body which is a metal flat plate, and thus prevents an eddy current from occurring on the first body sheet and the second body sheet which are metal flat plates, thereby enabling the metal card to transmit and receive data in a wireless manner by using the antenna embedded therein.

KR 10-1754985 (30 Jun. 2017; Aichi CK Corporation aka ICK; Kim et al.) discloses metal card having non-contact type card function and manufacturing method thereof. A non-contact metal card, for VIP customers in the most finest customer base, to provide the at least one side a metal card entirety having the contactless card function consisting of a real thick metal plate and a method of manufacturing the same, non-contact type which incorporates at least one chip function metal card (100) with the, RFIC chip module 20 for performing the contactless card function; inlay antenna for performing non-contact communication of the RFIC chip module (20) directly formed (40); wherein the RFIC chip module 20, and a chip module, the through hole 12 which can be inserted into the inlay (40) which can be mounted inlay mounting groove 11 is in the first metal layer (10); and wherein on the lower side of the first metal layer a second layer (60,80) being laminated; includes, the first metal layer (10 and 10' is the chip module, the through hole 12 of one side) is to the outside a slit (15,15', 85) to be opened there is formed, wherein In-let portion is characterized in that the conductivity of the first metal layer disconnection.

U.S. Pat. No. 10,140,569 (27 Nov. 2018; Kim et al.) discloses metal contactless smart card and method for fabricating same. A smartcard in which a metal contactless smart card includes a first metal layer having a first slit, a second layer, a radio-frequency integrated circuit chip module, and an inlay having an antenna. A nonconductive insert may be fitted in the slit. The first metal layer may include an inlay recess where the inlay may be received and a throughhole where the chip may be inserted. The second layer of the smart card may be made of metal and may also include a slit.

U.S. Pat. No. 8,737,915 (27 May 2014; J. H. Tonnjes E. A. S. T.; Beenken) discloses license plates for a vehicle. In identification devices having a contactless readable data carrier (20 equipped with an antenna (17), the antenna (17) assigned to the data carrier (20)) is formed by an electrically conductive part of the identification device (10) with a slit (18) provided therein, making the antenna (17) an integral component of the identification device (10), and making a separate antenna (17) redundant.

US 2019/0156994 (23 May 2019; X-Card Holdings; Cox) incorporated by reference herein, discloses multiple interface electronic card. A device includes a first inductor and a second inductor. The first inductor has a first inductive coupling profile. A first circuit component is coupled to the first inductor. A second inductor has a second inductive coupling profile. A second circuit component coupled to the second inductor.

US 2019/0050706 (14 Feb. 2019; CompoSecure; Lowe), now U.S. Pat. No. 10,406,734, discloses overmolded electronic components for transaction cards and methods of making thereof. A process for manufacturing a transaction card includes forming an opening in a card body of the transaction card; inserting an electronic component into the opening; and molding a molding material about the electronic component. A transaction card includes a molded electronic component.

US 2019/0236434 (1 Aug. 2019; CompoSecure; Lowe) discloses DI capacitive embedded metal card. A transaction card having a metal layer, an opening in the metal layer for a transponder chip, and at least one discontinuity extending from an origin on the card periphery to a terminus in the opening. The card has a greater flex resistance than a card having a comparative discontinuity with the terminus and the origin the same distance from a line defined by a first long side of the card periphery in an absence of one or more strengthening features. Strengthening features include a discontinuity wherein one of the terminus or the origin are located relatively closer to the first long side of the card periphery than the other, a plurality of discontinuities wherein fewer than all extend from the card periphery to the opening, a self-supporting, non-metal layer disposed on at least one surface of the card, or one or more ceramic reinforcing tabs surrounding the opening.

US 2019/0073578 (7 Mar. 2019; CompoSecure; Lowe et al.) discloses transaction card with embedded electronic components and process for manufacture. A transaction card and a process of making the transaction card are described. The transaction card includes a core having first and second faces, a core thickness there-between, and an opening, and embedded electronics disposed in the opening. Reference is also made to over-molded electronic components for transaction cards and methods of making thereof: US 2019/0160717, US 2019/0286961 and US 2019/0291316 (now U.S. Pat. No. 10,583,594).

US 2014/0231503 (21 Aug. 2014; Smart Co.; Kunitaka) discloses Universal IC Tag, Method of Manufacturing Same, and Communication Management System. A universal IC tag comprises a metal sheet $M_1$ having a hollow slot functioning as an antenna; plastic sheets laminated on the front and the rear surfaces of the metal sheet $M_1$; an IC arranged in the hollow slot, and a metal sheet $M_2$ laminated on the rear plastic sheet having a reflecting amplifying function. Such universal IC tag can transmits/receive maximum energy by matching IC impedance with slot impedance and by attaining resonance between an IC capacitor and a slot inductance.

U.S. Pat. No. 10,089,570 (2 Oct. 2018; CompoSecure; Herslow et al.) discloses card with metal layer and an antenna. A smart card having an antenna structure and a metal layer, in which an insulator layer is formed between the antenna structure and the metal layer to compensate for the attenuation due to the metal layer. The thickness of the insulator layer affects the capacitive coupling between the antenna structure and the metal layer and is selected to have a value which optimizes the transmission/reception of signals between the card and a card reader.

U.S. Pat. No. 10,275,703 (30 Apr. 2019; CompoSecure; Herslow et al.) discloses smart metal card with radio frequency (RF) transmission capability. RF shielding material utilized in a smart metal card as a shield between a metal layer and an antenna does not occupy a complete layer. Instead, only sufficient RF shielding material is utilized to track and conform to the antenna.

U.S. Pat. No. 10,289,944 (14 May 2019; CompoSecure; Herslow et al.) discloses metal smart card with dual interface capability. A dual interface smart card having a metal layer includes an SC module, with contacts and RF capability, mounted on a plug, formed of non RF impeding material, between the top and bottom surfaces of the metal layer. The plug provides support for the IC module and a degree of electrical insulation and isolation from the metal layer. The resultant card can have contact and contactless operating capability and an entirely smooth external metal surface except for the contacts of the IC module.

U.S. Pat. No. 10,318,859 (11 Jun. 2019; CompoSecure; Lowe, et al.), incorporated by reference herein, discloses dual interface metal smart card with booster antenna. A card having a metal layer and an opening or cut-out region in the metal layer, with a dual-interface integrated circuit (IC) module disposed in the opening or cut-out region. A ferrite layer is disposed below the metal layer and a booster antenna is attached to the ferrite layer. A vertical hole extends beneath the IC module through the ferrite layer. The booster antenna may be physically connected to the IC module or may be configured to inductively couple to the IC module. In some embodiments, the IC may be disposed in or on a non-conductive plug disposed within the opening or cut-out region, or the vertical hole may have a non-conductive lining, or a connector may be disposed between the booster antenna and the IC module in the vertical hole.

U.S. Pat. No. 10,534,990 (14 Jan. 2020; CompoSecure; Herslow et al.) discloses metal smart card with dual interface capability. A dual interface smart card, and methods for the manufacture thereof, having a metal layer, an IC module, with contacts and RF capability, and a plug formed of non RF impeding material, disposed in the metal layer. The plug provides support for the IC module and a degree of electrical insulation and isolation from the metal layer. Embodiments of the card include at least one additional layer.

U.S. Pat. No. 10,445,636 (15 Oct. 2019; Giesecke & Devrient; Virostek et al.) discloses interference-optimized metal data carrier. A layer arrangement is provided for manufacturing an interference-optimized, metal and card-shaped data carrier and to a layer laminate comprising the layer arrangement.

US 2019/0311235 and US 2019/0311236 (10 Oct. 2019; Giesecke & Devrient; Sexl et al.) discloses portable dual-interface data carrier with metal frame. A portable dual-interface data carrier contains a metal sheet which can be provided with low technical effort and especially no ferrite material is required. The resulting portable dual-interface data carrier is more heavy than a state of the art PVC smart card and provides contact based interface on one side, whereas contactless interfaces is working from both sides of the card. One application domain of the data carrier is to provide a so-called smartcard. The present invention is furthermore directed towards a dual-interface module as well as towards a method for providing a portable dual-interface data carrier. Moreover, a data carrier is suggested comprising instructions for performing the suggested method and for manufacturing the portable dual-interface data carrier.

PCT/US2019/020919 (12 Sep. 2019; X-Card Holding; Cox) discloses metal card. A card core which includes a body defining a cutout and a discontinuity. The cutout includes an opening in the body defined by an edge and the discontinuity includes a channel defined by the body extending from an outer surface of the body to the cutout. At least one circuit element is positioned within the cutout. The cutout defines a size and geometry such that a gap is defined between the at least one circuit element and the edge to electromagnetically isolate the at least one circuit element from the body.

U.S. Pat. No. 9,299,020 (29 Mar. 2016; TheCard; Zimmerman et al.) discloses financial transaction card with cutout pattern representing symbolic information. A financial transaction card includes a card substrate formed as a material sheet having first and second substantially planar card faces bounded by a peripheral edge. A machine-readable financial information storage device is on or within the material sheet. The storage device stores card specific data in digital machine readable form. Human readable symbolic information is viewable on the first and second card faces. At least one item of the symbolic information is formed as a cutout pattern of one or more light-transmitting apertures extending completely through the material sheet.

U.S. Pat. No. 8,393,547 (12 Mar. 2013; Perfect Plastic Printing; Kiekhaefer et al.) discloses RF proximity financial transaction card having metallic foil layer(s). A contactless financial transaction card includes a plastic inlay having first and second substantially planar surfaces bounded by a continuous peripheral edge. An integrated circuit carried by the inlay stores card-specific data. An antenna carried by the inlay is operatively connected to the integrated circuit. The foil layer provides the financial transaction card with a decorative metallic reflective appearance and is constructed to permit the antenna to inductively couple with the card reader within the maximum coupling distance. Printed graphics or text may be disposed on or above the metallic foil layer. The card is constructed to inductively couple with a card reader that is spaced from the card in order to support limited-range wireless communication between the card and the card reader up to a maximum coupling distance, beyond which it will not couple.

US 2019/0384261 (19 Dec. 2019; Kona I; Nam et al.) discloses metal card and method for manufacturing same. A method for manufacturing a metal card which is capable of allowing metal card antennas to have no interference with a metal sheet by including a processed plastic layer formed on the metal sheet, and an insulating sheet. The metal card is capable of improving sensitivity of antenna coil, thereby solving an existing problem of the difficulties in performing RF communication because of material characteristics of a metal layer.

U.S. Pat. No. 10,583,683 (10 Mar. 2020; Federal Card Services; Ridenour et al.) discloses embedded metal card and related methods. A system and method for producing a multi-layered materials sheet that can be separated into a number of payment cards having an embedded metal layer that provides durability and aesthetics at a reduced cost and increased efficiency. During product of the materials sheet, multiple layers are collated and laminated to produce a large materials sheet. The lamination step involves heating and cooling the materials at specific temperatures and pressures for specific time periods. At a registration step, the sheet is automatically milled with alignment holes. During a singulation step, the alignment holes are used to position the sheet on a vacuum table, and vacuum holds the sheet in place while a milling device cuts cards from the sheet. Reference is also made to US 2020/0164675.

CN 205158409U (13 Apr. 2016) discloses a wireless radio frequency identification (RFID) field that operates a wideband ceramic anti-metallic label. A wideband ceramic anti-metallic label characterized in that it includes an antenna, a chip and a base plate, the base plate accepts the antenna and chip, the antenna matches with the chip, the antenna includes a radiating surface and ground plane, and the radiating surface includes a radiant section, impedance regulation part, co-plane coupling part, and the radiating surface is located at the front of the base plate, and the ground plane is located at the back of base plate, and the chip is located at the side of base plate, the chip links to each other with radiating surface and ground plane. The anti-metal label size of this kind of pottery is little, and the special design of the antenna can greatly reduce the Q value, the exhibition wide bandwidth of antenna, and the performance surpasses the ordinary anti metal label of jumbo size, and can be conveniently used in a lot of sizes is less, simultaneously to in reading the higher metal environment of distance, bandwidth requirement.

Chen, S. L., Kuo, S. K. and Lin C. T. (2009) discloses a metallic RFID tag design for steel-bar and wire-rod management application in the steel industry. (Progress in Electromagnetics Research, PIER Vol. 91: pp. 195-212.) Chen et al. report a way of reducing the effects of shielding from a metal surface in close proximity to an RFID tag. They propose a metallic RFID tag comprising a slit in a metal plate and a window shaped slot to accept a small loop antenna. The antenna is designed for a Texas Instrument ultra high frequency (UHF) chip, whose input impedance is about (10.7-j62.8) Ω at 925 MHz. The small loop antenna inductively couples the energy to the metal with the corresponding slit and opening. The coupling strength is mainly controlled by the distance between the window slot and the loop antenna.

U.S. Pat. No. 6,491,229 (10 Dec. 2002; NJC Innovations; Berney) discloses contactless chip card associated with RF transmission means. A chip card associated with RF transmission means. Said chip card comprises on each surface high permeability zones arranged so as to concentrate the flux generated by the RF transmission means onto a sensor coil. To ensure the proper functioning of the system, the transmission means generate flux lines parallel to the surface of the chip card.

U.S. Pat. No. 7,306,163 (11 Dec. 2007; IBM; Scholz et al.) discloses smart card and method for its production. A smart card having an extended communication distance includes a card body, at least one chip and at least one antenna attached to the chip, wherein the chip and the antenna are embedded in the card body. The smart card is characterized in that the antenna is provided with at least one metal core.

Some Additional References

The following US patents and patent application publications are referenced:

U.S. Pat. No. 10,552,722 Smartcard with coupling frame antenna
U.S. Pat. No. 10,248,902 Coupling frames for RFID devices
U.S. Pat. No. 10,193,211 Smartcards, RFID devices, wearables and methods
U.S. Pat. No. 9,960,476 Smartcard constructions
U.S. Pat. No. 9,836,684 Smartcards, payment objects and methods
U.S. Pat. No. 9,697,459 Passive smartcards, metal cards, payment objects
U.S. Pat. No. 9,812,782 Coupling frames for RFID devices
U.S. Pat. No. 9,390,364 Transponder chip module with coupling frame on a common substrate
U.S. Pat. No. 9,489,613 RFID transponder chip modules with a band of the antenna extending inward
U.S. Pat. No. 9,634,391 RFID transponder chip modules
U.S. Pat. No. 9,622,359 RFID transponder chip modules
U.S. Pat. No. 9,798,968 Smartcard with coupling frame and method of increasing activation distance
U.S. Pat. No. 9,475,086 Smartcard with coupling frame and method of increasing activation distance
2018/0339503 Smartcards with metal layers and methods of manufacture
2018/0341846 Contactless metal card construction 2019/0114526 Smartcard constructions and methods
2019/0171923 Metallized smartcard constructions and methods
2019/0197386 Contactless smartcards with multiple coupling frames
2019/0392283 RFID transponder chip modules, elements thereof, and methods
2020/0005114 Dual interface metal hybrid smartcard
2020/0034578 Smartcard with display and energy harvesting
2020/0050914 Connection bridges for dual interface transponder chip modules
2020/0151534 Smartcards with metal layers and methods of manufacture U.S. Pat. No. 8,186,582 (29 May 2012; American Express; Varga et al.) discloses metal-containing transaction card and method of making the same. A method of creating a single transaction card is disclosed and comprises embossing the single transaction card within a pocket to form embossed characters on a first surface of the single transaction card, filling the pocket with a fill panel to provide a substantially flush surface on a second surface of the single transaction card, wherein a third surface of the fill panel is in uniform, direct contact with an interior of the pocket. Another method is disclosed for machining a face pocket within a single transaction card and disposing a microchip therein. In various embodiments, a single transaction card is comprised of a continuous metal layer, such as, for example, titanium. Reference is also made to U.S. Pat. No. 8,523,062

U.S. Pat. No. 9,760,816 (12 Sep. 2017; American Express; Williams et al.) discloses metal-containing transaction cards and methods of making the same. A transaction card is provided comprising a card body comprising a metallic material, the card body including a primary surface, a secondary surface, an aperture and a slit, wherein the primary surface and the secondary surface are coated with a diamond like carbon (DLC) coating. Reference is also made to U.S. Pat. No. 9,836,687.

Some Definitions

Some of the following terms may be used or referred to, herein.

Eddy Currents

Eddy currents are induced electrical currents that flow in a circular path. In other words, they are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon is known as the skin effect. The depth that eddy currents penetrate into a metal object is affected by the frequency of the excitation current and the electrical conductivity and magnetic permeability of the metal.

Skin Depth

Skin effect is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

Eddy Currents and a Slit in a Metal Layer or Metal Card Body

A discontinuity interrupts or alters the amplitude and pattern of the eddy currents which result from the induced electromagnetic field generated by a contactless point of sale terminal. The eddy current density is highest near the surface of the metal layer (ML) and decreases exponentially with depth.

RFID Slit Technology

"RFID Slit Technology" refers to modifying a metal layer (ML) or a metal card body (MCB) into a so-called "antenna circuit" by providing a discontinuity in the form of a slit, slot or gap in the metal layer (ML) or metal card body (MCB) which extends from a peripheral edge to an inner area or opening in the layer or card body. The concentration of surface current at the inner area or opening can be picked up by another antenna (such as a module antenna) or an antenna circuit by means of inductive coupling which can drive an electronic circuit such as an RFID chip attached directly or indirectly thereto. The slit may be ultra-fine (typically less than 50 µm or less than 100 µm), cut entirely through the metal with a UV laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed or injection molded. The term "slit technology" may also refer to a "coupling frame" with the aforementioned slit, or to a smartcard embodying the slit technology or having a coupling frame incorporated therein.

Module Antenna (MA)

This is an antenna structure (AS) located on the face-down-side of a transponder chip module (TCM) or dual interface chip module (DI chip module) for inductive coupling with an in-card booster antenna (BA) or coupling frame (CF). The antenna structure (AS) is usually rectangular in shape with dimensions confined to the size of the module package having 6 or 8 contact pads on the face-up-side. The termination ends of the antenna structure (AS) with multiple windings (13 to 15 turns) based on a frequency of interest (e.g. 13.56 MHz) are bonded to the connection pads ($L_A$ and $L_B$) on the RFID chip. In the case of a coupling frame (CF) smartcard such as a dual interface metal core transaction card, the module antenna (MA) overlaps the coupling frame or metal layer(s) within the card body at the area of the module opening to accept the transponder chip module (TCM).

Coupling Loop Antenna (CLA)

This is antenna structure (AS) which couples to a module antenna (MA) in a transponder chip module (TCM). The windings or traces of the coupling loop antenna (CLA) may intertwine those windings of the module antenna (MA), or the windings or traces of the coupling loop antenna (CLA) may couple closely with the windings of the module antenna (MA) similar in function to a primary and secondary coil of a transformer. The termination ends of a coupling loop antenna (CLA) may be connected to termination points (TPs) across a discontinuity in a metal layer (ML) or metal card body (MCB) acting as a coupling frame (CF).

Coupling Frame Antenna (CFA)

A metal layer or metal card body with a discontinuity may be represented by card size planar antenna having a single turn, with the width of the antenna track significantly greater than the skin depth at the frequency of interest.

Sense Coil (SeC), Patch Antenna (PA) and Pick-Up Coil (PuC)

These are all types of coils or antennas used to capture surface current by means of inductive coupling at the edge of a metal layer (ML) or metal card body (MCB) or around a discontinuity in a metal layer (ML) or metal card body (MCB) when such conductive surfaces are exposed to an electromagnetic field. The coils or antennas may be wire wound, chemically etched or laser etched, and positioned at very close proximity to a discontinuity in a metal layer, at the interface between a conductive and non-conductive surface, or at the edge of a metal layer.

Antenna Cell (AC)

It is an antenna structure (AS) such as sense coil (SeC), patch antenna (PA) or pick-up coil (PuC) on a flexible circuit (FC) driving an electronic component such as a fingerprint sensor or a dynamic display. A plurality of antenna cells (ACs) at different locations in a metal transaction card may be used to power several electronic components.

Antenna Probe (AP)

A pick-up antenna in the form of a micro-metal strip (first electrode) may be placed in the middle of a discontinuity to probe eddy current signals from the magnetic flux interaction with the metal layer acting as the coupling frame. The metal layer also acts as the second electrode in the circuit. The metal strip may be replaced by a sense coil with a very fine antenna structure to pick-up the surface currents from within the discontinuity.

Coupling Loop Structure (CLS)

It is a flexible circuit (FC) with a sense Coil (SeC), patch antenna (PA) or pick-up coil (PuC) for inductive coupling with a discontinuity in a metal layer (coupling frame) to pick-up surface currents and to direct such currents via traces or tracks to an antenna having a frame or spiral shape on the flexible circuit (FC) which further inductively couples in close proximity with the module antenna (MA) of a transponder chip module (TCM).

Metal Edge & Metal Ledge

For optimum RF performance, the dimensional width of the windings (or width across multiple windings) of a sense coil (SeC), patch antenna (PA) or a pick-up coil (PuC) ought to overlap a metal edge (ME) by 50% to capture the surface currents. The same applies to the module antenna (MA) of a transponder chip module (TCM) implanted in a metal containing transaction card. The dimensional width of the windings of the module antenna (MA) ought to overlap a metal ledge (P1) of a stepped cavity forming the module pocket in a card body by 50%. In the case of an antenna probe, surface currents are collected between very close metal edges. As the shape and form of the antennas may change, the dimensional width of the windings may be replaced by the surface area or volume.

Polyethylene Naphthalate (PEN)

It is a high-performance, crystal clear thermoplastic made from naphthalene-2,6-dicarboxylic acid and ethylene glycol. PEN has many attractive properties including high tensile strength, low heat shrinkage, excellent dimensional stability, low moisture absorption, and good retention of physical properties over a fairly wide temperature range. Its oxygen barrier, hydrolytic stability, and tensile strength surpass those of PET films. It also has superior UV resistance, excellent electrical properties, much lower heat shrinkage, good optical clarity and high gloss but only moderate moisture barrier properties. It has a relative high melting point and glass transition temperature (120° C.), which makes it suitable for applications that require sterilization at high temperatures. Typical grades have a continuous service temperature of about 160° C.

Thermosetting Resin

A thermosetting resin, or thermoset, is a polymer which cures or sets into a hard shape using curing method such as heat or radiation. The curing process is irreversible as it introduces a polymer network crosslinked by covalent chemical bonds.

Upon heating, unlike thermoplastics, thermosets remain solid until temperature reaches the point where thermoset begins to degrade.

Phenolic resins, amino resins, polyester resins, silicone resins, epoxy resins, and polyurethanes (polyesters, vinyl esters, epoxies, bismaleimides, cyanate esters, polyimides and phenolics) are few examples of thermosetting resins.

Thermoset Adhesives

Thermoset adhesives are crosslinked polymeric resins that are cured using heat and/or heat and pressure. They represent a number of different substances that undergo a chemical reaction when curing, such that the structure formed has superior strength and environmental resistance. Despite their name, thermosets may or may not require heat to cure and may instead use irradiation or electron beam processing. Due to their superior strength and resistance, thermosets are widely used for structural load-bearing applications.

Thermoset adhesives are available as one- or (more commonly) two-component systems. One component systems use heat curing and require cold storage for sufficient shelf life. Most one component adhesives are sold as pastes and applied by a trowel to easily fill gaps.

Two component systems must be mixed and applied within a set time frame, ranging from a few minutes to hours. Two component epoxies are suitable for bonding nearly all substrates and feature high strength and chemical resistance as well as excellent long-term stability.

B-staged Epoxy Resin

It is a descriptive term used to define a one component epoxy system, using a latent (low reactivity) curing agent. This unique product can be partially cured (sometimes referred to as "pre-dried"), as an initial stage after being applied onto one substrate/surface. It can, at a later time, be completely cured under heat and pressure.

Partially cured epoxy, or B-staged epoxy adhesive, does have processing advantages. The adhesive can have its initial application and partial cure in one location, and its final cure in another location weeks later.

C-staged Epoxy Resin

The B stage is a solid, thermoplastic stage. When given additional heat, the B-stage epoxy will flow and continue to cure to a crosslinked condition or C stage.

Anodizing

It is an electrolytic passivation process used to increase the thickness of the natural oxide layer on the surface of metal parts. The process is called anodizing because the part to be treated forms the anode electrode of an electrolytic cell. Anodic films are most commonly applied to protect aluminum alloys, although processes also exist for titanium, zinc, magnesium, niobium, zirconium, hafnium, and tantalum.

Anodizing changes the microscopic texture of the surface and the crystal structure of the metal near the surface. Thick coatings are normally porous, so a sealing process is often needed to achieve corrosion resistance. Anodized aluminum surfaces, for example, are harder than aluminum but have low to moderate wear resistance that can be improved with increasing thickness or by applying suitable sealing substances. Anodic films are generally much stronger and more adherent than most types of paint and metal plating, but also more brittle. This makes them less likely to crack and peel from aging and wear, but more susceptible to cracking from thermal stress.

In using aluminum in the card stack-up construction of metal cards, techniques for anodizing packaging and decorative parts for the beauty and personal care industry are applied. The aluminum oxide layer has a thickness of 12 to 18 microns rendering the surface finish non-conductive. The weight of a solid aluminum smartcard is approximately 10.5 grams.

The coloring of the pristine aluminum is through anodizing (electrochemical treatment in a sulfuric acid bath with a continuous rack conveying system) and through dye-sublimation printing.

Double-anodizing involves passing the aluminum layer (e.g. 15 mils thick) through the electrochemical process first with one color, followed by a photo resist (for graphics-image embedding) and aluminum oxide growth in the repeat process to provide the second color or greater intensity of the first.

The type of alloy determines the prep formula used to color the aluminum. 5000 series aluminum achieves a high gloss finish. Aluminum 3000 and 7000 series may also be used.

Instant Card Issuance

Instant issuance is a process where financial—bank cards, credit, debit, or cash cards, carrying Visa®/MasterCard®/AMEX®/JCB® or a Proprietary logo is issued and personalized on demand and delivered to the customer in the branch bank or at other remote locations such as a retailer outlet.

Visa®/MasterCard®/AMEX®/JCB®, all of the Visa/MasterCard-required security features for encoding (EMV chip and magnetic stripe), embossing, indent printing and thermal retransfer printing are incorporated on the card.

Custom graphics or a photo may also be printed in such a way to produce a unique "personalized" card product that dramatically exceeds customer expectations. PIN generation (initial PIN generation) or PIN selection (PIN change) are options that can be incorporated into the card instant issuance procedure.

SUMMARY

The prior art is silent on overlapping a connection bridge (CBR) with the discontinuity of a coupling frame (CF) to further boost the RF performance in terms of transaction time versus field strength.

It is therefore an object of the current invention to further boost the RF performance of an RFID enabled metal transaction card by overlapping conductive areas of a transponder chip module other than the module antenna.

According to an embodiment of the invention, a metal containing transaction card or smartcard (SC) having a discontinuity (slit) formed in a metal layer (ML) or metal card body (MCB) which extends from a perimeter edge of the card body to a transponder chip module (TCM) having a module antenna (MA) on its face-down side (bond side) connected to an RFID chip (IC) and a contact pad (CP) arrangement with a connection bridge (CBR) and a plating line on its face-up side (contact side), wherein the path of the slit (S) travels from a perimeter edge of the card body to the area underneath the module antenna (MA), overlapping its windings or tracks on one side, two sides or three sides while crossing portions of a connection bridge and a plating line as well as the vertical interconnects (Vias) electrically connecting the contact pads on the face-up side to the circuitry on the face-down side. The slit (S) does not enter an opening in the metal layer (ML) or metal card body (MCB) intended to accommodate the mold mass or the chip encapsulation of the transponder chip module (TCM). An opening may exist which is sized to have the inner dimensions of the windings of the module antenna (MA). The shape of the opening may be other than rectangular, and may have at least two parallel sides.

The discontinuity in the metal layer (ML) or metal card body (MCB) may commence at a periphery edge of the card body and continue to the area of the transponder chip module (TCM) without reaching the module opening (MO). Instead, the discontinuity enters the area of the module antenna (MA) overlapping its windings or tracks and follows the form and path of the module antenna (MA). In some configurations of the card body, the module opening (MO) may not exist.

According to an embodiment of the invention, the mechanical stability of the metal card body (MCB) is stabilized by routing the slit (S) around the area of the module antenna (MA) without entering an opening in the metal to accept the contour and form of the encapsulation protecting the connections to the RFID chip (IC) on the bond side of the transponder chip module (TCM), and molding a molding material across a section or sections of the slit (S) to secure and maintain the rigidity of the metal layer (ML) or metal card body (MCB).

According to an embodiment of the invention, a connection bridge (CBR) in a transponder chip module (TCM) is used as a coupling loop antenna (CLA) or antenna structure (AS) to couple closely with the antenna windings or tracks of the module antenna (MA) in the transponder chip module (TCM). The connection bridge (CBR) is interconnected to the terminal end of the windings of the module antenna (MA) through a vertical interconnect (Via) in the module tape (MT) using a flexible circuit board technique of thru-hole plating. A discontinuity in a metal layer (ML) or metal card body (MCB) to function as a coupling frame overlaps a portion of the connection bridge (CBR), the vertical interconnect and the windings to boost the RF performance of the system.

According to an embodiment of the invention, the slit (S) in the metal layer (ML) may inductively couple with the windings and a portion of the plating line and its vertical interconnect and or the slit (S) may overlap the windings and a portion of the connection bridge (CBR) and its vertical interconnect.

According to an embodiment of the invention, the slit (S) may not extend to the module opening (MO) to overlap the antenna windings but rather terminates around the area of the connection bridge (CBR) and its vertical interconnect or the plating line and its vertical interconnect.

According to an embodiment of the invention, the slit (S) intersects the top center area of the module passing under the horizontal windings, and the isolated metal features connected to the connection bridge and plating line.

According to an embodiment of the invention, the slit (S) starts at a periphery edge of a metal layer (ML) or metal card body (MCB), enters the module area, and follows the path of the module antenna (MA), but does not extend to the module opening (MO).

In their various embodiments, the invention(s) described herein may relate to industrial and commercial industries, such RFID applications, payment smartcards (metal, plastic or a combination thereof), electronic credentials, identity cards, loyalty cards, access control cards, wearable devices, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "ICM", "MA", "MO", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

The following figures may be referred to and/or described in the text.

Figure 1A:
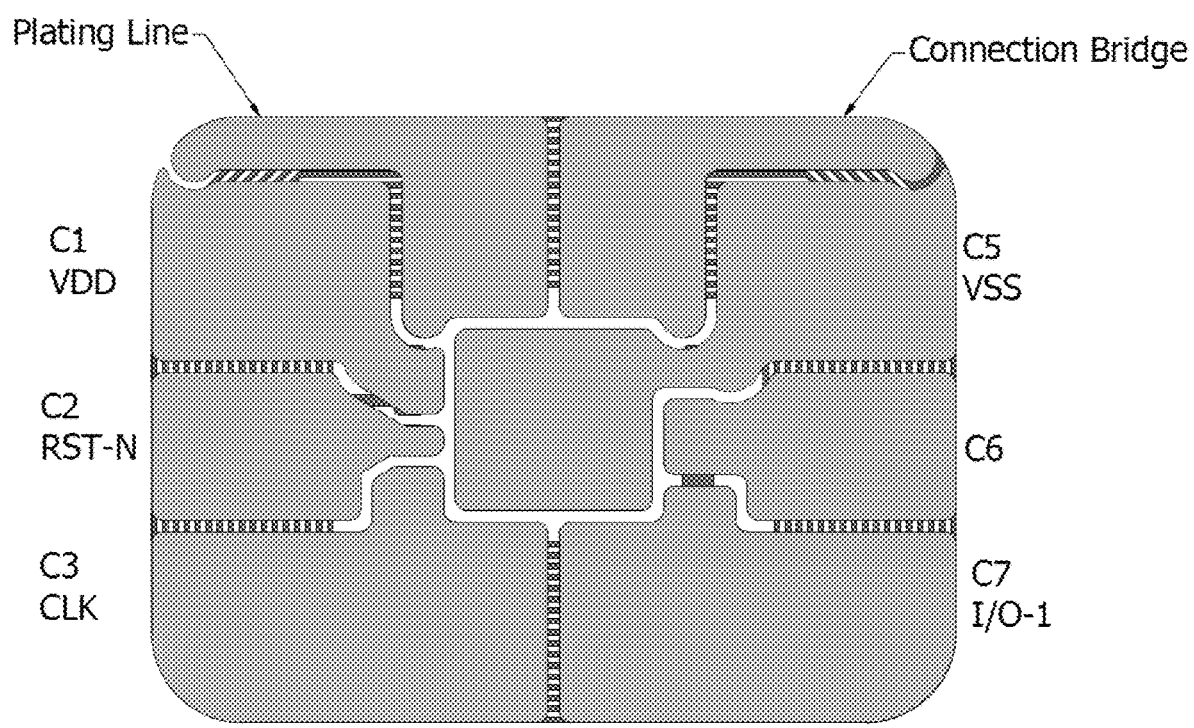

FIG. 1A is a diagram (plan view) of the contact side of a six pin dual interface (DI) chip module, according to the prior art.

Figure 1B:
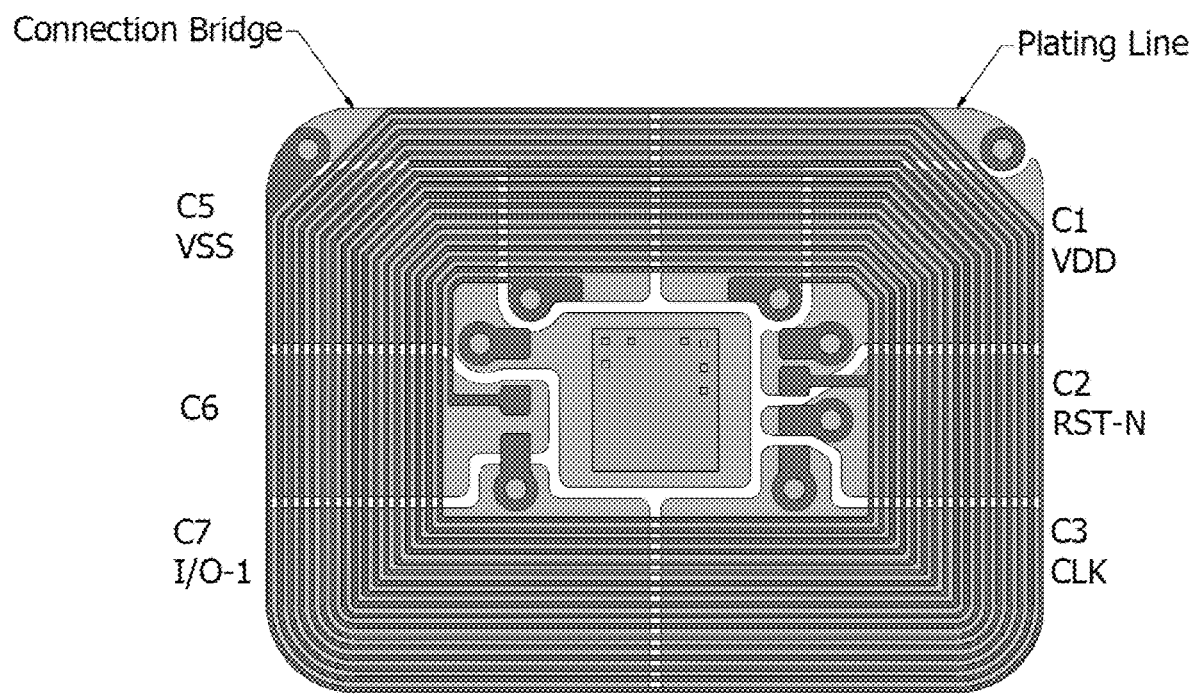

FIG. 1B is a diagram (plan view) of the bond side of a six pin dual interface (DI) chip module, according to the prior art.

Figure 1C:
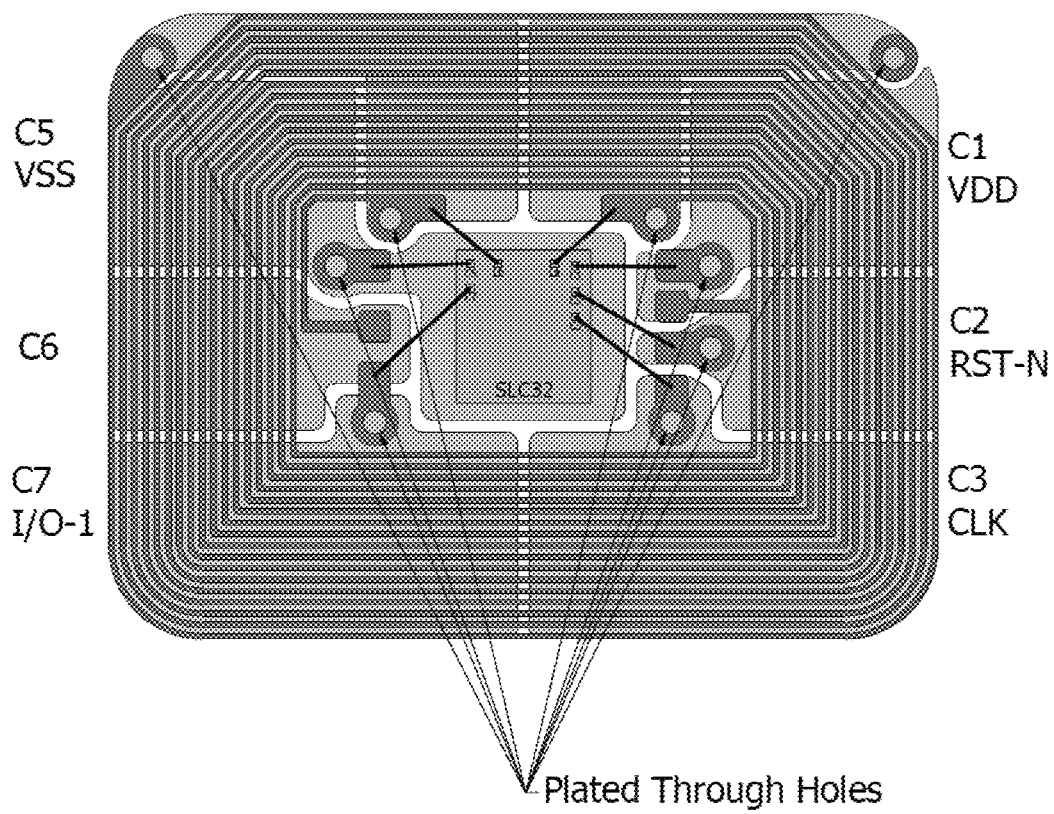

FIG. 1C is a diagram (plan view) illustrating the wire bond connections to an RFID chip (IC), according to the prior art.

Figure 2A:
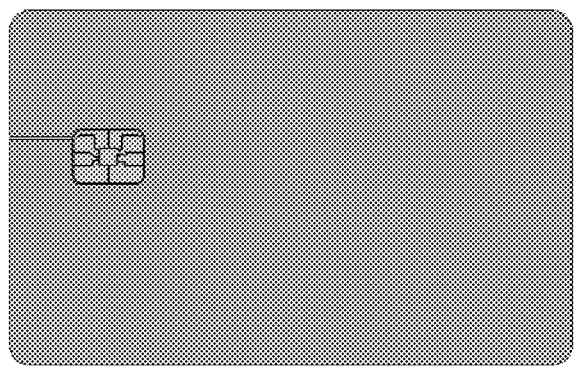
Figure 2B:
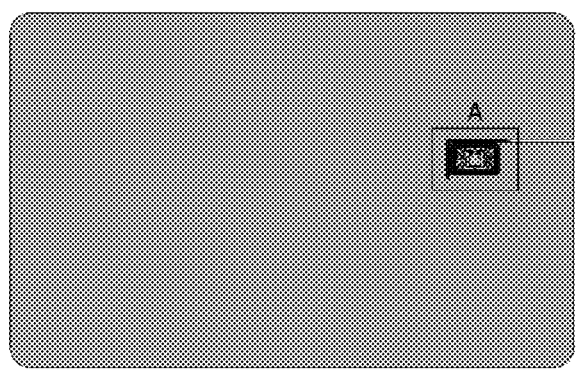

FIGS. 2A and 2B are diagrams, in plan view, showing a front and rear surface of a metal layer (ML) or metal card body (MCB) acting as a coupling frame (CF) with a straight slit (S), according to an embodiment of the invention.

Figure 2C:
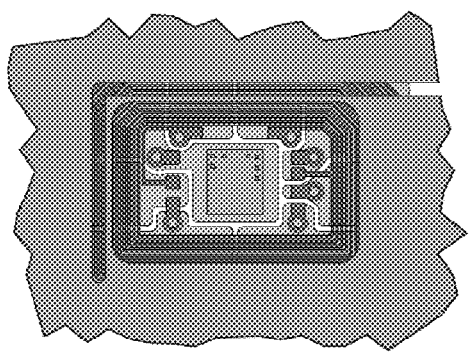
Figure 2D:
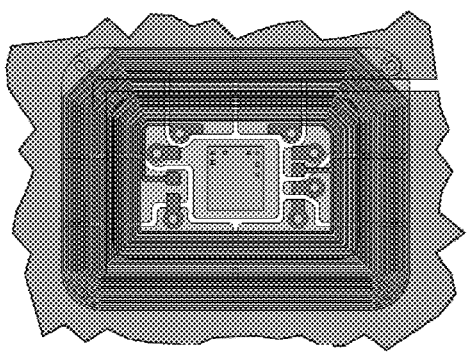

FIGS. 2C and 2D are plan views of a module antenna (MA) on the bond side of a six pin transponder chip module (TCM) with multiple windings (tracks) with the slit (S) in the metal layer (ML), according to an embodiment of the invention.

Figure 2E:
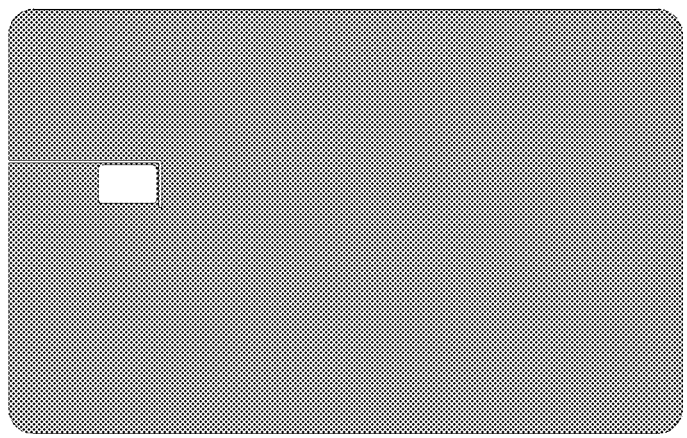

FIG. 2E is a diagram, in plan view, illustrating a metal layer (ML) or metal card body (MCB) with a slit (S), according to an embodiment of the invention.

Figure 3A:
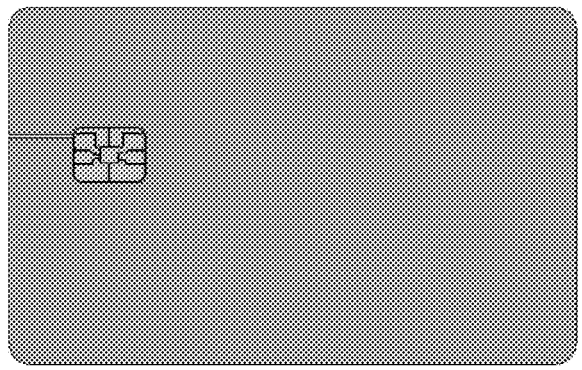
Figure 3B:
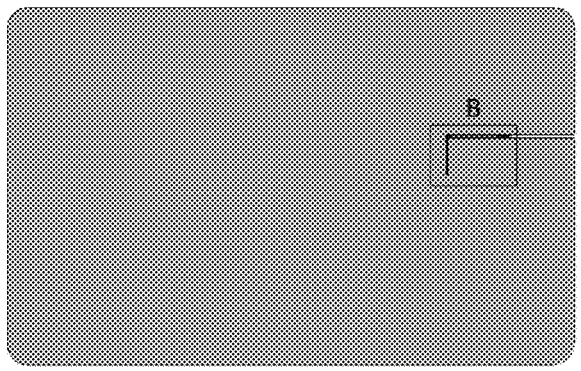

FIGS. 3A and 3B are diagrams, in plan view, showing a front and rear surface of a metal layer (ML) or metal card body (MCB) acting as a coupling frame (CF) with a straight slit (S), according to an embodiment of the invention.

Figure 3C:
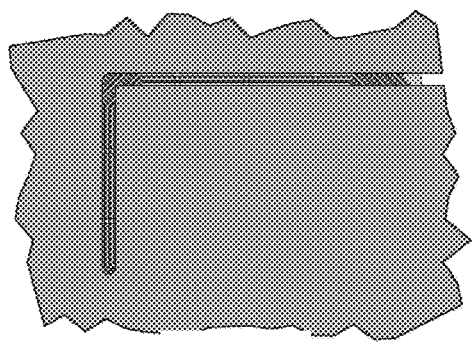
Figure 3D:
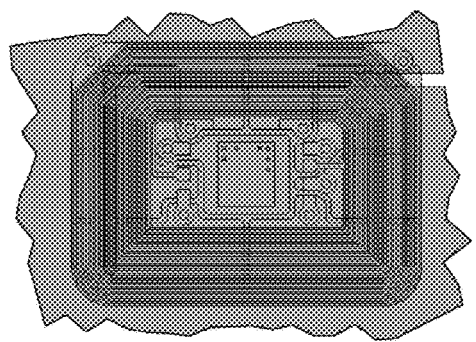

FIGS. 3C and 3D are plan views of the rear surface of a metal layer (ML) or metal card body (MCB) with a slit (S), with the metal covering the entirety of the module antenna (MA), according to an embodiment of the invention.

Figure 3E:
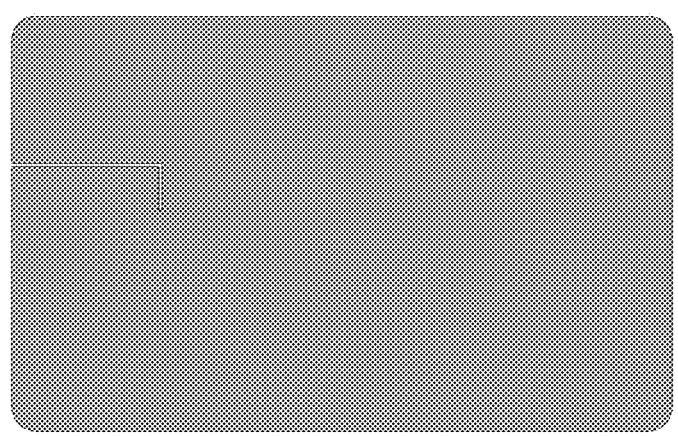

FIG. 3E is a diagram, in plan view, illustrating a metal layer (ML) or metal card body (MCB) with a slit (S) which does not extend to an opening, according to an embodiment of the invention.

FIGS. 4A and 4B are diagrams, in plan view, showing a front and rear surface of a metal layer (ML) or metal card body (MCB) acting as a coupling frame (CF) with a slit (S), according to an embodiment of the invention.

FIGS. 4C and 4D are plan views of the rear surface of a metal layer (ML) or metal card body (MCB) with a slit (S), with the metal covering the entirety of the module antenna (MA), according to an embodiment of the invention.

FIG. 4E is a diagram, in plan view, illustrating a metal layer (ML) or metal card body (MCB) with a slit (S) which does not extend to an opening, according to an embodiment of the invention.

Figure 5A:
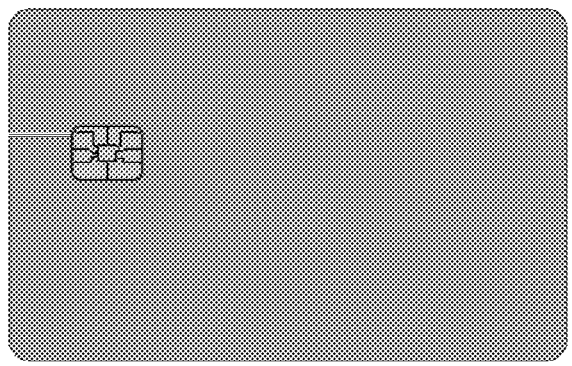
Figure 5B:
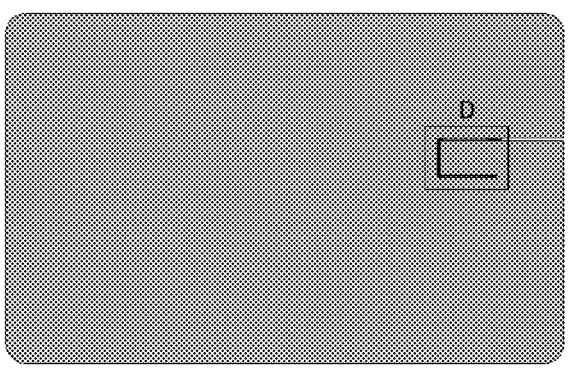

FIGS. 5A and 5B are diagrams, in plan view, showing a front and rear surface of a metal layer (ML) or metal card body (MCB) acting as a coupling frame (CF) with a slit (S) in the metal beginning at a perimeter edge in the direction of the transponder chip module (TCM), according to an embodiment of the invention.

Figure 5C:
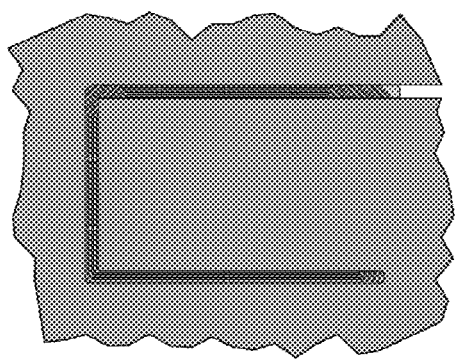
Figure 5D:
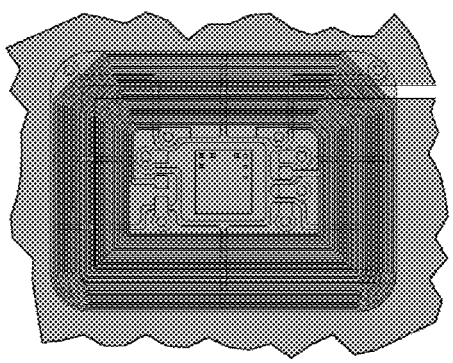

FIGS. 5C and 5D are plan views of the rear surface of a metal layer (ML) or metal card body (MCB) with a slit (S), with the metal covering the entirety of the module antenna (MA), according to an embodiment of the invention.

Figure 5E:
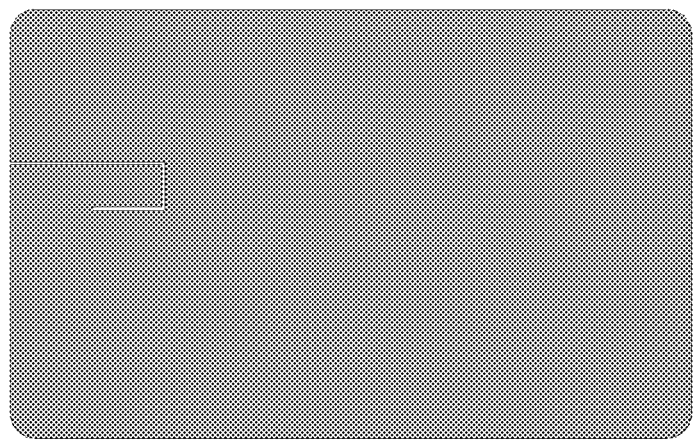

FIG. 5E is a diagram, in plan view, illustrating a metal layer (ML) or metal card body (MCB) with a slit (S) which does not extend to an opening, but partially surrounding three sides (or 270°) of an area designated for an opening, according to an embodiment of the invention.

FIGS. 6A-6E are illustrations of coupling frames with a slit of different width and orientation, all showing an opening with various rectangular dimensions, with the slit partially surrounding two sides (or 180°) or three sides (or 270°) of the opening, according to an embodiment of the invention.

Figure 6A:
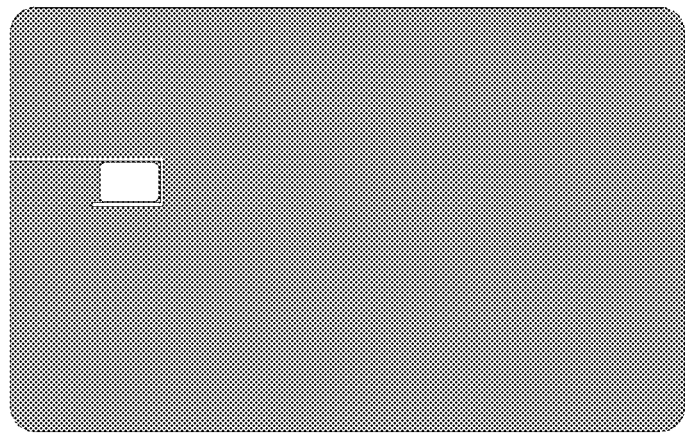
Figure 6B:
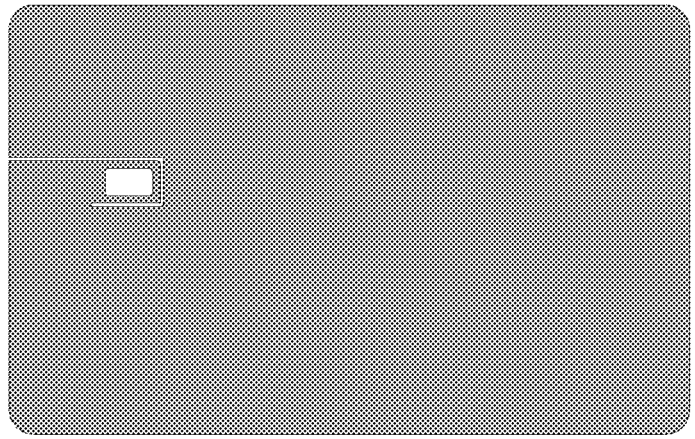
Figure 6C:
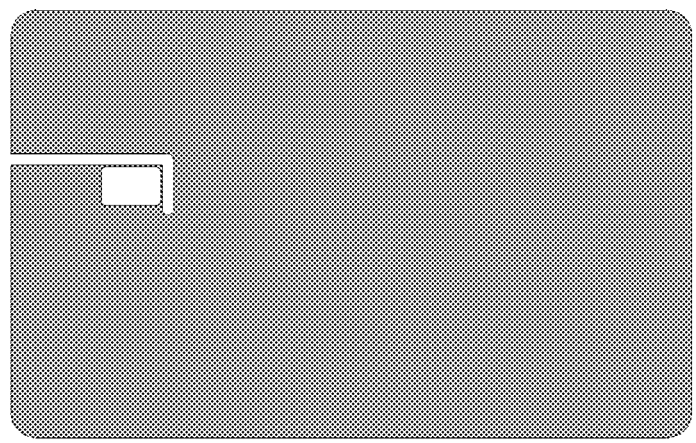
Figure 6D:
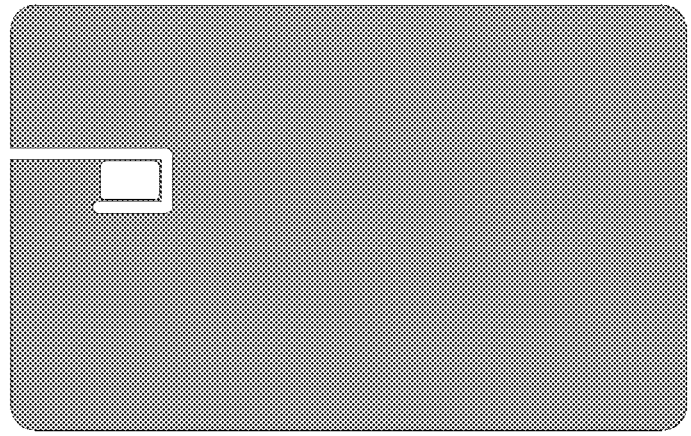
Figure 6E:
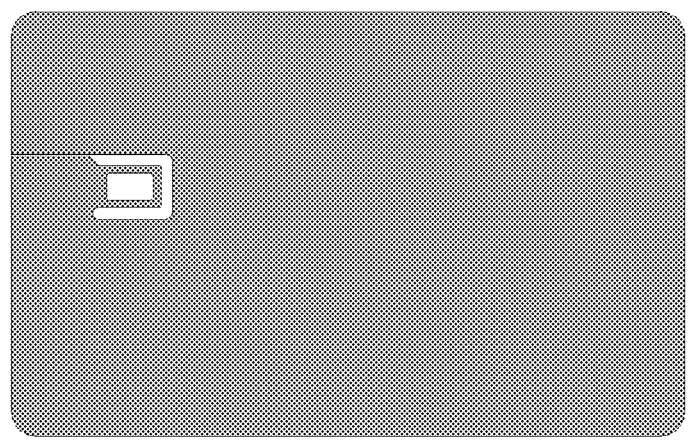
Figure 6F:
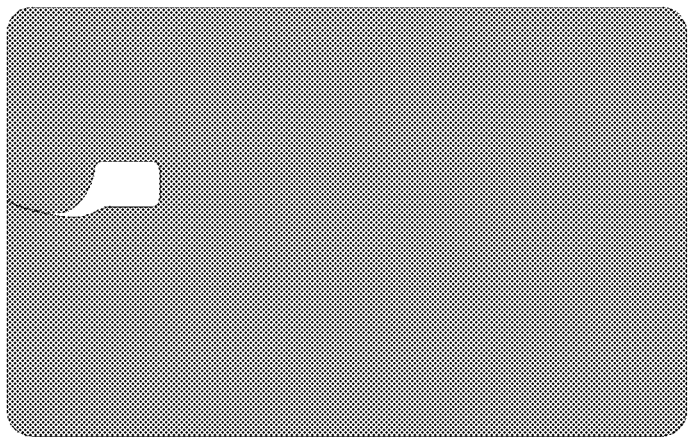
Figure 6G:
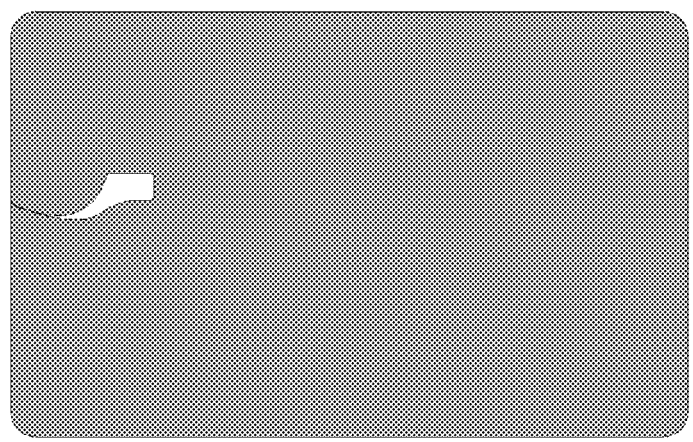
Figure 6H:
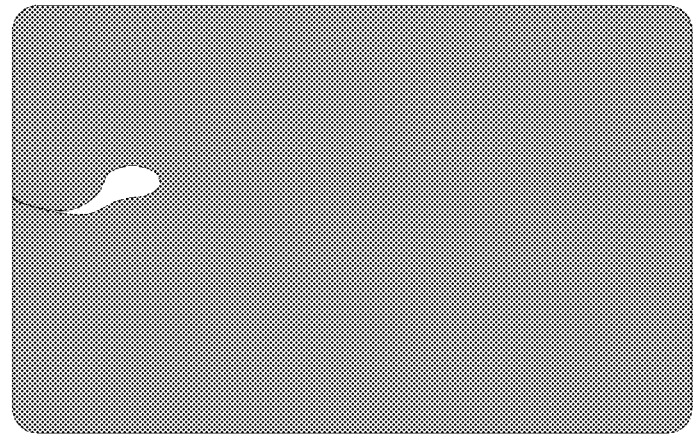

FIGS. 6F-6H are illustrations of coupling frames with a slit of changing width and orientation extending to an opening of changing shape and geometry, according to an embodiment of the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

Boosting the RF Performance of an RFID enabled Metal Transaction Card RFID slit technology as described by the Prior Art focuses on the slit (S) in a metal card body (coupling frame) overlapping the module antenna (MA) on the face-down-side of a transponder chip module (TCM), and with contact pads (having for example 8 pins) on its face-up side. The module antenna (MA) comprises an antenna structure (AS) which has been etched from a conductive foil on a carrier tape (CCT) or module tape (MT) to have a conductor having two ends and arranged in a spiral pattern which has a number of turns or windings (such as 13-16) which may be referred to as "tracks", and separated by spaces. An end portion of an antenna structure (AS) may also comprise of a quarter, half or three-quarters of a turn (fractions of a turn). Various slit designs are described and illustrated in the Prior Art. The slit (S) in the coupling frame (CF) may overlap at least a portion of the module antenna (MA) in the transponder chip module (TCM).

However, the prior art is silent on the entry point of the slit (S) relative to the configuration and geometries of the module antenna (MA) in a transponder chip module (TCM). It does not mention the shape or form of the slit (S) under the area of the module antenna (MA). It does not consider the orientation of the slit (S) in following the pathway of the module antenna (MA) and the implications on surface current flows from self and mutual inductance (positive and negative).

The prior art merely describes a module opening (MO) and a slit (S) which ends at the module opening (MO), and therefore the slit (S) does not continue beyond this opening (MO), it terminates at the opening (MO). Therefore, the prior art does not consider a continuous slit starting at a periphery edge and ending at another periphery edge of the card body, with the slit construction supported by an underlying layer. Nor does it consider a slit (S) starting at a periphery edge, entering the module area, and following the path of the module antenna (MA), without entering the module opening (MO).

In an embodiment of the invention, a discontinuity commencing at a periphery of a metal layer or a metal card body (coupling frame) exposed to an electromagnetic field extends to an inner area underlying the module antenna (MA) of an inductive coupling chip module having a contact and contactless interface, or underlying any antenna structure (including circuitry thereof) used to power an electronic device or component by picking up or coupling to surface current flows along the metal edges of the discontinuity. The contact side (face-up side) of the inductive coupling chip module may have 6 or 8 contact pads including one or two connection bridges and isolated metal features, while the bond side (face-down side) may have a module antenna with multiple windings, vertical interconnections to the contact side, plating lines, connection traces, and bond pads for wire bonding to the RFID chip. The alternative to wire bonding is flip chip bonding. The module antenna (MA) may have a round, oval, elliptical, rectangular or an elongated shape. The discontinuity may follow the path or form of the module antenna (MA) overlapping its antenna tracks. The overlapping may be across the antenna tracks (transverse or perpendicular to the windings) or along the tracks (parallel to the windings) or a combination thereof. The overlap may be across or along one side, two sides or three sides of the module antenna (MA); or almost across or along all four sides of the module antenna (MA).

Partial overlap may also be applicable depending on the start and end position of the discontinuity in following the path or form of the module antenna (MA) or the antenna structure (AS). In following the path or shape of the module antenna (MA), the discontinuity may be straight, angled, curved or a combination thereof. In some cases, the module opening (MO) may not be physically present.

The entry point of the discontinuity from the periphery into the area of the module antenna (e.g. rectangular in shape) may come from the left or right side of its vertical windings (tracks), come from the top or bottom side of its horizontal windings, from any of its corner positions, or from an offset position to the aforementioned.

The entry point of the discontinuity may be at a positional center point in the vertical or horizontal windings, may be at an upper or lower offset position to the center point of the vertical or horizontal windings, or may be at a corner edge where the direction of the windings change.

The entry point of the discontinuity may be straight, curved, or at an angle (e.g., other than perpendicular) to the windings.

The width of the discontinuity in passing over the windings of the module antenna (MA) may change (vary, be optimized) to improve the inductive coupling.

From an RF performance perspective when considering a rectangular module antenna (MA), the preferred direction of the discontinuity in overlapping the windings of the module antenna (MA) is parallel thereto, but depending on the shape of the discontinuity, it will eventually cross over, pass under or jump over the windings at a section, edge or side position of the windings in a perpendicular fashion.

An opening in the metal layer or metal card body may exist to accept the shape and size of the mold mass (encapsulation) on the rear side (face-down) of the inductive coupling chip module. The discontinuity does not need to extend to the opening. Therefore, the discontinuity, for example in the form of a slit, and at least a portion of the slit (S) does need to overlap at least a portion of the module antenna (MA) to inductively couple with the surface currents.

The slit (discontinuity) should extend into an interior area of the card body from the periphery thereof, and may follow the contour (or shape) of the module antenna (MA). The slit need not reach the module opening (MO), and may therefore be separate from the module opening.

The discontinuity may observe the polarity of the current flows of the module antenna (MA) by following its tracks (windings) on one, two or on three sides only, to avoid a change in current flow direction leading to negative mutual inductive current flows. In other words, the discontinuity may have an L- or U-shaped (fishhook) structure or may be simply straight. The discontinuity may follow a clockwise or anticlockwise direction.

In additional embodiment of the invention, the discontinuity in the metal layer (ML) or metal card body (MCB) may pass under the contact pads (CPs), connection bridge(s) and/or isolated metal features formed on the face-up side (contact side) of the inductive coupling chip module and directly overlap the etched antenna structure, vertical interconnections to the contact pads or connection bridge or the plating line on the bond side (face-down side) of said inductive coupling chip module.

The discontinuity may merely overlap the vertical interconnect (Via) to a connection bridge (CBR) and or a coupling loop antenna (CLA) track which may couple very closely with the module antenna (MA).

The discontinuity may be regarded as a channel which wraps itself around the windings of a module antenna (MA) or an antenna structure (AS).

FIG. 1A is a diagram (plan view) of the contact side of a six pin dual interface (DI) chip module (aka a transponder chip module (TCM) or an inductive coupling chip module (ICM)), showing the contact pads (CPs) and their assignment, a connection bridge (CBR) and a plating line.

FIG. 1B is a diagram (plan view) of the bond side of a six pin dual interface (DI) chip module showing a module antenna (MA) or planar antenna (PA) and conductive traces above an array of contact pads (CPs), a connection bridge (CBR) and a plating line.

FIG. 1C is a diagram (plan view) illustrating the wire bond connections to an RFID chip (IC), the thru-hole plating vertical interconnections from the front face (contact side) to the rear face (bond side), and the $L_A$ and $L_B$ connections to the module antenna (MA) having a conventional rectangular spiral geometry. The connection bridge (CBR) connects the outer winding of the module antenna (MA) to $L_B$ of the RFID chip (IC) via a wire bond.

FIGS. 2A and 2B are diagrams, in plan view, showing a front and rear surface of a metal layer (ML) or metal card body (MCB) acting as a coupling frame (CF) with a straight slit (S) in the metal beginning at a perimeter edge in the direction of the transponder chip module (TCM) and entering the area of the transponder chip module (TCM) at the top left hand side of the contact pad arrangement. FIG. 2B shows the directional path of the slit (S) and an opening on the rear side of the metal card body (MCB) to accommodate the mold mass of a TCM. The RFID chip (IC) is wire bonded to the module tape (MT) and protected by an encapsulation (aka mold mass).

FIGS. 2C and 2D are plan views of a module antenna (MA) on the bond side of a six pin transponder chip module (TCM) with multiple windings (tracks) with the slit (S) in the metal layer (ML) entering the module area and overlapping the top horizontal windings and following the path of the module antenna (MA) to the vertical windings. The overlap of the slit (S) with the planar antenna (PA) tracks is approximately 50%. An opening is provided in the metal layer (ML) to accommodate the mold mass of the transponder chip module (TCM). FIG. 2D illustrates the complete outline of the circuitry on the bond side of the TCM, covered by the metal layer (ML) with slit (S) and opening.

FIG. 2E is a diagram, in plan view, illustrating a metal layer (ML) or metal card body (MCB) with a slit (S) and an opening to accept the shape and dimensions of the mold mass of a transponder chip module (TCM). Notably, the slit (S) does not extend to the opening, but partially surrounding two sides (or 180°) of the opening.

FIGS. 3A and 3B are diagrams, in plan view, showing a front and rear surface of a metal layer (ML) or metal card body (MCB) acting as a coupling frame (CF) with a straight slit (S) in the metal beginning at a perimeter edge in the direction of the transponder chip module (TCM) and entering the area of the transponder chip module (TCM) at the top left hand side of the contact pad arrangement. FIG. 3B shows the directional path of the slit (S) and no opening is present on the rear side of the metal card body (MCB). The RFID chip (IC) is assembled by means of flip chip technology to the module tape (MT), having a low-profile height.

FIGS. 3C and 3D are plan views of the rear surface of a metal layer (ML) or metal card body (MCB) with a slit (S), with the metal covering the entirety of the module antenna (MA) on the bond side of a six pin transponder chip module (TCM) with multiple windings (tracks), and the slit (S) in the metal layer (ML) entering an area covering the module antenna (MA) which overlaps the top horizontal windings and follows the tracks of the module antenna (MA) to the vertical windings. The overlap of the slit (S) with the planar antenna (PA) tracks is approximately 50%. No opening is provided in the metal layer (ML). FIG. 3D illustrates the complete outline of the circuitry on the bond side of the transponder chip module (TCM), covered by the metal layer (ML) with slit (S) and no opening.

FIG. 3E is a diagram, in plan view, illustrating a metal layer (ML) or metal card body (MCB) with a slit (S) which does not extend to an opening.

FIGS. 4A and 4B are diagrams, in plan view, showing a front and rear surface of a metal layer (ML) or metal card body (MCB) acting as a coupling frame (CF) with a slit (S) in the metal beginning at a perimeter edge in the direction of the transponder chip module (TCM) and entering the area of the transponder chip module (TCM) at a right angle to the top right hand corner of the contact pad arrangement. FIG. 4B shows the directional path of the slit (S) and no opening is present on the rear side of the metal card body (MCB). The RFID chip (IC) is assembled by means of flip chip technology to the module tape (MT), having a low-profile height.

FIGS. 4C and 4D are plan views of the rear surface of a metal layer (ML) or metal card body (MCB) with a slit (S), with the metal covering the entirety of the module antenna (MA) on the bond side of a six pin transponder chip module (TCM) with multiple windings (tracks), and the slit (S) in the metal layer (ML) entering an area covering the module antenna (MA), overlapping the vertical windings on the right hand side of the module antenna (MA) including the vertical interconnect (Via) to the connection bridge (CBR). No opening is provided in the metal layer (ML). FIG. 4D illustrates the complete outline of the circuitry on the bond side of the transponder chip module (TCM), covered by the metal layer (ML) with slit (S) and no opening.

FIG. 4E is a diagram, in plan view, illustrating a metal layer (ML) or metal card body (MCB) with a slit (S) which does not extend to an opening.

FIGS. 5A and 5B are diagrams, in plan view, showing a front and rear surface of a metal layer (ML) or metal card body (MCB) acting as a coupling frame (CF) with a slit (S) in the metal beginning at a perimeter edge in the direction of the transponder chip module (TCM) and entering the area of the transponder chip module (TCM) at the left hand side of the contact pad arrangement and forming a u or fish-hook shape. FIG. 5B shows the directional path of the slit (S) and no opening is present on the rear side of the metal card body (MCB). The RFID chip (IC) is assembled by means of flip chip technology to the module tape (MT), having a low-profile height.

FIGS. 5C and 5D are plan views of the rear surface of a metal layer (ML) or metal card body (MCB) with a slit (S), with the metal covering the entirety of the module antenna (MA) on the bond side of a six pin transponder chip module (TCM) with multiple windings (tracks), and the slit (S) in the metal layer (ML) entering an area covering the module antenna (MA), overlapping the top horizontal windings, the vertical windings on the right hand side of the module antenna (MA), the bottom horizontal windings and the vertical interconnects to the connection bridge (CBR) and plating line. The slit (S) also overlaps portions of the connection bridge (CBR) and plating line. The overlap of the slit (S) with the planar antenna (PA) tracks is approximately 50%. No opening is provided in the metal layer (ML). FIG. 5D illustrates the complete outline of the circuitry on the bond side of the transponder chip module (TCM), covered by the metal layer (ML) with slit (S) and no opening.

FIG. 5E is a diagram, in plan view, illustrating a metal layer (ML) or metal card body (MCB) with a slit (S) which does not extend to an opening, but partially surrounding three sides (or) 270° of an area designated for an opening.

An alternative configuration of the diagrams described above may include an opening dimensioned to be the size of the inner windings of the module antenna (MA). The shape of the opening may be rectangular or any form such as round, oval or diamond shape without perpendicular and parallel sides.

FIGS. 6A to 6E are illustrations of coupling frames with a slit of different width and orientation, all showing an opening with various rectangular dimensions, with the slit partially surrounding two sides (or 180°) or three sides (or 270°) of the opening.

FIGS. 6F to 6H are illustrations of coupling frames with a slit of changing width and orientation extending to an opening of changing shape and geometry.

Some Improvements to RFID Slit Technology

The current invention makes use of the surface eddy currents which flow along the perimeter edge of a conductive surface such as a metal layer (ML) or metal card body (MCB) which has been exposed to electromagnetic waves, generated by a contactless reader or point of sale terminal. The intensity of such eddy currents at the frequency of interest is a maximum along the skin depth of the metal at its perimeter edge. The skin depth of copper, for example, at 13.56 MHz is approximately 18 μm.

The distance in which a slit (S), gap (G) or notch (N) needs to extend from the perimeter edge across the metal layer (ML) or metal card body (MCB), concentrating the surface current density, needs to be a substantial multiple of the skin depth distance to facilitate the diversion of current. Notably, the slit (S), gap (G) or notch (N) passes entirely through the metal layer (ML, MCB). The shape of the slit or notch can be straight, curved, angled, u-shaped or have the form of a musical instrument such as a saxophone, signature (clef) or the name of a payment scheme.

A slit (S) in a metal layer (ML) or metal card body (MCB) to function as a coupling frame (CF) may extend from a perimeter edge to an opening (MO) in the layer or card body. The opening (MO) may be regarded as an extension of the slit (S), allowing the surface current to be directed and to flow around the inner edges of the opening. In the case of a metal layer (ML) or metal card body (MCB) without an opening, the surface current may be directed in another manner to the transponder chip module (TCM), by physically connecting a flexible circuit (FC) or flex-tape to termination points (TP) on each side of the slit (S).

Such metal transaction cards may comprise (i) a metal card body (MCB) with a slit (S) acting as a coupling frame (CF) having termination points (TP) on each side of the slit (S), (ii) a coupling loop antenna (CLA) with two end portions tightly coupled to a module antenna (MA) connected to an RFID chip (IC) in a transponder chip module (TCM) and (iii) the end portions of the coupling loop antenna (CLA) are electrically connected to the termination points (TP) on each side of the slit (S) of the coupling frame (CF).

FIG. 3A of 62/886,370 is a plan view of a transponder chip module (TCM) having a coupling loop antenna (CLA) having two end portions (or ends).

FIG. 3B of 62/886,370 is a plan view of a transponder chip module (TCM) having a coupling loop antenna (CLA) which may be intertwined with a module antenna (MA).

The coupling loop antenna with connection pads for attachment to the termination points (TPs) on the metal layer (ML) may be a flexible tape, a FR4 material, a kapton film or any sort of flexible circuit (FC) with conductive traces and circuit elements.

FIG. 4 of 62/886,370 is a plan view of a smartcard (SC) having a card body (CB) which may be a metal layer (ML) or a metal card body (MCB), with a slit (S) to function as a coupling frame (CF), and showing a transponder chip module (TCM) having a module antenna (MA) and a coupling loop antenna (CLA), showing ends of a coupling loop antenna (CLA) which may be electrically connected with termination points (TP) on a coupling frame (CF).

In a different iteration of the above without a physical interconnection to termination points (TPs) across the slit (S), the coupling loop antenna (CLA) on a flexible circuit (FC) may be connected to a sense coil (SeC) which in turn inductively captures surface currents by overlapping the metal edge of the slit (S).

In a further iteration of the abovementioned, the coupling loop antenna (CLA) may be a single turn on a flexible circuit (FC). The coupling loop antenna as a single track (with a width of approximately 1.25 mm) having the same shape as the module antenna (MA) in the transponder chip module (TCM) may overlap the module antenna (MA) with a track width having multiple turns of 2.5 mm, so that the overlap of the single turn represents 50% of the windings of the module antenna in terms of area. The antenna structures on the flexible circuit (FC) may also be referred to as a coupling loop structure (CLS) as described below.

A sense coil (SeC), patch antenna (PA) or pick-up coil (PuC) may be used to inductively couple with a metal layer (ML) or metal card body (MCB) having a slit (S) to function as a coupling frame (CF) when the metal is exposed to electromagnetic waves generated by a contactless reader or point of sale terminal operating at an ISM frequency of interest, for example at 13.56 MHz.

The sense coil (SeC), patch antenna (PA) or pick-up coil (PuC) may overlap the slit (S) or may be integrated within the area of a slit (S) or gap (G).

For a metal layer (ML) or metal card body (MCB) without a slit (S), the sense coil (SeC), patch antenna (PA) or pick-up coil (PuC) may overlap a perimeter edge of the metal layer (ML) or metal card body (MCB). In a transaction card comprising a metal substrate and a non-conductive substrate, the sense coil, patch antenna or pick-up coil overlaps the interface of the two materials, namely at the junction between the conductive and non-conductive materials.

FIG. 7 of 62/887,696 shows a front view of a metal-containing smartcard having a portion of the card body made of a transparent or translucent material while the rest of the card body is made of metal, with the transponder chip module implanted in the area interfacing the transparent material and the metal.

For the purpose of clarity, the non-conducting material interfacing the conductive material may be extruded plastic, injected molded plastic, laminated plastic or any non-conductive material such as wood, ceramic, precious stone, etc., while the conductive material may be any sort of metal, metal mesh, metal grid or any conductive material or a conductive composite comprising metal filings, metal fiber or conductive nanomaterials.

Given that the emitted magnetic field strength from a contactless point of sale terminal according to ISO 14443 should range between 1.5 and 7.5 A/m, multiple slits (S) or slits combined with an opening or module opening (MO) in and at the perimeter of a metal layer (ML) or metal card body (MCB), sized to ISO dimensions (7810/7816 standard) may be able to drive several components without loss in inductive power. Slits, formed in a metal layer (ML), which are positioned at opposite ends or opposing ends of a card body, with a sense coil (SeC), patch antenna (PA) or pick-up coil (PuC) overlapping each slit for inductive coupling, with each individual sense coil, patch antenna or pick-up coil being capable of coupling sufficient current/voltage to drive a circuit or a component. Because of the physical dimensions of a standard ID-1 card body (86 mm×54 mm) containing metal, there is ample conductive area to capture the surface eddy current density at different slit positions to individually power a circuit or component such as an RFID chip, sensor, display, or any electronic device.

U.S. Pat. No. 10,193,211 (29 Jan. 2019; Finn et al.) may disclose that the contactless (EMV) performance of a metal card body (MCB) having a slit (S) and a module opening (MO) to accept a transponder chip module (TCM) can be increased by placing and physically connecting a capacitor across the slit. Reference is made to A sense coil (SeC), patch antenna (PA) or pick-up coil (PuC) on a flexible circuit (FC) connected to a transponder chip module (TCM) or inductively coupled with the module antenna (MA) of a transponder chip module (TCM) may have a capacitor mounted on the flexible circuit (FC) and connected in parallel or series with the SC, PA or PuC or between antenna structures (SC, PA, PuC, and or the MA of the TCM), to boost the contactless performance.

The contactless EMV performance of a metal layer (ML) or metal card body (MCB) having a slit and a module opening (MO) is best achieved when the slit is straight. However for mechanical stability of a metal card body, the shape, length and width of the slit or slits and the position of the slit or slits relative to the module opening (MO) in a given metal layer having a well-defined thickness and weight, may command a deviation in the dimensions, position, form and orientation of the slit or slits.

A sense coil (SeC), patch antenna (PA) or pick-up coil (PuC) described herein, may have an antenna structure (AS) which wraps around a slit (S) entirely or partially with the windings or turns of the antenna structure (AS) overlapping the metal area enclosing or partially surrounding the slit (S) as shown below; an antenna structure (AS) with its winding or turns meandering within the free space area of a slit (S) with said windings or turns in very close proximity to the metal; an antenna structure (AS) with its windings or turns running parallel to the metal and overlapping the metal in equally portions (e.g. 50% overlap) or significantly overlapping the metal; an antenna structure (AS) with its windings or turns running perpendicular to the metal and overlapping the metal in equally portions (e.g. 50% overlap) or significantly overlapping the metal; an antenna structure (AS) with its windings or turns having at least one turn with a plethora of possible shapes and orientations such as round, oval, rectangular, elongated, frame, spiral, planar, three dimensional, etc. The antenna structure (AS) may include blind turns, vertical interconnects, traces for RLC devices and connection bridges. The design of the antenna structure (AS) overlapping or in close proximity to the metal enclosing or partially surrounding the slit may be optimized to minimize the current flow cancellations from changes in the direction of the windings or turns forming the antenna structure (AS). For example, if the antenna structure (AS) has windings or turns which run perpendicular to the metal, the directional change of the windings or turns (depending on the number of turns and shape of the antenna structure (AS)) may result in mutual current cancellations, which can be prevented if the perpendicular wire crossovers are reduced and the parallel traces or tracks are kept long relative to those of the perpendicular.

U.S. 63/040,544 shows a diagram (plan view) of a coupling frame (CF) and a sense coil (SeC) wrapped around the slit (S) of the coupling frame (CF), with the sense coil (SeC) having an elongated form factor.

An alternative to termination points (TPs) across a slit (S) on a coupling frame (CF) for the physical connection to a flexible circuit (FC) with a coupling loop antenna (CLA) for close coupling with the windings of a module antenna (MA) or antenna structure (AS) in a transponder chip module, is the galvanic connection (first electrode) to a metal probe (MP) positioned within the area of the slit (S) or gap (G) and a galvanic connection (second electrode) to a position near the slit (S) or gap (G) on the coupling frame (CF) forming a metal layer (ML) in a card body (CB), with said two galvanic connections directed to a coupling loop antenna (CLA) forming part of a module antenna (MA) or antenna structure (AS) in a transponder chip module (TCM). The two galvanic connections to the metal probe (MP) and the coupling frame (CF) may also be directed on a flexible circuit (FC) to a coupling loop structure (CLS) for inductive coupling with the module antenna (MA) of a transponder chip module (TCM).

In a metal card body (MCB) with multiple metal layers (MLs), the slits in each metal layer (ML) may overlap. In the case of a metal layer with a slit to accommodate a metal probe, the subsequent metal layers may have a standard slit design.

Reference is made to the following:

Title: "Dual Interface Transponder Chip Modules with an Electrical Connection to a Coupling Frame"

This disclosure relates to the field of RFID enabled metal transaction cards and, more particularly, metal transaction cards having a transponder chip module (TCM) (aka an inductive coupling chip module (ICM)) with the module antenna (MA) paired to a coupling loop antenna (CLA) with the end portions of the antenna galvanically connected to termination points across a discontinuity in the metal card body.

(E102)
Inventor(s): Finn
Ser. No. 62/886,370
Filing Date: 14 Aug. 2019
(E102v2)
Inventor(s): Finn
Ser. No. 62/981,040
Filing Date: 25 Feb. 2020

The coupling loop antenna (CLA) disclosed herein, with a start and end contact pad (connection taps) having at least one antenna turn, may be physically connected to opposing positions across a slit or discontinuity in a conductive surface such as a metal layer (ML) in the form of a smartcard body, aka a coupling frame (CF). The connection (galvanic) between the opposing points on a slit (including a slit extending from a perimeter edge of a metal card body (MCB) to an opening to accept a transponder chip module (TCM)) permits a direct conduction path from the coupling frame (CF) to the coupling loop antenna (CLA) (with at least one antenna turn) in the transponder chip module (TCM). When the coupling frame (CF) is exposed to an electromagnetic field, the surface eddy currents flow along its perimeter edge and into the slit or discontinuity, and by means of the connection taps the surface eddy current density concentrates around the area of the coupling loop antenna (CLA) formed on the front or rear face of a transponder chip module (TCM).

The antenna structure (AS) or module antenna (MA) disclosed herein may be a chemical or laser etched planar antenna (PA) having several windings which intertwine with the coupling loop antenna (CLA) to form a transformer circuit. The coupling loop antenna (CLA) may be adjacent to the windings of the antenna structure (AS). The coupling loop antenna (CLA) may overlap the windings of the antenna structure (AS). The antenna structure (AS) and or coupling loop antenna (CLA) may be stacked on multiple independent layers in a transponder chip module (TCM). The purpose of the coupling loop antenna (CLA) is to efficiently concentrate the surface eddy current density at close proximity to the antenna structure (AS) of the transponder chip module (TCM), to enhance read/write performance.

The combination of a coupling loop antenna (CLA) (having at least one antenna turn) with an antenna structure (AS) connected to the RFID chip (IC) is particularly advantageous for the small form factor of a 6 pad or pin DI chip module.

The conductivity of the coupling loop antenna (CLA) may be greater than the conductivity of the coupling frame (CF) with slit (S), providing a path of less electrical resistance for the flow of surface current to the area around the module antenna (MA) of the transponder chip module (TCM).

The coupling loop antenna (CLA) may be physically connected across one slit (S) in a coupling frame (CF), across several slits arranged in a coupling frame or between slits in a stack of coupling frames making up a card body.

The coupling loop antenna (CLA) may be connected to a sense coil or patch antenna which overlaps at least one slit (S) in a coupling frame (CF) and by means of induction powering the transponder chip module (TCM).

The connection bridges (CBR) disclosed herein may facilitate implementing features such as clock-wise and anti-clockwise windings, or interleaving between antenna tracks.

The number of turns or windings of the module antenna (MA, AS) is dependent on the electrical parameters of the RFID chip (IC) and the required system frequency (SF) of the smartcard, in general slightly above the ISM frequency of 13.56 MHz for contactless payment.

To regulate the system frequency (SF), a capacitor (C) may be connected across the coupling loop antenna (CLA), placed in series or parallel with the antenna structure (AS), or connected across the coupling loop antenna (CLA) and antenna structure (AS, MA).

The termination points on the coupling frame (CF) may be roughened by means of laser ablation to remove any oxidation and to enhance the electrical contact with the interfacing medium forming the connection with the end portions (contact pads) of the coupling loop antenna (CLA). The interfacing medium for the two connections may be conductive glue, flexible bumps, solder, or conductive gaskets. Equally, the electrical connection can be achieved by ultrasonic welding, mechanical compression, clamping or laser welding.

The physical connection of the transponder chip module (TCM) to the coupling frame (CF) has a dual purpose of strengthening the area around the slit.

A dual interface metal card may have a recess to accommodate a magnetic stripe which is chemically etched to avoid demagnetization of the magnetic stripe by the metal which may be magnetized during conventional CNC milling.

The module antenna (MA, AS) of the transponder chip module (TCM) does not need to overlap with a card body coupling frame by means of inductive coupling, so as to enable contactless communication with an external reader at a distance of 4 cm from the center of technology (chip module position), to be compliant with the EMV standard.

The slit (S) in the coupling frame (CF) may extend only partially into the coupling frame (CF) without reaching the area reserved for the transponder chip module (TCM) in a smartcard (SC). The module opening (MO) may be sized greater than the transponder chip module (TCM) leaving an isolation gap between the coupling frame (CF) and the module antenna (MA).

The DI chip module may have 6 contact pads, instead of the larger version with 8 contact pads taking up valuable real estate on a card body.

The metal card body may retain its metallic acoustic sound when tossed on a hard surface, by careful selection of the adhesive system and dielectric between metal layers, a metal layer and a panel or a metal layer and an insert. Metal laminate cards render the drop acoustics of the card to sound like plastic rather than metal, because of the adhesive and insulating medium between metal layers.

Non-conductive material may be used to fill the rear module opening in a metal card body with a material that provides strength while at the same time being aesthetically pleasing. Such material could be hard wood such ebony.

Notably, a coupling frame (CF) can be replaced by a one turn antenna (aka coupling frame antenna (CFA)) in which the slit or discontinuity is replaced by an isolation gap between the start and end of the antenna track. In this particular configuration, the coupling loop antenna (CLA) is connected to the end portions of the single turn antenna.

The presence of the metallic coupling frame (CF), and other metallic components such as, but not limited to contact pads (CP) in the smartcard (SC) may upwardly shift (up-shift) the resonant (or resonance) frequency of the transponder chip module (TCM).

In general, the frequency of the transponder chip module (TCM) may be set to a frequency lower than 13.56 MHz so that when it is up-shifted by the coupling frame (CF), or other metallic components, it is higher than 13.56 MHz. The lowered frequency of the module itself may be 13 MHz+/− 0.3 (below the ISO spec); and the up-shifted frequency may be approximately 14 MHz (above the ISO spec).

With the addition of the coupling loop antenna (CLA) in combination with the module antenna (MA) connected to the RFID chip (IC) in the transponder chip module, the system frequency, resonance curve and Q factor may be optimized for RF performance.

FIG. 5 of 62/886,370 is a plan view of a smartcard (SC) having a card body (CB) which may be a metal layer (ML) or a metal card body (MCB), with a slit (S) to function as a coupling frame (CF), and showing an inductive coupling chip module (ICM) having a module antenna (MA) and a coupling loop antenna (CLA), with the end portions (wire-ends) of the coupling loop antenna (CLA) connected to a patch antenna to pick up surface currents around the area of the slit or opening by means of inductive coupling.

In summary, smartcards having (i) a metal card body (MCB) with a slit (S) acting as a coupling frame (CF) having termination points (TP) on each side of the slit (S), (ii) a coupling loop antenna (CLA) with two end portions tightly coupled to a module antenna (MA) connected to an RFID chip (IC) in a transponder chip module and (iii) the end portions of the coupling loop antenna (CLA) are electrically connected to the termination points (TP) on each side of the slit (S) of the coupling frame (CF).

A front metal layer may be continuous (no slit), and may be shielded from underlying metal layers by a shielding layer (SL). Metal backing inserts (MBI) reinforcing the slit(s) may also have a slit.

Such cards may be contactless only, contact only, or may be dual-interface (contact and contactless) cards.

Connection bridges (CBR) for dual-interface transponder chip modules (TCM) may have an area which is substantially equal to or greater than an area of a contact pad (CP) of a contact pad array (CPA). A given connection bridge may be L-shaped or a split T-shaped and may comprise (i) a first portion disposed external to the contact pad array and extending parallel to the insertion direction, and (ii) a second portion extending from an end of the first portion perpendicular to the insertion direction to within the contact pad array (CPA) such as between $C_1$ and $C_5$. The connection bridges may facilitate the jump overs between the coupling loop antenna (CLA) and the module antenna (MA) of the transponder chip module (TCM).

A connection bridge may extend around a corner of the contact pad array, may be large enough to accommodate wire bonding, and may be integral with a coupling loop antenna (CLA) extending around the contact pad array. The transponder chip modules may be integrated into a smartcard (SC).

Metal Card Bodies without a Slit Extending to a Module Opening

In all representations of the RFID slit technology in the Prior Art, the transponder chip module (TCM) comprises an RFID chip (IC) connected to a module antenna (MA) on the same substrate or module tape (MT). In all disclosures of dual interface chip cards (DI chip cards), the slit (S) always extends from a perimeter edge to a module opening (MO), without considering that the slit (S) may not need to extend to the module opening (MO) in order to operate as a coupling frame (CF).

Smartcard with Coupling Frame

FIG. 1 (FIG. 3 of U.S. Pat. No. 9,836,684) is a diagrammatic view of a front surface of a smartcard (SC) according to the Prior Art which may be a metal card, composite metal card or encapsulated metal card having a slit (S) to function as a coupling frame (CF).

It illustrates the front side of a smartcard (SC) 300 which may be a metal card having a metal layer (ML), which may constitute substantially the entire thickness of the card body (CB) 102. The card body (CB) may have a module opening (MO) 108 wherein a transponder chip module (TCM) 110 may be disposed, and a slit (S) 130 extending from the module opening (MO) to the outer perimeter of the metal layer (ML) so that the metal card body (MCB) 102 may function as a coupling frame (CF) 120. The metal layer (ML) (or card body CB, or metal card body MCB) may comprise titanium, and is provided with a slit, slot or gap in the metal to create an open loop coupling frame closely adjacent to and substantially fully surrounding the transponder chip module (TCM). The slit (S) may overlap a portion of the module antenna (MA) 112 of the transponder chip module (TCM).

From the teachings of '684, it is apparent that the slit (S) extends from a perimeter edge of the metal card body (MCB) to a module opening (MO) to accept a transponder chip module (TCM), whereby the slit (S) may overlap a portion of the module antenna (MA) of the transponder chip module (TCM).

Module Opening without a Slit Extending Thereto

The slit (S) does not need to extend to the module opening (MO) to function as a coupling frame (CF), and the module antenna (MA) does not need to overlap a slit (S) to capture surface currents. In fact, the module antenna (MA) needs to overlap a metal edge (ME) which is not mentioned in the Prior Art.

FIG. 2 of 62/886,978 (E103) is a diagrammatic view of an internal rear surface of a metal face transaction card (aka metal hybrid smartcard (SC)) having a slit (S) or notch (N) extending right through the front face metal layer to function as a coupling frame (CF), and having a recess (R) in the metal to accept a flexible circuit (FC). A rear plastic backing (not shown) may be laminated thereto.

The flexible circuit (FC) not shown, comprises (i) a patch antenna (PA) to the overlap the slit (S) and metal edge (ME) of the metal card body (MCB) and (ii) a coupling loop structure (CLS) with tracks to redirect the surface currents which are captured by the patch antenna (PA) to an antenna structure (AS) which overlaps the module antenna (MA) of the transponder chip module (TCM). The word patch antenna (PA) can be interchanged or replaced with a sense coil (SeC) or pick-up coil (PuC).

The diagram shows the internal rear surface of the metal face or metal hybrid smartcard (SC) which may be a metal card with a rear plastic backing (not shown) having a slit (S) or notch (N) 230 in the front face metal layer to function as a coupling frame (CF) 220 and a recess (R) 210 in the metal to accept a flexible circuit (FC) (not shown). Given that the slit (S) or notch (N) 230 does not extend to the module opening (MO) 208, the mechanical stability of the metal card may be maintained.

The flexible circuit (FC) (not shown) is disposed with a patch antenna (PA) and a coupling loop structure (CLS). The patch antenna (PA) may be closely positioned to overlap the slit (S) and metal edge (ME) while the coupling loop structure (CLS) with its antenna structure (AS) may be positioned to overlap the module antenna (MA) of the transponder chip module (TCM) for inductive coupling.

FIG. 3 of 62/886,978 (E103) is a diagrammatic view of an internal rear surface of a metal face transaction card or metal hybrid smartcard (SC) which may be a metal card with a rear plastic backing having a slit (S) or notch (N) on both sides of the front face metal layer extending entirely through the metal to function as a coupling frame (CF) and a recess (R) in the metal to accept a flexible circuit (FC).

The diagram illustrates the internal rear surface of a metal face or metal hybrid smartcard (SC) which may be a metal card with a rear plastic backing (not shown) having a slit (S) or notch (N) 330 on both sides of the front face metal layer to function as a coupling frame (CF) 320 and a recess (R) 310 in the metal to accept a flexible circuit (FC) (not shown).

The flexible circuit (FC) (not shown) may be provided with two patch antennae (PA) to pick up the surface currents on the perimeter edges of the metal card body (MCB) 302. The currents collected by each patch antenna (PA) from the slit locations in the metal card body (MCB), observing the polarity of the current flows, are directed via tracks in the coupling loop structure (CLS) to an antenna structure (AS) which overlaps the module antenna (MA) of the transponder chip module (TCM) not shown.

FIG. 4 of 62/886,978 (E103) is a diagrammatic view of an internal rear surface of a metal face transaction card or metal hybrid smartcard (SC) which may be a metal card with a rear plastic backing having a slit (S) or notch (N) on both sides of the front face metal layer with a different positional orientation to FIG. 3 to function as a coupling frame (CF) and a recess (R) in the metal to accept a flexible circuit (FC).

Depending on the position of the slit (S) in the metal card body (MCB), relating to the polarity of the current flows, the overlapping patch antenna (PA) may have windings which run parallel, perpendicular or zigzag to the slit direction. The patch antenna (PA) may also wrap around the slit area, crossing the slit at one position only.

The diagram shows the internal rear surface of a metal face or metal hybrid smartcard (SC) which may be a metal card body (MCB) with a rear plastic backing (not shown) having a slit (S) or notch (N) 430 on both sides of the front face metal layer which pass entirely through the metal layer so as to function as a coupling frame (CF) 420, and having a recess (R) 410 in the metal to accept a flexible circuit (FC) (not shown).

FIGS. 5A and 5B of 62/886,978 (E103) are diagrams of a flexible circuit (FC) with a patch antenna (PA) (or sense coil (SeC)) to overlap the slit (S) or notch (N) in the metal card body (MCB), and a coupling loop structure (CLS) with an antenna structure (AS) to overlap a module antenna (MA) in a transponder chip module (TCM), mounted into a recess (R) in the metal card body (MCB).

The windings of the patch antenna (PA) or sense coil (SeC) in FIG. 5A run parallel, perpendicular, zigzag or a combination thereof across or along the metal edges (MEs) of the slit (S) in the metal layer (ML) or metal card body (MCB). The windings of the coupling loop structure (CLS) in the form of a frame or spiral antenna structure (AS) overlap the windings of the module antenna (MA) of the transponder chip module (TCM). For optimal performance the overlap may be 50%.

The windings of the patch antennae (PA) or sense coils (SeC) in FIG. 5B run parallel, perpendicular, zigzag or a combination thereof across or along the metal edges (MEs) of each slit (S) in the metal layer (ML) or metal card body (MCB). In connecting all three antennae together, the current direction and polarity is respected.

FIG. 5A shows a flexible circuit (FC) with a patch antenna (PA) overlapping a slit (S) (not shown) and a coupling loop structure (CLS) with an antenna structure (AS) overlapping a module antenna (MA) of a transponder chip module (TCM) (not shown). FIG. 5B shows a flexible circuit with two patch antennae overlapping a slit (S) on two perimeter edges (not shown) and a coupling loop structure (CLS) with an antenna structure (AS) overlapping a module antenna (MA) of a transponder chip module (TCM) (not shown).

Process for manufacturing a dual interface smartcard or a contactless transaction card comprising of a metal coupling frame with a slit, said slit extending from a perimeter edge to an opening to accept the insertion of a transponder chip module, or a slit extending from a perimeter edge but terminating at an area close to a module opening. The process includes an over-molding or an injection molding step to reinforce the laser cut slit (with a width of approximately 30-50 µm) or a region around the slit. The laser cut slit can also be reinforced with a multiple of different materials, such as by an adhesive, epoxy compound or a synthetic layer, by a plastic support, a composite fiber bridge, a wood structure or by a steel plate (electrically not connected to the coupling frame). The metal coupling frame may also have holes in addition to the laser cut slit to support the encapsulation process. The encapsulation material may comprise of ethylene-vinyl acetate, high-performance metallocene polyalphaolefin, polyolefins, block copolymers, polyurethane hot melts, polyamides, fiberglass reinforced polyester, polyurethane, bakelite, duroplast, melamine, DAP, polyimide or a combination thereof.

The mold mass supporting the region surrounding the slit has a dual purpose of reinforcing the slit from a mechanical perspective, but also to retain the drop acoustics of the metal coupling frame forming the card body. The mold mass is applied under high pressure and temperature. The compound or filler used to cover or fill the slit may withstand high bake temperatures in post coating operations.

The laser cut slit may not be filled with the molding compound because of its dimensional width. The molding process is to facilitate the mechanical integrity of the coupling around the region of the slit.

The laser cut slit may be other than straight, having a meander, curved or zigzag form. The slit, a combination of laser cutting and etching, may visually represent the name of a payment scheme such as VISA, MasterCard or American Express.

A metal coupling frame may also be shrouded in glass for esthetic purposes. Other features may include illumination of the smartcard characters in the night.

Reference is made to the following:

Title: "Dual Interface Metal Face Smartcards"

This disclosure relates to the field of RFID enabled metal transaction cards and, more particularly, metal transaction cards having multiple slits in different locations in a card body and using an internal flexible circuit to distribute currents collected through inductive coupling at each slit position. The flexible circuit comprises of a patch antenna and a coupling loop structure.

(E103)

Inventor(s): Finn

Ser. No. 62/886,978

Filing Date: 15 Aug. 2019

In order to divert the surface currents from the surrounding area of the slit (S) or notch (N) to the area of the module antenna (MA) on the bond side of the transponder chip module (TCM) with its track ends connected to an RFID chip (IC), it is proposed to use a flexible circuit (FC) with a patch antenna (PA) (sense coil) to pick-up the surface eddy currents around the area of the slit (S) or notch (N) and conduct such current flows to a coupling loop structure (CLS) having a frame or spiral shape on the flexible circuit (FC) which inductively couples with the module antenna (MA) of the transponder chip module (TCM). As the slit (S) or notch (N) extends only a short distance into the metal card body (MCB), the mechanical stability of the metal smartcard (SC) is retained.

In a further variation of the above, an additional slit (S) or notch (N) is created on the opposite side of the metal card body (MCB). In this configuration, the flexible circuit (FC) has two patch antennae (PA) (or sense coils (SeC)), each overlapping a slit(s) or notch(s) in the metal card body (MCB), and the surface currents from both sides of the metal card body (MCB) are directed to the coupling loop structure (CLS) with an antenna structure (AS) which further overlaps the module antenna (MA) of the transponder chip module (TCM). The surface current directional flow at the edge of the metal card body for the opposing slits is observed by the polarity connection to the patch antenna (PA).

The flexible circuit (FC) disposed with one or two patch antennae (PA) or sense coils (SeC) and a coupling loop structure (CLS) with an antenna structure (AS) to overlap the module antenna (MA) of a transponder chip module (TCM) may be regarded as a booster circuit (BC) picking up surface eddy currents and concentrating the current density around the coupling loop structure (CLS) with an antenna structure (AS) which inductively couples with the module antenna (MA) connected to an RFID chip (IC).

The flexible circuit (FC) may be an integral part of the transponder chip module (TCM) comprising of a patch antenna (or sense coil (SeC)) or a coupling loop structure (CLS) connected directly to the RFID chip (IC) assembled or mounted thereto, without the need to inductively couple via a module antenna (MA). Therefore, the patch antenna or sense coil to pick-up currents around a slit may be connected directly to the pads $L_A$ and $L_B$ of the RFID chip. The flexible circuit may also have contact pads to interface with a contact reader. The flexible circuit may also have a connection to a separate spiral or rectangular antenna to further drive and power the RFID chip (IC).

The 6 or 8 contact pads on the flexible circuit (including glass epoxy tape or Kapton tape) may be grown or raised (etched) above the flex-circuit, in order words protruding above thereof, so that the contact pads can fit openings in a metal layer forming a card body. Such protruding contact pads may have a height of 150 or 200 μm, to match the thickness of the area prepared in the metal layer with openings to accept the contact pads. The contact pads may be produced from copper with a coating of nickel and gold or palladium.

The chip module with a dual interface silicon die assembled thereto may not have a module antenna on the rear side of the chip package, but rather the connection pads $L_a$ and $L_b$ for the antenna which are connected to the flexible circuit which in turn inductively couples with the slit or slot in the metal card body. The flexible circuit may be chemically or laser etched.

The dual interface chip module with a module antenna may have the footprint of a 6 pin package instead of an 8 pin package. This smaller footprint may have the width of its module antenna overlapping entirely or partially (50% overlap) the metal card body in the module pocket to enhance performance. A further improvement would be to use a flip chip module allowing for a smaller package and less area to remove from the module pocket in milling in the x, y and z axis.

Inventor(s): Finn—E103v2
Ser. No. 62/978,826
Filing Date: 20 Feb. 2020
Metal Card Bodies with a Slit extending to a Module Opening on each side of the Card Body Now turning to the diagram below (FIG. 6 of 62/978,826 (E103v2)) which is a perspective view of a flexible circuit (FC) with two patch antennae (or sense coils) as part of a coupling loop structure (CLS) with the first patch antenna (PA 1) overlapping a slit (S) and a module antenna (MA) of a transponder chip module (TCM) on one side of the metal card body (MCB), and a second patch antenna (PA 2) overlapping a slit and a module opening (MO) on the opposite side of the metal card body (MCB), with the second patch antenna (PA 2) providing additional power to the RFID chip (IC) by collecting surface currents from one side of the metal card body (MCB) and feeding the current flows to the first patch antenna (PA 1) which inductively couples with the module antenna (MA) of the transponder chip module (TCM) not shown. A capacitor (C) may be connected in series or parallel with the coupling loop structure (CLS) to regulate the system frequency or improve the RF performance of the dual interface metal transaction card. The slit on each side of the card body extends from a periphery edge to an opening to accept a module antenna or any electronic device.

FIG. 6 is a modification of FIGS. 5a and 5b, having two module openings (608 MO) and corresponding slits (630). With the distinction that there is a module antenna (MA 612) overlapping the module opening (608 MO) and inductively coupling with patch antenna one. Patch antenna two is also inductively coupled to a module opening (608 MO). Patch antenna one is connected to patch antenna two via a flexible circuit. A capacitor (CP 618) may be used in the flexible circuit as a frequency tuning component to optimize RF performance. The flexible circuit containing the two patch antennae allows full functionality of the card across the full read/write volume.

In summary, metal hybrid smartcards (SC) having (i) a front face metal card body (MCB) with a short slit (S) or notch (N) extending into the metal card body (MCB) acting as a coupling frame (CF); (ii) a rear plastic backing (PB) layer with printed graphics and a protective overlay layer capturing the magnetic stripe and signature panel; (iii) a flexible circuit (FC), disposed with one or two patch antennae (PA) or sense coils (SeC) connected to a coupling loop structure (CLS) with an antenna structure (AS) on the same substrate, mounted to a recess (R) in the metal card body (MCB) or assembled to the rear plastic backing (PB); (iv) a module opening (MO) in the metal card body (MCB) to accept a transponder chip module (TCM) having a module antenna (MA) connected to an RFID chip (IC); (v) the coupling loop structure (CLS) having a frame or spiral shape antenna structure on the flexible circuit (FC), assembled in the stack-up construction to overlap the module antenna (MA) of the transponder chip module (TCM) to allow for inductive coupling; (vi) the recess (R) may be formed in the metal card body (MCB) to house the flexible circuit (FC) which extends from the area surrounding the slit (S) or notch (N) to the area of the module opening (MO), and may further comprise an anti-shielding material between the flexible circuit (FC) and the metal card body (MCB); and (vii) the slit (S) or notch (N) in the metal card body does not extend to the module opening (MO), thus maintaining (reducing or compromising) the mechanical integrity of the smartcard (SC). A coupling loop structure with two patch antennae for collection of surface current flows may also apply to coupling frames with slits extending from a periphery edge to a module opening in order to improve the RF performance of a dual interface metal transaction card.

Such cards may be contactless only, contact only, or may be dual-interface (contact and contactless) cards.

Title: Metal-Containing Dual Interface Smartcards

This disclosure relates to the field of RFID enabled metal transaction cards and, more particularly, metal containing transaction cards having a transponder chip module with a module antenna overlapping an interface between a conductive surface and a non-conductive surface without the need for a slit.

(E104)
Inventor(s): Finn
Ser. No. 62/887,696
Filing Date: 16 Aug. 2019

In order to divert the surface currents from the surrounding area of the slit (S) or notch (N) to an area destined for the implanting of a transponder chip module (TCM) with a module antenna (MA) connected to an RFID chip (IC), a flexible circuit (FC) may be used for inductive coupling. Such flexible circuit (FC) may have a patch antenna (PA) (or sense coil (SeC)) to pick-up the surface currents around the area of the slit (S) or notch (N) and conduct such current flows to a coupling loop structure (CLS) having a frame or spiral shape antenna structure (AS) on the flexible circuit (FC) which inductively couples with the module antenna (MA) of the transponder chip module (TCM).

In a metal-containing transparent smartcard (SC) where a portion of the card body (CB) is made of a synthetic material and the other portion of the card body on the same plane is made of metal, the surface currents can be collected at the interface (ideally at the ISO position for the transponder chip module (TCM)) between the insulation synthetic layer(s) and the conducting metal layer(s) having a slit (S) to provide for the discontinuity. The transponder chip module (TCM) can be embedded in the card body (CB) to overlap simultaneously the synthetic layer and metal layer.

In a different configuration, the surface currents can be collected at the interface between the non-conducting synthetic layer(s) and the conducting metal layer(s) (without having a discontinuity in the form of a slit or notch) at the ISO position for the transponder chip module (TCM).

The metal layer (ML) may reside underneath the transparent layer (TL) with laser engraved data or graphic features on the synthetic transparent layer (TL) as well as on the metal layer (ML). The metal layer (ML) may extend edge-to-edge of the card body (CB), and a slit or notch (a discontinuity in the metal layer (ML)) may be the tapping point to couple the surface currents.

Notably, the slit (S) in the metal layer (ML) does not need to start at a perimeter edge of a card body (CB), nor does it need to extend to the area of the module opening (MO). The surface currents can be diverted to the module antenna (MA) of the transponder chip module (TCM) by means of inductive coupling, using a flexible circuit (FC) with conducting structures.

The flexible circuit (FC) disposed with one or two patch antennae (PA) or sense coils (SeC) and a coupling loop structure (CLS) with an antenna structure (AS) to overlap the module antenna (MA) of a transponder chip module (TCM) may be regarded as a booster circuit (BC) picking up surface currents and concentrating the current density around the coupling loop structure (CLS) with an antenna structure (AS) which inductively couples with the module antenna (MA) connected to an RFID chip (IC).

A metal-containing smartcard with a transparent or translucent layer (TL) covering a portion of the card body (CB) and a metal layer (ML) covering the remaining portion, a conductive track of suitable width connected to the metal layer (ML) with slit (S) may be used to transport and direct surface currents, concentrating the current density around an overlapping transponder chip module (TCM) with a module antenna (MA) connected to an RFID chip (IC). The coupling between the module antenna (MA) and the conductive track may be a galvanic connection, or may be inductive with the conductive track forming a loop structure around the module antenna (MA).

A metal-containing transparent smartcard having a metal portion with exposed edges at the perimeter of the card body can have it edges laser etched with micro-scripts or logos as a security or personalization feature. The metal portion may be prepared with a Vantablack coating, and etched back to reveal the underlying metal.

The metal-containing transparent smartcard may have metal areas raised above the card body or protruding above the card body, such as the module or central logo/emblem giving a 3D structure to the card body.

The laser cut slit may be mechanically reinforced with a plasticizer or a composite material. Nylon may be used to further strengthen the bond or molded area around the slit. Nylon or a similar material may mask the slit or pass through the slit for the purpose of reinforcement. The slit can be filled with a UV curing epoxy or a two-component adhesive, dispensed as a microfluidic droplet for in situ bonding of the slit under pressure and or vacuum control.

(E104v2)
Inventor(s): Finn
Ser. No. 62/986,612
Filing Date: 6 Mar. 2020
Directing Surface Currents to an RFID Device Such as a Transponder Chip Module As described in 62/960,178 (E112) filed 13 Jan. 2020 and 62/981,040 (E102) filed 25 Feb. 2020, a coupling loop antenna (CLA) is an antenna structure (AS) which couples to a module antenna (MA) in a transponder chip module (TCM). The windings or traces of the coupling loop antenna (CLA) may intertwine those windings of the module antenna (MA), or the windings or traces of the coupling loop antenna (CLA) may couple closely with the windings of the module antenna (MA) similar in function to a primary and secondary coil of a transformer. The termination ends of a coupling loop antenna (CLA) may be connected to termination points (TPs) across a discontinuity in a metal layer (ML) or metal card body (MCB) acting as a coupling frame (CF).

FIG. 5 of 62/981,040 (E102) filed 25 Feb. 2020 is a diagram (plan view) of a smartcard (SC) having a card body (CB) which may be a metal layer (ML) or a metal card body (MCB), with a slit (S) to function as a coupling frame (CF), and showing a transponder chip module (TCM) (aka an inductive coupling chip module (ICM)) having a module antenna (MA) and a coupling loop antenna (CLA), with the end portions (wire-ends) of the coupling loop antenna (CLA) directly connected to a patch antenna on a flexible circuit to pick up surface currents around the area of the slit or opening by means of inductive coupling.

The prior art describes how components can be connected across a slit to regulate the frequency with a capacitor (reference is made to FIG. 23 of U.S. Pat. No. 10,193,211) or some additional features may include: An LED may be connected across the slit (S) of a coupling frame (CF). However, the prior art is silent on the distribution of surface currents from one position in a metal layer to another position to amplify the overall collection of current to drive a component such as a transponder chip module (aka an inductive coupling chip module).

U.S. Pat. No. 10,193,211 (29 Jan. 2019; AmaTech; Finn et al.) discloses Smartcards, RFID devices, wearables and methods, and describes coupling frames comprising a conductive (metal) surface with a slit (S) or non-conductive stripe (NCS) extending from an outer edge to an inner position thereof, and overlapping a transponder device. A coupling frame with slit for coupling with an inductive or capacitive device (inductor or capacitor) may be used at any ISM frequency band to concentrate surface current around the slit. The coupling frame can be tuned to operate at a frequency of interested by introducing a resistive, inductive or capacitive element. The resonance frequency of the coupling frame can be matched to that of the transponder chip module to achieve optimum performance. Coupling frames with or without a transponder device may be integrated, overlapping, stacked or placed adjacent to one another to enhance system performance. Multiple coupling frames may be electrically isolated from one another by the application of a dielectric coating such Diamond Like Carbon (DLC).

FIG. 10 is a diagram (plan view) of a coupling frame (CF) in the form of a card body (CB) which may be a metal layer (ML) or a metal card body (MCB) with a slit (S), and showing the elements of an inductive coupling chip module (ICM) having a module antenna (MA) and an RFID chip (IC). A coupling loop antenna (CLA) is also illustrated with the end portions (wire-ends) of the coupling loop antenna (CLA) ending in termination points (TPs) directly connected across a discontinuity in the form of a slit (S). The coupling loop antenna (CLA) is formed on the module tape (MT, CCT) with its windings placed close to the windings of the module antenna (MA). A capacitor may be connected in series or parallel to the coupling loop antenna (CLA).

FIG. 11 is an exploded view of a coupling frame stack forming a card body (CB) and showing the elements of an inductive coupling chip module (ICM) having a module antenna (MA) and an RFID chip (IC). A coupling loop antenna (CLA) which is not assembled on the module tape but is assembled on a flexible circuit (FC) inductively couples with the module antenna (MA). The end portions (wire-ends) of the coupling loop antenna (CLA) end in termination points (TPs) across the slit of one of the coupling frames in the stack.

In the case of a metal containing transaction card having a metal slug or a metal layer interfacing a non-conductive layer, it is possible to collect the surface currents from different positions on the conductive layer with or without slit. For example, the module antenna of the transponder chip module may overlap the interface between the conductive and non-conductive layer while the coupling loop antenna connected to a sense coil (SeC) or patch antenna (PA) may overlap a slit in the conductive layer.

In a different iteration of the above without a physical interconnection to termination points (TPs) across the slit (S), the coupling loop antenna (CLA) on a flexible circuit (FC) may be connected to a sense coil (SeC) which in turn inductively captures surface currents by overlapping the metal edge of the slit (S). The entire circuitry may be referred to as coupling loop structure (CLS).

A capacitor may be connected in parallel or series to the coupling loop antenna (CLA) or the coupling loop structure (CLS) to regulate the system frequency and or RF performance. A component device such as an LED or sensor may be connected in parallel.

FIG. 12 is a diagram (in perspective view, exploded) of two coupling frames (CF) stacked one atop the other with at least one slit (s) extending from a perimeter edge to a module opening (MO) or extending to an area without a module opening (MO) with the elements of a transponder chip module (TCM) highlighted, namely the module antenna (MA) and the RFID chip (IC), whereby surface currents are collected by at least one sense coil (SeC) or patch antenna (PA) and directed to a coil which inductively couples with the module antenna (MA) of the transponder chip module (TCM). The circuitry of the coils on a flexible circuit (FC) may be referred to as a coupling loop structure (CLS). The flexible circuit may include a capacitor to regulate the resonance frequency and RF performance or power a component such as an LED or sensor.

In an alternative embodiment, the RFID enabled metal containing transaction card may have a metal layer or a metal slug, separated by a dielectric, supported by an underlying metal layer with slit. In this configuration, the transponder chip module may overlap an interface between a conductive and non-conductive material on the front face of the card but collect surface current from the underlying metal layer with slit.

FIG. 13 is a variation of FIG. 12 in which a metal slug is mounted on top of a metal layer. The antenna circuitry remains the same, in using a coupling loop structure (CLS) to redirect surface currents.

Further variations in the circuitry of an RFID enabled metal transaction card include a coupling loop antenna (CLA) physically connected to a module antenna (MA), altering the physical length of the slit, and mix and matching currents from different coupling frames.

In summary, metal-containing dual interface smartcards (SC) having (i) a transparent or translucent layer (TL), and a metal layer (ML) with a slit (S) or notch (N) passing entirely through the metal layer (ML) and extending for a short distance across the metal layer (ML) to act as a coupling frame (CF); (ii) the metal layer (ML) with slit (S) or notch (N) made of non-magnetic stainless steel, titanium, gold, palladium, tungsten, aluminum or brass, providing weight and robustness to the card body (CB); (iii) the metal layer surface may be coated with a suitable medium to render it non-conductive to offset the effects of electrostatic discharge; (iv) the transparent or translucent layer (TL) made of a synthetic material may be laser engraved accompanied by the metal layer (ML), with both substrates etched with personalization data or graphic features; (v) the metal layer (ML) with slit (S) or notch (N) may be positioned in the center of the card body (CB), the metal layer (ML) may occupy a portion of the card body interfacing with the transparent layer (TL) which occupies the remaining portion of the card body (CB), or the metal layer (ML) covering the card body area (edge-to-edge) may be placed behind the transparent layer (TL); (vi) the metal layer may have a milled or chemical etched channel to accept a magnetic stripe, a signature panel, hologram or payment scheme logo; (vii) a module opening (MO) in the transparent or translucent layer (TL) and/or metal layer (ML) to accept a transponder chip module (TCM) having a module antenna (MA) connected to an RFID chip (IC); (viii) the module antenna (MA) of the transponder chip module (TCM) overlapping either an interface area between the transparent layer (TL) and the metal layer (ML) and/or a slit (S) or notch (N) in the metal layer (ML) and/or inductively coupling with a flexible circuit (FC) diverting surface eddy currents; and (ix) the slit may be reinforced with nylon and a plasticizer to strengthen the card body and to regulate the acoustic drop of the card on a hard surface.

Such cards may be contactless only, contact only, or may be dual-interface (contact and contactless) cards.

Booster Antenna Coupling with RFID Slit Technology

Contactless cards operating in contactless mode including dual interface (contact and contactless) smartcards may have a coupling frame (CF) and a booster antenna (BA) arranged in a metal card body (MCB) to interact with each other to allow for enhanced contactless communication.

Reference is made to the following:

Title: "Dual Interface Metal Face Smartcards"

This disclosure relates to the field of RFID enabled metal transaction cards and, more particularly, metal transaction cards having a booster antenna with an antenna structure to overlap a slit in the metal card body.

(E106)
Inventor(s): Finn
Ser. No. 62/889,055
Filing Date: 20 Aug. 2019
(E106v2)
Inventor(s): Finn
Ser. No. 63/034,965
Filing Date: 4 Jun. 2020

Contactless cards operating in contactless mode including dual interface (contact and contactless) smartcards may have a coupling frame (CF) and a booster antenna (BA) arranged in a metal card body (MCB) to inductively interact in an electromagnetic field, allowing for enhanced radio frequency performance. The metal card body may have a front face metal layer (ML) and a rear plastic layer (PL) with contactless communication possible from both sides of the card body. The booster antenna (BA) may comprise of a coupler coil (CC), perimeter coil (PC), a sense coil (SeC) and in some circumstances an extension antenna (EA) which collectively harvest and distribute energy with the front face metal layer (ML) having at least one slit (S) to act as a coupling frame (CF). The slit (S) may be a narrow gap or notch in the metal layer (ML) or the slit (S) may be an enlarged gap in the form of an opening in the metal layer (ML) or the slit (S) may be a narrow gap accompanied by an opening in the metal layer (ML). The sense coil (SeC) forming part of the perimeter coil (PC) of the booster antenna (BA) may have a single turn or multiple turns in the shape of a loop, spiral or zigzag antenna which overlaps a slit and or opening in the metal layer (ML). The perimeter coil (PC) may have a single turn or multiple turns (windings) running along the outer edges of the card body and the coupler coil (CC) may have a single turn or multiple turns to inductively couple with the module antenna (MA) of the transponder chip module (TCM). For optimum pick-up and distribution of surface currents, opposing slits and or openings may be formed in the metal card body (MCB).

In the drawings below, the direction of the windings or turns of the sense coil (SeC) across the slit (S) is portrayed in a perpendicular and parallel manner, but as discussed above, the direction and shape of the coil (SeC) may be a combination of perpendicular and parallel windings, to optimize the self-inductance and minimize the negative mutual inductance which results in current cancellations. Further, the sense coil (SeC) can meander around or within the area of the slit or slits. The sense coil (SeC) may be part of a wire embedded booster antenna (BA) or the sense coil (SeC) may be on a flexible circuit assembled to the metal card body. An anti-shielding material such as ferrite, not shown, may be incorporated in the card construction. An air gap may exist between the metal layer (ML) acting as coupling frame and the booster antenna (BA).

FIG. 3G of 63/034,965 (E106v2) is a plan view which shows a metal card body (MCB) and a booster antenna (BA) in a smartcard (SC). A sense coil (SeC) has a loop or spiral form with multiple turns and overlaps the slit (S) which extends to the module opening (MO). The sense coil (SeC) as part of the perimeter coil (PC) drives the module antenna (MA) of the transponder chip module (TCM) by means of a multiple loop coupler coil (CC).

FIG. 3H of 63/034,965 (E106v2) is a modification of FIG. 3G in which the slit (S) does not extend to the module opening (MO).

FIG. 4A of 62/889,055 (E106) is a plan view which shows a metal card body (MCB) and a booster antenna (BA) in a smartcard (SC). A sense coil (SeC) crosses over the slit (S) several times, perpendicular to and overlapping the slit.

FIG. 4B of 62/889,055 (E106) is a plan view which shows a metal card body (MCB) and a booster antenna (BA) in a smartcard. A sense coil (SeC) traverses back and forth (meanders) in the slit, parallel to the slit, and may overlap the slit.

FIG. 4C of 62/889,055 (E106) is a plan view which shows a metal card body (MCB) and a booster antenna (BA) in a smartcard (SC). The sense coil (SeC) as part of the perimeter coil (PC) is like a ribbon, running along the edge of the card body, then traverses the slit (perpendicular thereto), and continuous to run parallel to the edge of the card body. The slit does not extend to the module opening (MO).

FIG. 5A of 63/034,965 (E106v2) is a plan view which shows a metal card body (MCB) and a booster antenna (BA) in a smartcard (SC). The sense coil traverses back and forth (meanders) in the slit ($S_1$), parallel, and may overlap the slit. The slit ($S_1$) extends to the module opening (MO). The coupler coil (CC) is a loop antenna with multiple turns which couples with the module antenna (MA) of the transponder chip module (TCM). The second slit ($S_2$) is a wide gap and the perimeter coil wraps around the slit ($S_2$).

FIG. 5B of 63/034,965 (E106v2) is a modification of FIG. 5A in which the perimeter coil (PC) forms a meander around and within the area of the second slit ($S_2$).

In all the schematics presented above in which the coupler coil (CC) of the booster antenna (BA) inductively couples with the module antenna (MA) of the transponder chip module (TCM) while the other component elements of the booster antenna (BA) in the particular the perimeter coil (PC) and the sense coil (SeC) harvest energy by picking up surface currents around the area of the slit and the metal card body (MCB), it is feasible to eliminate the coupler coil (CC) and make a direct connection from the perimeter coil (PC) to the RFID chip assembled to the chip module (CM), eliminating also the need for a module antenna (MA) on the face-down side of the chip module (CM). This complicates the manufacturing process as the wire ends of the perimeter coil (PC) would have to be physically connected to the chip module (CM), but it represents a viable alternative which could be cost effective.

In addition, an extension antenna (EA) may be used to tune the booster antenna or potentially drive an electronic component.

FIG. 6A of 63/034,965 (E106v2) is a plan view which shows a metal card body (MCB) and a booster antenna (BA) in a smartcard (SC). A sense coil (SeC) has a loop or spiral form with multiple turns and overlaps the slit (S) which extends to the module opening (MO). The wire ends of the perimeter coil (PC) are galvanically connected to the chip module (CM), eliminating the need for a coupler coil in the booster antenna and a module antenna in the transponder chip module.

In summary, a contactless metal face/metal hybrid smartcard characterized by a booster antenna (BA) arranged on a rear plastic layer laminated to a front metal layer having a slit (S). The booster antenna may have three portions, or components: (i) a perimeter coil (PC) component extending around a peripheral area of the card body, and having one or more turns; (ii) a coupling or coupler coil (CC) component located at the module opening (MO) for coupling with a module antenna (MA) in the transponder chip module (TCM), and having one or more turns; and (iii) a sense coil (SeC) component arranged around the slit (S) in the front metal layer, and may overlap the slit (S), typically in a zigzag fashion or the like. The sense coil may have a loop or spiral shape. The booster antenna may form a closed loop circuit, and may have no free ends. Alternatively, the booster antenna may form an open loop circuit, and may have free ends.

Physically Connecting a Coupling Loop Structure to a Coupling Frame

A metal card body (MCB) with a discontinuity may be represented by a one turn antenna. In the case of an open loop antenna, the terminal ends of the antenna may be galvanically connected to a coupling loop structure (CLS) on a flexible circuit (FC) to interface with the module antenna (MA) of a transponder chip module (TCM). The same applies to a metal card body (MCB) with termination points across a slit which can be galvanically connected to a coupling loop structure (CLS) on a flexible circuit (FC) with its antenna structure (AS) used to inductively couple with the module antenna (MA) of a transponder chip module (TCM). The discontinuity in the metal card body (MCB) may or may not extend to the module opening (MO).

Reference is made to the following:

Title: Dual Interface Smartcards with a Transponder Chip Module Inductively coupled to a Coupling Frame(s)

This disclosure relates to the field of RFID enabled metal transaction cards and, more particularly, metal transaction cards having an internal flexible circuit connected to termination points across a discontinuity in the metal card body or to termination points across a gap in a coupling frame antenna, and to direct the pick-up currents to an antenna structure in close proximity to the module antenna of a transponder chip module for inductive coupling.

(E107)
Inventor(s): Finn
Ser. No. 62/889,555
Filing Date: 20 Aug. 2019

In order to divert the surface current from the end section of a slit (S) or notch (N) in a coupling frame (CF) exposed to electromagnetic waves, to the area of a module antenna (MA) in a transponder chip module (TCM) connected to an RFID chip (IC), it is proposed to use a flexible circuit (FC) with a coupling loop structure (CLS) with its termination end points (TPs) connected across the slit (S) or notch (N) with the eddy currents flowing through the conductive path of the coupling loop structure (CLS) and its antenna structure (AS) positioned in close proximity to the module antenna (MA) so as to power the RFID chip (IC) by means of inductive coupling. As the slit (S) or notch (N) extends only a short distance into the metal card body (MCB), the mechanical stability of the smartcard (SC) is retained.

It is a general object to provide improved techniques for implementing a coupling loop structure (CLS) on a flexible circuit (FC) with a start and end contact pad, electrically connected to termination end points (TPs) on a coupling frame (CF) in the form of a metal card body (MCB) with a slit (S) or notch (N), to direct surface eddy currents from the perimeter edge of the metal card body (MCB) to the coupling loop structure (CLS) with an antenna structure (AS) on a flexible circuit (FC), for interfacing in close proximity with the module antenna (MA) of a transponder chip module (TCM), implanted in the metal card body (MCB) for contact and contactless communication with a POS terminal.

A transponder coupling system (TCS) in a metal smartcard (SC) may comprise: (i) a transponder chip module (TCM) comprising contact pads (CP) disposed in a contact pad array (CPA) on a first surface (face-up side or contact side) of a substrate (module tape (MT), chip carrier tape (CCT)) and a module antenna (MA) in the form of a planar antenna having a number of turns connected to an RFID chip (IC) on a second surface (face-down side or bond side) of the substrate (MT, CCT); (ii) a flexible circuit (FC) comprising at least one coupling loop structure (CLS) (conductor) having a frame or spiral shape antenna structure disposed thereon with end portions leading to termination end points (TPs); and (iii) the module antenna (MA) inductively couples with the antenna structure of the coupling loop structure (CLS) with its termination end points (TPs) electrically connected to a coupling frame (edge to edge) forming the card body (CB). The antenna structure (AS) of the coupling loop structure (CLS) is positioned so that it overlaps the module antenna (MA) of the transponder chip module (TCM).

A card body (CB) construction for a smartcard (SC) may comprise: (i) at least one metal layer (ML) having a module opening (MO) for receiving a transponder chip module (TCM) and a short slit (S) or notch (N) extending from an outer edge of the metal layer to a position corresponding to a central location between the module opening (MO) for the transponder chip module (TCM) and the outer (perimeter) edge, so that the layer may function as a coupling frame (CF) with adjacent termination end points (TPs) across the slit (S) or notch (N) at the central location; (ii) a flexible circuit (FC) comprising at least one coupling loop structure (CLS) having a frame or spiral shape antenna structure with end portions leading to termination end points (TPs) which are electrically connected to the termination end points (TPs) on the coupling frame (CF) at the end position of the slit (S) or notch (N); and (iii) further comprising a ferrite layer placed between the flexible circuit (FC) and the metal layer (ML) to offset the effects of electromagnetic attenuation caused by the metal layer (ML).

The slit may have a form which is straight, curved, angled, zigzag, u-shaped or may have a "T" shape to capture the surface currents on the metal card body (MCB). The form of the slit may resemble a saxophone.

A card body (CB) construction for a smartcard (SC) may have a stack-up construction characterized by: (i) a first metal layer with a short slit (S) or notch (N) having an opening for receiving a transponder chip module (TCM); (ii) a second metal layer with a short slit (S) or notch (N) orientated in the same or different direction (or position) as the slit (S) or notch (N) on the first metal layer having an opening for receiving a mold mass of the transponder chip module (TCM) so that the antenna structure (AS) of a coupling loop structure (CLS) overlaps the module antenna (MA) of the transponder chip module (TCM); and (iii) a third metal layer having a slit to overlap the coupling loop structure (CLS).

A plastic-metal-plastic smartcard (SC) (aka embedded metal card or metal core card) may comprise: (i) a core comprising at least one metal layer with a short slit (S) or notch (N) with adjacent termination end points (TP) at a perimeter edge, but not extending to the module opening (MO) to maintain the mechanical integrity of the smartcard (SC); (ii) a flexible circuit disposed with a coupling loop structure (CLS) connected to the termination points (TPs) on each side of the slit (S) or notch (S) and extending to the module opening (MO) area to enable close coupling between the antenna structure (AS) of the coupling loop structure (CLS) and the module antenna (MA) of the transponder chip module (TCM); (iii) a front plastic subassembly comprising a front printed layer and a front overlay layer joined, via an adhesive layer, to a front side of the core; and (iv) a rear plastic subassembly comprising a rear printed layer and a rear overlay layer with magnetic stripe joined, via an adhesive layer, to a rear side of the metal core. The smartcard (SC) may further be characterized by a recess or pocket in the metal core or metal layer (ML) starting from an area surrounding the slit (S) or notch (N) and extending to the module opening (MO) to accommodate the flexible circuit (FC) disposed with the coupling loop structure (CLS), so that the antenna structure (AS) of the coupling loop structure (CLS) overlaps the module antenna of the implanted transponder chip module (TCM). The signature panel and hologram may be hot-stamped to the rear overlay layer.

A metal face/metal hybrid smartcard (SC) comprising: at least one front metal layer (ML) formed to function as a coupling frame having a slit (S) or discontinuity extending from an outer edge of the layer to a position corresponding to a central location between the module opening (MO) for the transponder chip module (TCM) and the perimeter edge; and a rear plastic subassembly comprising a rear printed layer and a rear overlay layer with magnetic stripe joined by means of an adhesive layer, to a rear side of the metal layer; wherein the slit (S) of a given metal layer is positioned or oriented in the same way as the slit (s) of the other metal layer(s) so that the slits of the at least two metal layers are aligned with one another.

The conductivity of the coupling loop structure (CLS) may be greater than the conductivity of the coupling frame (CF) with slit (S), providing a path of less electrical resistance for the flow of surface current to the antenna structure (AS) inductively coupling with the module antenna (MA) of the transponder chip module (TCM).

The coupling loop structure (CLS) may be physically connected across one slit (S) in a coupling frame (CF), across several slits arranged in a coupling frame or between slits in a stack of coupling frames making up a metal card body (MCB).

FIG. 3 of 62/889,555 (E107) is a diagram of a single loop with a track width of 3 mm, having termination end points.

The diagram illustrates a single loop with a track width of 3 mm having termination end points (TPs) 304, for connection to termination end points (TPs) on a flexible circuit (not shown) disposed with a coupling loop structure (CLS) with an antenna structure for assembly under the module antenna (MA) of a transponder chip module (TCM). The single loop may also be referred to as a coupling frame antenna (CFA) 302 of the card body (CB) 301. The separation S 303 between both ends of the coupling frame antenna (CFA) is analogous with a discontinuity in a metal layer.

FIG. 4 of 62/889,555 (E107) is a diagrammatic view of a front surface of a smartcard (SC) which may be a metal card, composite metal card, encapsulated metal card, metal core card or metal face card having a slit (S) or notch (N) to function as a coupling frame (CF).

FIG. 5 of 62/889,555 (E107) is a diagrammatic view of a front surface of a smartcard (SC) which may be a metal card, composite metal card, encapsulated metal card, metal core card or metal hybrid card having a slit (S) or notch (N) extending to a module opening to function as a coupling frame (CF).

FIG. 6 of 62/889,555 (E107) is an exploded view or diagram of a metal hybrid smartcard (SC) (Metal front, Plastic back) having a card body (CB) which may be a metal layer (ML) or a metal card body (MCB), with a short slit (S) or notch (N) to function as a coupling frame (CF), and showing a transponder chip module (TCM) having a module antenna (MA) overlapping the antenna structure (AS) of a coupling loop structure (CLS) on a flexible circuit (FC), showing ends of a coupling loop structure (CLS) which may be electrically connected with termination end points (TPs) on a coupling frame (CF, ML, MCB).

In summary, smartcards (SC) having (i) a metal card body (MCB) with a short slit (S) or notch (N) extending into the metal card body (MCB) acting as a coupling frame (CF) having a termination end point (TP) on each side of the slit (S) or notch (N), (ii) a flexible circuit (FC) disposed with a coupling loop structure (CLS) having termination end points (TPs) for electrical connection to the termination end points (TPs) on the coupling frame; (iii) a module opening (MO) in the metal card body (MCB) to accept a transponder chip module (TCM) having a module antenna (MA) connected to an RFID chip; (iv) the coupling loop structure (CLS) having a frame or spiral shape antenna structure on the flexible circuit (FC), assembled underneath the module antenna (MA) of the transponder chip module (TCM) so that a portion of the module antenna overlaps a portion of the antenna structure (AS) to allow for inductive coupling; (v) a recess (R) may be formed in the metal card body (MCB) to house the flexible circuit (FC) which extends from the area surrounding the slit (S) or notch (N) to the area of the module opening (MO), and may further comprise an antishielding material between the flexible circuit (FC) and the metal card body (MCB); and (vi) the slit (S) or notch (N) in the metal card body does not extend to the module opening (MO) thus maintaining the mechanical integrity of the smartcard (SC). The form of the slit in a metal card body may resemble a saxophone or be u-shaped. Such cards may be contactless only, contact only, or may be dual-interface (contact and contactless) cards.

Driving Electronic Components in Metal Containing Transaction Cards

An electronic component in an RFID enabled metal transaction card may be powered from an antenna structure (AS) or antenna cell (AC) overlapping a single discontinuity or may be powered from a plurality of interconnected antenna structures (AS) or antenna cells (AC) at multiple locations overlapping a plurality of discontinuities. Alternatively, an antenna probe (AP) positioned in a discontinuity may be used to pick-up inner metal currents, metal edge currents and surface currents.

Reference is made to the following:

Title: "Contactless Metal Cards with Fingerprint Sensor"

This disclosure relates to the field of EMV metal cards with fingerprint biometrics, providing a simple and secure way for cardholders to authenticate their identity for in-store purchases with their fingerprint, as an alternative to PIN or signature. The EMV metal card may comprise an antenna probe mounted in a discontinuity to pick-up currents from within the discontinuity, without the necessity to overlap the discontinuity.

(E109)
Inventor(s): Finn
Ser. No. 62/891,433
Filing Date: 26 Aug. 2019
(E109v2)
Inventor(s): Finn
Ser. No. 62/936,519
Filing Date: 17 Nov. 2019

A flexible circuit (FC) with a sense coil (SeC) or patch antenna (PA) is used to pick-up surface currents around a discontinuity in a metal card body (MCB) to drive an RFID chip or a device hereinafter called a component (C), either directly through a physical interconnection between the component (C) and the flexible circuit (FC) or through inductive coupling between the component having an antenna structure (AS) to interface with an antenna structure (AS) on the flexible circuit (FC) connected to the sense coil (SeC) or patch antenna (PA).

The flexible circuit (FC) with a micro-sense coil (SeC) or micro-patch antenna (PA) may pass over the surface and through the discontinuity in the metal layer (ML) or metal card body (MCB) to pick-up currents flowing around and within the slit (S), gap (G) or notch (N). In other words, the current is being collected from the surface of the metal layer (ML) as well as from the inner area of the discontinuity.

The slit may pass entirely through the metal layer (laser or water jet cut, or wire cut EDM) or the slit may be merely engraved (laser etching or CNC milling) into the metal layer (ML) or metal card body. The combination of a slit cut and an engraved slit opens up the opportunity to create topography of slits to represent an artistic feature, animated design, payment scheme logo or signature.

A plurality of discontinuities may be arranged around the perimeter edges of the metal card body (MCB) with a flexible circuit (FC) having antenna structures (AS) or antenna cells (AC) to interface with each discontinuity. The polarity of the current flow in the antenna cells is arranged to maximize the power delivery.

The techniques described herein may equally be applicable to dual interface metal foil plastic cards produced using traditional lamination processes. Equally, the techniques may be applicable in producing contactless smartcards without a contact interface.

The metal bezel forming part of a fingerprint sensor may be used as a coupling frame to drive the sensor by introducing a slit in the metal bezel.

A fingerprint sensing module comprising an electrically conductive bezel may be housed in a metal transaction card without over grounding the swing voltage driving the pixels of the fingerprint sensor.

The metal card body may be electrically isolated from the metal bezel by the application of coatings (DLC) or anodizing the metal surface (oxidation) to prevent contact between the active bezel drive and the metal card body.

FIG. 3a of 62/936,519 (E109v2) is a schematic view of a biometric metal smartcard comprising a metal layer (ML) or metal card body (MCB), interconnected components mounted thereto, a single discontinuity in the form of a slit (S) or gap (G) and a flexible circuit (FC) with a sense coil (SeC) having windings running perpendicular to the slit direction.

FIG. 3b of 62/936,519 (E109v2) is a schematic view of a biometric metal smartcard comprising a metal layer (ML) or metal card body (MCB), interconnected components mounted thereto, a single discontinuity in the form of a slit (S) or gap (G) and a flexible circuit (FC) with a sense coil (SeC) having windings running parallel to the slit direction.

The illustrations of the windings running perpendicular or parallel the slit direction is merely exemplary, as the shape, form, windings (number of tracks, separation distance between tracks, track width) and crossovers of the sense coil (SeC) may be optimized to maximize the current delivery and minimize negative current flows from negative mutual inductance. Alternatively, the biometric metal smartcard may comprise a plurality of discontinuities in the form of a slit (S) or gap (G), and a flexible circuit (FC) with sense coils (SeCs) interfacing with said discontinuities. Each sense coil picks-up current flows at each slit, observing the polarity of the current flow to maximize the accumulation of current presented to and driving the master component device such as the secure processing module.

FIG. 5 of 62/936,519 (E109v2) is a schematic view of a biometric metal smartcard comprising a metal layer (ML) or metal card body (MCB), interconnected components mounted thereto, a discontinuity in the form of a slit (S) or gap (G) and a flexible circuit (FC) with a sense coil (SeC) passing through the discontinuity. A micro-sense coil interfaces with the current flows from within the discontinuity. Equally, the micro-sense coil can pick-up current flows on the surface of the metal layer (ML) or metal card body (MCB) for maximum power delivery to the components. The micro-sense coil may also be referred to as an antenna probe (AP). The antenna probe (AP) may be physically connected to a metal strip ($1^{st}$ electrode) positioned within the discontinuity and to the metal card body ($2^{nd}$ Electrode).

In summary, EMV metal cards with fingerprint sensor are passively powered by capturing the surface eddy density in a discontinuity or discontinuities in a metal layer (ML) or metal card body (MCB). The discontinuity in the form of a slit (S), gap (G) or notch (N) allows for the harvesting of energy using a sense coil (SeC) on a flexible circuit (FC) to inductively couple with the inner and surface flowing currents. The sense coil may overlap the discontinuity or pass through the interior of the discontinuity to maximize the delivery of power.

The metal bezel may be used as a coupling frame to drive the fingerprint sensor by introducing a slit in the metal bezel. A fingerprint sensing module comprising an electrically conductive bezel may be housed in a metal transaction card without over grounding the swing voltage driving the pixels of the fingerprint sensor. The metal card body is electrically isolated from the metal bezel by the application of coatings (DLC) or anodizing the metal surface (oxidation) to prevent electrical contact between the active bezel drive and the metal card body.

Title: "Passive RFID Enabled Metal Transaction Cards with Dynamic CVV Display"

This disclosure relates to the field of passive EMV metal cards with a dynamic display refreshed at each contact or contactless event. The metal card body acts a ground for interconnection between the electronic components and for data communication transmission.

(E111)
Inventor(s): Finn
Ser. No. 62/912,701
Filing Date: 9 Oct. 2019
(E111v2)
Inventor(s): Finn
Ser. No. 63/035,670
Filing Date: 5 Jun. 2020

The objective is to create a passive contactless or dual interface metal smartcard to conduct transactions with an on-board screen displaying dynamic security codes (such as numerical, alphanumerical or symbols), with said metal smartcard receiving energy through its contact interface or harvesting energy through its contactless interface which couples to the electromagnetic field generated by a point of sale terminal or any NFC/RFID enabled device such as a cell phone, to power its RFID chip or dual interface microcontroller, electronic ink display and any other electronic component such an OTP (One-Time-Password) generator, memory, voltage regulator, LED, switch, keypad, or any discrete component incorporated therein.

Further the individual components are powered through inductive coupling using RFID slit technology. Each component may have a micro-antenna to pick up inductive/ reactive power from a discontinuity in a metal layer forming the metal card body. Communication between components may be achieved through a hard wire connection or may result through transmission of data on the carrier frequency, at any harmonic thereof or at any ISM frequency.

In the case of no physical galvanic connection between the components such as the microprocessor and the display, the individual components can be embedded in the metal smartcard body after card stack-up lamination. Alternatively, electrical coupling of the microprocessor and display can be reduced to one or two connections (I/O, GND), using the electrical conduction of the metal card body chassis.

The dynamic security code values (DSCVs) may be updated or refreshed when in the presence of an electromagnetic field and synchronized with a time stamp from a remote server. The codes or values may be generated by an on-card algorithm or by a remote server. The device may be designed to conduct secure transactions without an internal battery power source.

It may further relate to a metal inlay used in the stack-up construction of a passive display card incorporating metal layers with a discontinuity, with said metal layers sandwiching the electronic components integrated therein. Said at least one discontinuity in one of the metal layers may be used to concentrate electromagnetic energy around an RFID chip or a dual interface chip module to power its operation, while at the same time another discontinuity in another metal layer is used to drive a display.

The electronic components may be sandwiched between metal layers wherein a dielectric separates the metal layers as well as reinforces the mechanical stability of the card construction while at the same time retaining the metal sound integrity of the card. The dielectric may be made from a fiber (e.g. glass or carbon) or any suitable composite material. The metal layers separated by a dielectric may further operate as electrodes, incorporating a supercapacitor or a battery.

The dynamic display may be refreshed with a new verification code after each contact or contactless transaction event.

FIG. 5a illustrates a display screen in a passive display smartcard (SC) with a hard-wired connection to a microcontroller, incorporating a discontinuity (S) in a metal layer (ML) to concentrate surface eddy current density. The chip module comprises of contact pads and a micro-coil connected to a dual interface microcontroller (microprocessor).

The DCVV component contains a display with a wired connection to display driver unit (may also be one device with integrated display and driver). The microprocessor is connected to the display driver via wired connections (flexible PCB circuit).

The chip module (CM) is placed with the module antenna (MA) overlapping the discontinuity (S) in the metal layer (ML). When the card is placed in the reader field, power is delivered to the microprocessor and display driver. A command/script on the microprocessor to securely generate a new CVV number is transmitted to the display driver via wire connections, using the metal card body (MCB) chassis as GND. The display driver then updates the display unit to show the new CVV number.

FIG. 5b is a modification of FIG. 5a illustrating a display screen in a passive display smartcard comprising a discontinuity (S) and a module opening (MO) in a metal layer (ML) to concentrate surface eddy current density around the micro coil connected to a dual interface microcontroller (microprocessor).

FIG. 6a illustrates a display screen with inductive coupling elements, incorporating a discontinuity (S) in the metal layer (ML) or in each metal layer sandwiching the embedded electronic components (not shown). The chip module (CM) consists of contact pads and a rear micro-coil connected to a dual interface microcontroller (microprocessor).

The DCVV component contains a display driver and a display unit with an antenna coil (flexible circuit) connected to the driver (may also be one device with the integrated display and driver). The microprocessor is connected to the display driver via inductive coupling.

Communication between the microprocessor and the display is implemented via inductive coupling at a predetermined frequency. Inductive coupling is therefore used to power the components while at the same time acting as a communication channel between the components via the elements of the discontinuities in the metal layer or layers.

The electronic components may also be implanted in the metal card body after the metal layers have been laminated together.

FIG. 6b is a modification of FIG. 6a comprising of a discontinuity (S) and a module opening (MO) in the metal layer (ML) or in each metal layer sandwiching the embedded electronic components (not shown). An additional opening is provided in the metal layer (ML) or layers (MLs) which overlaps the antenna coil (AC) on the flexible circuit (FC) which delivers power to the display driver.

In a metal face transaction card having a metal front and a plastic backing, the CVV display may be assembled to the rear plastic layer, while the energy harvesting may stem from the current flows collected around a discontinuity with or without opening in the metal layer. In summary, metal transaction cards with dynamic CVV display and RFID devices such as metal payment cards and objects incorporating a transponder chip module may be passive devices, not having a battery and harvesting power from an external contactless reader (ISO 14443). However, some of the teachings presented herein may find applicability with cards having self-contained power sources, such as small batteries (lithium-ion batteries with high areal capacity electrodes) or supercapacitors.

Use of a Capacitor to Regulate the RF Performance (Prior Art)

US 2018/0339503 discloses the use of an inductive or capacitive device (inductor or capacitor) connected to a coupling frame in order to effect a controlled change in the resonance characteristics of a coupling frame. It further discloses that a capacitor (CAP) may be connected across the slit (S) of the coupling frame to achieve this objective. In the case of a multi-layered card construction with a metal slug used to reinforce the area around a slit in a metal layer, the metal slug acting as a coupling frame may have a capacitor connected across its slit to regulate the frequency response and bandwidth of the system.

A capacitor may also be connected across the void or separation gap of a coupling frame antenna to optimize RF performance. Capacitive struts running parallel to the single track or interdigitated array may be integrated therewith.

In the case of a 6-pin transponder chip module (TCM), the module antenna (MA) may require the connection of a capacitor across the antenna ends and across the chip (IC) in order to adjust the resonance frequency of the (TCM) and to enable suitable operational performance of the smartcard when communicating with a reader. A capacitor may also be connected across one or more of the slits (S) of any of the coupling frames (CFs) within a given card.

It is noted that the one or more of the metal layers (ML) may be connected to each other or feature devices such as capacitors connected across any two points on their surfaces. A metal layer may be electrically connected at one or more points to other metal layers within a smartcard, may operate in conjunction with other antennas placed within the smartcard and may be connected to electronic components included by not limited to capacitors, resistors, LEDs and switches.

For example, as illustrated in FIG. 10 of US 2018/0339503 a surface mounted capacitor (CAP) 1007 may be placed on the second metal layer (ML2) 1006 across the slit (S). A suitable void in the shielding material may be provided to accommodate such a component. In addition, a recess may be provided in the first metal layer (ML1) 1002 to accommodate the height of such a component. It is also conceived that to aid facile manufacture of the smartcard device a suitable solder and solder flux system may be chosen to permit placement of the capacitor or other device with curing of the electrical connection between the device and the metal layer (ML) during one of the lamination cycles used to produce the smartcard stack.

A switch may be provided to disenable the antenna circuit by connecting its terminals across the slit (S) of the coupling frame antenna (CFA). A capacitor may be connected across the slit to boost performance. The transponder chip module (TCM) may comprise a laser-etched antenna structure (LES), a chemical-etched antenna structure (CES) and a non-perforated contact pad (CP) arrangement. A coupling frame antenna (CFA) may be incorporated onto the module tape (MT) for a transponder chip module (TCM).

The prior art as described above is silent on the use of capacitors or any discrete components on a flexible circuit (FC) in which its antenna structures inductively couple with a discontinuity or multiple discontinuities in a metal card body (MCB) and with the module antenna (MA) of a transponder chip module (TCM).

The circuitry of the flexible circuit may include antennas, inductors, resistors and capacitors which manipulate induced currents in a metal card body to boost the performance of an RFID system which may include other components such as a sensor and a display. The capacitor(s) may be connected in series or parallel with the antennas. The flexible circuit may also be physically connected across a discontinuity in a metal card body.

Reinforcing a Slit in a Metal Card Body

A laser-cut slit may be reinforced with filler such as a resin, epoxy, mold material, repair liquid or sealant applied and allowed to cure to a hardened state or flexible state. The filler may be dispensed or injection molded.

Two Component Epoxy Adhesive for Reinforcing a Discontinuity in a Metal Card

Epoxy adhesives are part of the class of adhesives called "structural adhesives," which also includes polyurethane, acrylic, cyanoacrylate and others. Epoxies are formulated as liquid reactive polymers that undergo a chemical reaction when mixed and then cure to form a solid plastic material. Once the two parts are mixed in their specified ratio, they begin the curing process and offer a limited work life (open time) where the adhesive can be applied and the two surfaces positioned as needed. This work life lasts anywhere from a few minutes to several hours. These structural adhesives provide high shear and peel strengths, depending on the formula, and better heat and chemical resistance than other common adhesives. In general, epoxy adhesives have the highest overall strength and offer the best performance and most resistance to high temperatures, solvents and outdoor weathering. Reference is made to 3M™ Scotch-Weld™ Epoxy Adhesive DP405.

Reinforcing a Slit Prior to a Paint Bake Coating Process at Elevated Temperature A two-component epoxy adhesive in the application of a metal card may be used to reinforce a discontinuity in the form of a slit, slot or notch. The epoxy may be a black, toughened, two-part epoxy structural adhesive that provides good strength along with high impact and fatigue resistance. It may maintain bond strength at high and low temperatures and withstand paint bake operations up to 400° F. for 60 minutes. It may work on a variety of substrates such as metals, ceramics, wood, glass and many composites.

The paint bake operation may be performed as a decorative process with mechanical finishes such as brushing and spinning. Reference is made to: http://www.norcorp.com/decorated-metal-cards Reference is also made to the following:
Title: "RFID Enabled Metal Transaction Cards with Reinforced Slit"

This disclosure relates to the field of RFID enabled metal transaction cards, in particular metal transaction cards with a discontinuity which renders the chip module side of the card body instable, and requires a medium to reinforce the area around the discontinuity.

(E110)
Inventor(s): Finn
Ser. No. 62/894,976
Filing Date: 3 Sep. 2019

This is related to sealing and reinforcing of a metal layer forming part of a smartcard body in which the metal layer(s) is destabilized by the presence of a slit, slot or gap (discontinuity) which runs from an opening in the metal layer to a peripheral edge. Prior art proposes injection or transfer molding around the area of the slit and opening to strengthen the card body, but such methods require additional mechanical steps such as back-grinding and polishing to achieve a perfectly flat and homogenous surface.

A repair liquid or a two-component epoxy may be used to fill the slit, slot or gap and a patch may be used to cover the corresponding area on one or both sides of the discontinuity in the metal layer. The patch may be made of a synthetic material like nylon or a composite material to support the metal layer with the discontinuity. The patch may fit into a recess in the metal layer. The patch may pass from a front face to a rear face of the metal layer, passing through the slit to prevent movement of the metal around the area of the slit. The patch may have a logo or graphic elements embedded therein while at the same time covering the area around the slit. The patch may be visible through a transparent window in a plastic layer laminated to the metal layer.

Non-conducting rivets may be used to reinforce the slit or slot at different positions along its passage from the opening in the card body to a peripheral edge.

The slit may form a pattern of machined slits in the metal layer that represent a name, character or special shape. The slits may be cut or engraved. The pattern may be visible through a transparent window in a plastic layer laminated to the metal layer.

The metal layers which make up the stack-up construction of the card body may have slits in opposing directions. The metal layers may also have their grain direction in opposite directions (perpendicular as opposed to parallel).

The machined slits or slots may be accompanied by through-holes aligned in pairs, one on each side of the slit or slot, which may be used to affix a bridge or fixture across the slit or slot for mechanical stability of the metal layer.

In summary, RFID enabled metal transaction cards comprise of a metal core or metal layers having a slit or slot to act as a coupling frame for contactless communication. The slit or slot (aka a discontinuity) in the metal destabilizes the mechanical integrity of the metal transaction card. To reinforce the area around the discontinuity, a repair liquid or a two-component epoxy is applied therein, and in addition may be supported by a patch.

The discontinuity may have a shape other than a slit, slot or gap, but rather a slit accompanied by an additional opening in the form of a star or additional cuts in the form of spikes. The star or spikes facilitate the increased rigidity of the metal card body after the repair liquid is applied and allowed to cure to a hardened state. The spikes may be laser cuts through the entirety of the metal layer or partially through the metal layer.

The metal layers which make up the stack-up construction of the metal transaction card may have their grain direction in opposite directions (perpendicular as opposed to parallel) to strengthen the rigidity of the card body.

The machined slits or slots in the metal layer or layers may be accompanied by through-holes aligned in pairs, one on each side of the slit or slot, used to affix a bridge or fixture across the slit or slot in order to improve the mechanical stability of the metal layer.

The drop acoustics of a metal transaction card may be affected by the selected technique to strengthen the area around the discontinuity.

Metal Inlays and the Companion DI Chip Module (Prior Art)

Stainless steel metal inlays are delivered to the secure card manufacturer in sheet form, typically as an array of RFID slit antenna sites, with fiducial marks for artwork alignment.

The inlay is typically a 2×8 or a 5×5 array of antenna sites. The inlay material is anti-magnetic stainless steel with a reference edge, and depending on the desired weight of the final transaction card the thickness of the inlay may range from 300 μm (~12 mils) to 500 μm (~20 mils).

U.S. 63/040,544 illustrates a 5×5 format with dimensions in inches.

The companion dual interface chip modules are delivered on standard 35 mm double sided epoxy-glass tape (MT) with ISO contact pads on the face-up side, and a backside module antenna (MA) connected to the integrated circuit (IC) or RFID chip on the face-down side.

A conventional dual interface chip module (DI chip module) or transponder chip module (TCM) may be generally rectangular, having four sides, and measuring approximately 8.2 mm×10.8 mm for a 6-contact module and 11.8 mm×13.0 mm for an 8-contact module. The drawing below illustrates front and rear views of a DI chip module having a contact pad array (CPA) comprising 8 contact pads (CP, or "ISO pads") disposed on the "face-up side" or "contact side" of a module tape (MT) or chip carrier tape (CCT), for interfacing with a contact reader in a contact mode (ISO 7816). The module antenna (MA) is disposed on the face-down side of the module tape (MT) for implementing a contactless interface, such as ISO 14443 and NFC/ISO 15693. Refer to U.S. 63/040,544

A connection bridge (CBR) is disposed on the face-up side of the module tape (MT) for effecting a connection between the module antenna (MA) and the RFID chip on the face-down side of the module tape.

Manufacturing Metal Inlays for Dual Interface Metal Cards (Prior Art)

The manufacturing technique to produce a double metal layer inlay separated by a dielectric is described in the prior art as follows: a single metal layer (ML) in sheet form with an array of laser cut slits at each card outline (CO) position may be folded in the center at the point of perforations (PERF) to create a two layer metal inlay. In other words, a metal sheet with an array of slits at each card outline (CO) position (or card body site) may be folded on itself to create a double metal layer inlay in sheet format.

A two-layer metal inlay may be separated by an adhesive layer (AL) in a 2×8 or 5×5 format, a stack-up construction before lamination, forming the core of a metal embedded transaction card. The upper (top) metal layer (ML1) in the stack-up construction comprises an array of slits (SA1), module cavities (MC) at each card outline (CO) position and fiducials (FA1) for registration; a double-sided adhesive layer (AL) for bonding of the metal layers (upper & lower); and a lower (bottom) metal layer (ML2) comprises of slits (SA2) finishing in slit termination holes (STH) and fiducials (FA2). In a manufacturing process, the top and bottom metal layers with the adhesive in the center are laminated together to form a metal core.

In detail, a single metal layer (ML) in sheet form can be folded in the center at the perforations (PERF) to create a two layer metal inlay: on the left hand side of the perforations (PERF) in the center of the metal layer (ML), registration marks for alignment are provided in the form of an array of fiducials (FA); an array of front face slits (SA1) are provided with their ends finishing in slit termination holes (STH); and module cavities (MC) at each inlay site are also provided in this top metal layer. On the right hand side of the perforations (PERF), an array of slits (SA2) end in slit termination holes (STH) forming the bottom metal layer of the metal inlay.

Transaction Cards with Multiple Metal Layers and Techniques to Avoid Electrical Shorting Transaction cards having two or more metal layers (ML1, ML2), each of which may be provided with a slit (S1, S2) to function as a coupling frame (CF1, CF2) may be described. Generally, these two (or more) layers should be separated by an insulating layer (dielectric).

A stepped module opening (MO) in an embedded metal transaction card (plastic front/metal laminated core/plastic back) may be formed in the front plastic layer(s) and laminated metal core to accept the shape and dimensions of a transponder chip module (TCM). In general, the first step (P1) formed in the front plastic layer(s) and into the surface of the laminated metal core is a pocket to accept the thickness and shape of the chip carrier tape or module tape (CCT, MT) having a recess depth of approximately 250 μm. The laminated metal core may comprise two metal layers separated by a dielectric and having a total thickness of 300 μm (12 mils). The second step (P2) formed in the plastic layer(s) and laminated metal core is dimensionally sized to match the assembly of the RFID die to the chip carrier tape (CCT, MT), by means of wire bonding or flip chip, and encapsulated with epoxy for environmental protection. The depth of the second step through the front plastic layer(s) and laminated metal core is approximately 580 μm, a pocket extending from the first recess (P1) into the card body to a depth of 330 μm.

In an embedded metal transaction card comprising a front plastic layer(s) and a rear plastic layer(s) sandwiching a laminated metal core comprising two metal layers (ML1, ML2) with slits (S1, S2) offset from one another to act as a coupling frame, the recess depth of P2 comes close to the rear plastic layer(s) of the card body. The metal layers are separated by a dielectric layer coated with adhesive. During CNC milling of P1 and P2, there may be smearing of the module pocket walls caused by ageing or dulling of the milling tool which results in an electrical short circuit between the first and second metal layer (ML1, ML2). The electrical short circuit which may be caused by CNC smearing at the interface of the metal layers, may be avoided by laser cutting a module cavity (MC) in the first metal layer, thereby creating a clearance distance of approximately 0.5 mm between the steps P1 and the deep trench of P2.

Prior to CNC milling of the module opening (MO) to accept a transponder chip module (TCM), a module cavity (MC) is laser cut into the top metal layer of the inlay (consisting of a top metal layer, a dielectric layer and a bottom metal layer) before lamination. The dimensions of the module cavity (MC) are sized to be slightly greater than the lateral dimensions of the P2 pocket.

The first step in CNC milling is to machine P1 which matches the contour dimensions of the front face plate of the module tape (MT) with contact pads (CP) and the second step is to machine P2 which is a pocket sized to accept the rear geometry of the transponder chip module (TCM). The intermediate step of laser cutting a module cavity (MC) in the top metal layer introduces a dimensional separation or clearance between the two metal layers before CNC milling.

To avoid CNC smearing of the narrow slit(s) at the module opening (MO) resulting in a short circuit across the slit(s), the area may be widened to end in a slit termination hole (STH).

A "core" or "inlay" may comprise a first metal layer (ML1) and a second metal layer (ML2). A module opening (MO1) may be formed in the first metal layer by laser cutting, prior to laminating. A module opening (MO2) may be formed in the second metal layer by milling, after laminating the first metal layer to the second metal layer.

Manufacturing in a Reel to Reel (Web) Process

U.S. Pat. No. 6,019,268 (1 Feb. 2000; Melzer; Melzer et al.) discloses method for fabricating plastic cards. A substrate tape (film) is perforated with evenly spaced holes, and when placed in a working station, positioning pins engage into the holes. The spacing between two sets of pins is then slightly increased thereby tensioning the film without stretching it thereby providing for highly accurate alignment. The plastic substrate tape (film) may be wound up to form a coil.

The independent claim of U.S. Pat. No. 6,019,268 may read, as follows:

1. A method for fabricating plastic cards, comprising the steps of: providing a plastic substrate tape having lateral margin strips; perforating said substrate tape within said margin strips thereby forming uniformly spaced holes in said margin strips of said substrate tape, providing at least one working station through which said substrate tape is stepwisely moved from an upstream side to a downstream side, providing an upstream set of pins and a downstream set of pins, said pins being adapted to engage into upstream holes and downstream holes, respectively, of said holes in said substrate tape when said substrate tape is on said at least one working station, providing means for stepwise displacement of said substrate tape across said at least one working station from the upstream side to the downstream side, displacing said substrate tape across said at least one working station using said means for stepwise displacement and lowering said substrate tape onto said pins and engaging said sets of pins into said upstream and downstream holes, increasing the distance between said upstream set of pins and said downstream set of pins by a predetermined amount such that the pins snugly engage walls of the holes, thereby aligning said substrate tape in said working station, then processing said substrate tape in said working station, then decreasing said distance spacing by said predetermined amount, and then lifting said substrate tape from said upstream set of pins and said downstream set of pins.

The teachings of '268 are silent with regard to the transport of metal to produce metal inlays for RFID enabled metal transaction cards.

U.S. Pat. No. 6,139,664 (31 Oct. 2000; Melzer Maschinenbau; Melzer et al.) discloses process for producing plastic cards. A method of producing plastic cards with a layer structure, in each of which cards a flat coil and a chip which is connected thereto are embedded, these components being placed on a first web, to which a subsequent web for accommodating apertures for the components and at least one covering web are applied, which webs are then joined together by lamination so as to form a final web, out of which plastic cards are stamped. In order to simplify such a method, it is envisaged that a second web, which is placed on the first web, is held on a selectable web section of the latter by means of fixing points, while an aperture which is to accommodate the flat coil is made in the second web, for which purpose the fixing points are distributed in such a manner that they are arranged on both sides next to a part of the web which corresponds to a shape of the flat coil, and then the flat coil, in order to be placed on the first web, is inserted into the aperture formed in this way and the chip is inserted into a web which is provided with a chip opening.

The teachings of '664 are directed to producing RFID plastic cards with a layer structure from multiple webs of material in which components such as an antenna connected to a chip are mounted to a first web layer and subsequent layers provided with apertures or openings are applied thereto and laminated with covering layers to produce a contactless plastic card, punched out from the laminated web. There is no mention of an antenna in the form of a metal coupling frame, nor is there any mention of metal forming part of the card body construction.

U.S. Pat. No. 6,669,813 (30 Dec. 2003; Melzer Maschinenbau; Melzer et al.) discloses device for laminating a layered structure consisting of at least two plastic strips in sections, and relates to a device for laminating a layered structure (1), consisting of at least two plastic strips in sections, comprising successive panels with designs, for producing plastic cards along a conveyor path. Said device comprises heating and cooling devices (8, 9, 10, 11) which are positioned one behind the other and consist of individual compression elements, located on a common support (14), whose temperature can be controlled and which accommodate a whole number of panels and a drive unit which displaces opposing compression belts (2, 3) which can be driven intermittently in a direction of transport and between which the plastic strips can be displaced in sections through the heating and cooling devices. The aim of the invention is to provide a device which permits the production of plastic cards with a higher laminate quality. To this end, the compression elements are mounted so that they can be displaced in the direction of the conveyor path against a restoring force which acts upon their initial position.

The teachings of '813 are silent with regard to the conveyance of metal and the hot and cold lamination of layered structures containing metal and plastic substrates to produce RFID enabled metal core or metal face transaction cards.

US 2016/0257019 (8 Sep. 2016; Melzer Maschinenbau; Baist) discloses method and device for machining a substrate. A method for machining a flat substrate having at least one layer passes the substrate in the form of a strip, web or sheet through at least one machining tool together with a strip-like, web-like or sheet-like filler material on different levels; the substrate is positioned and held, more particularly in the vicinity of the machining tool; at least one punch-type component of the machining tool creates an opening, more particularly a window, at a pre-determinable point on the substrate; the component is then moved to an area outside the opening; and in another stroke an element that matches the cross-section of the opening is punched out of the filler material by the component of the machining tool, is moved by the component towards the opening in the clamped substrate, and is placed by the component in the opening in the substrate.

Metal Inlays with Card Outline Cut-Outs and Supporting Struts

The prior art on the manufacturing techniques of producing a double layer metal inlay propose an array of card body sites or card outline positions with slits on a metal sheet, twice the length of a single metal layer inlay, which can be folded on itself in the middle at the position of perforations which run perpendicular to the length direction of the metal sheet. On the left hand side of the perforations one has the upper metal inlay layer with slits, module cavities and fiducials while on the right hand side one has the lower metal inlay layer with slits in a different orientation ending in slit termination holes. The array of card body sites is a 2×8 or a 5×5 format.

The prior art is restricted to metal inlays in sheet format and does not consider an endless web of card body sites. Further, the prior art does not consider having the perforations running parallel to the length direction of the metal. In addition, the prior art does not consider laser cutting the metal inlay around the perimeter edges of each card body site to reduce the processing of time for card singulation by means of CNC milling. Therefore consideration is given to a reel to reel (web) manufacturing process, having two or four rows of card body positions across the metal in an endless format which can be machine processed such as the incremental steps of punching alignment holes, fiducial marking, laser cutting (slits, cavities, card body outlines) collating materials and laminating. The materials fed into the in-line machine may be from a reel or coil of metal, adhesive film or synthetic plastic. In other words, multiple layers of different materials can be fed into the machine from a reel, but does not exclude sheets of printed stock being processed in the same machine. A row of four rows can be perforated to create a double layer inlay with two rows.

The teachings of Melzer with respect to plastic card manufacturing may be applied to metal core and metal face transaction cards in which the metal from a wound up coil of metal is first perforated with evenly spaced alignment holes which can be applied to the metal by means of punching or laser cutting. To remove any oil on the surface of the metal, the metal coil may be cleaned with a detergent by feeding it through an ultrasonic bath. In the machine to process the metal a continuous conveying belt with positioning pins engage into the alignment holes for the purpose of transporting the metal to each work station.

To singulate a metal card body from a laminated inlay with array of card body sites (typically in a format of 2×8 or 5×5), with the laminated inlay having a layered stack-up construction comprising of front and rear plastic layers adhesively attached to a metal core, the first step in the extraction process is to CNC mill the individual card bodies from the laminated inlay held in position using a vacuum chuck, and applying a roughening tool at high speed to isolate the individual card bodies from the inlay. The roughening process is followed by chamfering the upper and lower edges of each card body to have a smooth surface and further followed by milling a stepped pocket (module opening) in each card body for later implanting of a transponder chip module. As the CNC milling process is a very time consuming process, it is proposed to optimize the cycle time of producing a card body by laser or water cutting the card outline and module opening at each position during the machining of the inlay. This laser or water cutting of the inlay in advance of CNC milling reduces significantly the total process time to produce a card body, but combining this technique with a web fed system further improves the manufacturing efficiency.

FIG. 4 of 62/885,327 (E101) is a diagrammatic view of a perforated metal inlay (MI) site with a metal frame (MF) formed by laser cutting, water cutting or chemical etching, featuring a front and rear metal layer with a slit (S) and module opening (MO) to act as a coupling frame (CF), and the coupling frame (CF) supported by struts (SRTs) connected to said metal frame (MF), with the metal frame (MF) having alignment holes (ah) for later precision punching or cutting, in facilitating the singulation of a metal card body (MCB) from a laminated metal inlay (MI) with front and rear plastic layers.

The coupling frame (CF) is separated from the metal frame (MF) by a laser cut air gap (ag).

Not shown is a dielectric layer with an adhesive coating on each side which is positioned between the front and rear metal layers, prior to the front and rear metal layers being folded over on each other to form a metal core in a plastic-metal-plastic smartcard. The shape and size of a transponder chip module (TCM) fits precisely the laser cut opening (MO) in the front and rear metal layers. The openings may be stuffed with a plastic slug prior to lamination with upper and lower plastic layers.

Reference is also made to the following:

Title: "Metal Inlays to Produce Dual Interface Metal Core Smartcards"

This disclosure relates to the field of metal transaction cards, in particular the manufacturing process of producing metal inlays which form an integral part of a metal transaction card with contact and contactless functionality. The metal inlays may be laser cut from an endless web of metal, with laser cut steps replacing timing consuming card milling steps.

(E101)

Inventor(s): Finn

Ser. No. 62/885,327

Filing Date: 12 Aug. 2019

An embedded metal smartcard operating in a contactless mode, including dual interface (contact and contactless) smartcards may have a metal inlay (MI) composing of a coupling frame (CF) with a slit (S) to concentrate surface eddy current density around the antenna structure (AS) or antenna module (AM) of a transponder chip module (TCM). The metal inlay (MI) may further compose of a metal frame (MF) supporting a coupling frame (CF). The coupling frame (CF) may be a single metal layer or be composed of two metal layers separated by a dielectric layer and laminated together to form a pre-laminated metal inlay.

The coupling frame (CF) represents the core metal layer or layers (pre-laminated) of a metal card body (MCB), in the form of a DI embedded metal smartcard (aka DI metal core smartcard & DI metal veneer smartcard), having a plastic front and plastic rear sandwiching the single metal layer or the pre-laminated metal layers. The coupling frame (CF) or an array of coupling frames in a given inlay format is or are laser or water cut from a metal sheet or from a reel (web) of metal. The metal sheet or metal reel comprising an array of metal inlay sites may accommodate a front and rear metal layer in a two-layer inlay construction having a perforated center allowing for the folding of the front metal layer over the rear metal layer separated by a dielectric. The metal inlay may further comprise a metal frame (MF) which supports the coupling frame (CF) by means of struts.

In other words, a single metal layer, or two metal layers which are later folded over on each other, may form the core of a metal card body (MCB). The folded metal layers may be electrically separated from each other by a dielectric layer having an adhesive backing on each side. The single metal layer or the folded metal layers (with dielectric layer) may be regarded as a metal inlay (MI) site composed of a metal frame (MF) supporting a coupling frame (CF) which later forms the metal card body (MCB). The cutting process to produce a metal inlay (MI) is performed in such a way so that the coupling frame (CF) is suspended by struts from the metal frame (MF). The metal inlay may also be formed through chemical etching.

The objective is to avoid CNC milling of the individual card body from a metal inlay site after plastic and adhesive layers (front and rear) have been laminated to the metal inlay (MI). CNC milling is a costly process in terms of manufacturing time. And instead, the metal card body (MCB) is physically cut or punched from the metal frame (MF) supported by the struts. The supporting struts can be on one metal layer in the case of the folded metal layers separated by a dielectric layer, or the struts may support a single metal layer. The metal layers may have a thickness of 150 µm with an inner dielectric layer having a thickness of 25 or 50 µm, while a single metal layer may have a thickness of 350 µm. The "edge to edge" metal provides weight and structure to the DI smartcard. The slit (S) in a single metal layer or slits (S) in the laminated metal layers may extend from a perimeter edge to the module opening (MO), or the slit or slits may not extend to the module opening (MO). The slit or slits may be straight, curved or meandering in form. During the laser or water cutting process, the edges of the coupling frame may be dulled to remove sharp edges. In a final lamination process, the metal inlay with one card body site or a plurality of card body sites is laminated with front and rear white plastic layers (including adhesive layers) so that the metal inlay is completely shrouded with white plastic, in preparation for digital printing. Alignment holes (ah) in the metal inlay may facilitate the precise cutting or punching of the individual card bodies from the pre-laminated sheet (shrouded) having a thickness of approximately 600 µm. Proper selection of adhesive in the card construction maintains the metal sound effect when tossed on a hard surface.

The techniques described herein may equally be applicable to dual interface embedded metal cards produced using traditional offset printing. Equally, the techniques may be applicable in producing contactless smartcards without a contact interface.

In summary, dual interface embedded metal smartcards (plastic front-metal core-plastic back) may be produced from a metal inlay laminated with plastic layers having an array of metal card body sites, without having to CNC mill the individual card bodies from the array. The metal card bodies are extracted from the metal laminate by a technique of cutting or punching using alignment holes or metal inlay corners for registration. The metal inlay comprises a metal frame having struts to support a coupling frame in the form of a card body. The struts simply hold the coupling frame(s)/card body in place, with an air gap existing between the metal frame and the coupling frame. The metal inlay may comprise of a single metal layer or two metal layers laminated together separated by a dielectric layer. The two metal layers may be prepared on a single metal sheet having perforations to allow for bending of the single metal sheet so that the metal layers are folded over on each other. The metal inlay (MI) composed of a metal frame (MF), supporting struts, coupling frame (CF) with slit (S) and module opening (MO), perforations, alignment holes and air gap are formed by means of laser cutting, water cutting or chemical etching.

The coupling frame(s) may (each) have a slit extending from a perimeter edge to a module opening, or the slit may not extend to the module opening. The slit may be straight, curved or meandering in form. The metal inlay may be shrouded in plastic, with no metal exposed.

Plastic-Metal-Plastic smartcards and methods of manufacture are disclosed. Such cards may be contactless only, contact only, or may be dual-interface (contact and contactless) cards.

The metal inlays can be manufactured from metal sheets or the metal inlays can be manufactured from a reel of metal and processed step by step in a continuous production line.

Diamond Like Carbon or Plasma Vapor Deposition Coating of Metal (Prior Art)

A metal card body (or a layer thereof) can be made from aluminum and may be directly colored by an anodizing procedure, or a layer of stainless steel or titanium can be colored black with a deposited layer (5-7 µm) of diamond-like-carbon (a-C:H) or black ceramic coating.

Should a metal layer or metal card body be highly polished prior to coating, the diamond like carbon (DLC) will result in a gloss finish. To conceal a slit in a metal layer or metal card body (such as in stainless steel or titanium), the metal may be sand blasted (or glass bead blasted), such as before a DLC or PVD (plasma vapor deposition) coating, and the finish may turn out to be matt (not glossy) so that the slit is nearly impossible to see. Alternatively, the metal can be prepared with a brushed effect, equally resulting in a matt finish and concealing the presence of the slit.

Non-Conductive Coatings

Coated metal cards with a nano-layer of diamond-like-carbon or titanium nitride (or any oxide layer) making the surface area non-conductive impairing the effects of electrostatic discharge (ESD) may have a defined area in which the bearer of the card can touch on each side (both, opposite sides) of the card body to effectuate a measurement or to switch-on a light source. Because of the layered construction, the perimeter edges of the metal card may also be used to short-circuit an electronic circuit by merely touching the exposed conductive metal edges.

Non-Conductive Card Bodies with RFID Slit Technology

There is a growing need to integrate electronic subassemblies into metal containing transaction cards such as a dynamic display, fingerprint sensor, LED, and for the card to operate in passive mode with a point of sale terminal by using the contactless interface to drive the electronic components and harvest energy.

The cross-sectional construction of an exemplary metal face transaction card may comprise a non-conducting anodized aluminum layer on a stainless steel supporting layer, with no electrical connection between the metal layers. The slit on the front face metal layer may be curved, meandering, having the shape of a saxophone or made up of tangents emanating from the module opening.

The stack-up construction of such a metal face non-conducting anodized aluminum transaction card may be as follows (all dimensions approximate and exemplary):

Metal Face with a micro-slit in the aluminum layer: 380 μm (anodized with a 12 to 18 μm oxidized colored surface) and protected with a scratch resistant UV hard coat layer (~12 μm);
Double-sided Adhesive on a PET Carrier 63.5 μm;
Supporting Metal Layer (Stainless) with Slit: 250 μm;
Double-sided Adhesive on PET Carrier 63.5 μm; and
Plastic backing (Overlay Material) with same color as the metal face capturing the magnetic stripe and signature panel: 50 μm with and an inkjet-printed layer of 15 μm: 65 μm;
Total Thickness Prelamination: 834 μm The adhesive layer on the PET carrier (63.5 μm) many be replaced by a thin adhesive layer comprising polyurethane, high molecular weight polyurethane or polyurethane/acrylic copolymer with a layer thickness of 25 μm. This interchange of the adhesive layers with PET carrier results in a reduction of 77 μm which could be used to increase the thickness of the stainless steel supporting layer.

The cross-sectional construction of an exemplary metal face transaction card using thin layers of adhesive may comprise a stainless steel supporting layer with slit, a first non-conducting anodized aluminum layer with slit and a second non-conducting anodized aluminum layer with slit. The module pocket may be configured to receive at least one of a contactless chip module or a dual interface chip module. Internal to the card body construction an antenna structure on a flexible circuit is coupled to the slit.

The alternative card stack-up construction:
(dimensions approximate and exemplary)
Metal Face with a micro-slit in the front face aluminum layer: 215 μm (anodized with a 12 to 18 μm oxidized colored surface) and protected with a scratch resistant UV hard coat layer (~12 μm);
Adhesive Layer: 25 μm film;
Supporting Metal Layer (Stainless) with Slit: 250 μm;
Adhesive Layer: 25 μm film;
Rear aluminum layer: 215 μm (anodized with a 12 to 18 μm oxidized surface);
Adhesive Layer: 25 μm film; and
Overlay material (laser engravable) 50 μm for magnetic stripe and signature panel with inkjet-printed ink and primer 15 μm: 65 μm
Total Thickness Prelamination: 832 μm
ISO dimensional limits: Min 0.68 mm to max 0.84 mm-Min 0.027 inch to max 0.033 inch First non-conducting anodized aluminum layer is joined or attached to first side of the stainless steel layer.

Second non-conducting anodized aluminum layer is joined or attached to second side of the stainless steel supporting layer. As described above, any sort of direct or indirect connection between first non-conducting anodized aluminum layer, second non-conducting anodized aluminum layer, and the respective sides of the stainless steel layer (including through intermediary layers) will suffice.

Any of the connection methods, or combination of these methods, described above (e.g., adhesive spray coating on, press-fitting in, or adhering to the stainless steel supporting layer) may be used to join or attach.

Various colors and textures may be imparted to the transaction card. Color may be introduced to the transaction card by dye-sublimation, an overcoat or by adding pigments and/or dyes into the aluminum body.

Additional decorative features may be CNC machined or produced using inkjet, drop on demand printing, or laser ablation. A signature panel may be produced by ablating/etching a portion of the non-conducting anodized aluminum body, thereby making that particular area of the card body receptive to ink or dye.

Alternatively, the user's signature can be digitized and then laser engraved onto the non-conducting anodized aluminum card body. By manufacturing the signature panel in this manner, cost savings are realized in the elimination of additional components and steps (e.g., a separate polymeric signature panel and the adhesive layer necessary to hold this separate component in place).

The metal core may be any suitable metal, such as stainless steel, bronze, copper, titanium, tungsten carbide, nickel, palladium, silver, gold, platinum, aluminum, or any alloy which gives the card most of its body (structure) and weight. Additionally, or alternatively, the core layer may be one or a composite of any suitable polymeric (polycarbonate, polyester, PVC, PETG, PLA, and blends thereof) and inorganic (e.g., glass, ceramic, cellulosic) material.

In one step, a pocket is provided in the layers for receiving a contactless chip module or dual interface module. For example, a slit may be defined to receive an antenna structure on a flexible circuit for use in connection with an RFID chip, which can be disposed below the aluminum or stainless steel layer. In another step, the aluminum layer may receive a surface finish. Surface finishing can include any method suitable for structuring of the exposed metal such as, e.g., bead blasting, tumbling, brushing, etc.

FIG. 5A of 62/891,308 (E108) shows a diagram (perspective view) illustrating an assembly of a metal card body composed primarily of a metal layer (ML) acting as a coupling frame (CF) with a slit (S) and a back-panel referred to as a "rear card body" (RCB) for fitting into a recess area in the metal card body, also referred to as a "front card body" (FCB).

FIG. 5A illustrates an exploded view of a metal card construction with a transponder chip module (TCM) 501, front card body (FCB) 502, a slit (S) 504 extending from a perimeter edge of the card body to an area close to the module opening (MO) 503 and an adhesive film (AF) not shown. The rear card body (RCB) 508 may accommodate the magnetic stripe (MS) 510 and signature panel (SP) 511. The rear card body (RCB) may comprise a metal layer with a slit or slits. The metal layer may be oxidized so that its surface is rendered non-conductive.

The transponder chip module (TCM) 501 may be a wire bonded module or a flip-chip module. The metal layer (ML) 502 may be made of two metal layers rolled together, such as aluminum and stainless steel.

The inner face of the rear card body (RCB) 508 may feature a flexible circuit (FC) with an antenna structure (AS) 506 to overlap the slit (S) 504 and the module antenna (MA) 505 of the transponder chip module (TCM) 501 forming a coupling loop structure (CLS) 507, to direct induced eddy currents around the module antenna (MA) 505 and permitting inductive coupling.

FIG. 5B of 62/891,308 (E108) shows a diagram (rear view) illustrating the shape and features of the rear card body (RCB) housing the magnetic stripe (MS) and signature panel (SP). The rear card body may be made from a non-conducting material such as fabric, plastic, carbon fiber, glass fiber, paper, film, ceramic, glass, wood, stone or any composite material. The rear card body (RCB) may be made of metal featuring a slit or slits.

FIG. 5B shows the outer face of the rear card body (RCB) 508. The RCB shown features a magnetic stripe (MS) 510 and a signature panel (SP) 511 with both elements integrated into the non-conductive material. Therefore, a recess may not be necessary to accommodate the elements. The rear card body (RCB) does not feature a module opening (MO).

The slit (S) 504 may describe any shape, including spiral, curved, meandering, in order to optimize the overlap of the coupling frame (CF) with the antenna structure (AS) on a flexible circuit (FC) assembled to the rear card body (RCB). The slit may be injected molded or filled with a resin or fiber glass for reinforcement. The rear card body (RCB) may also accommodate the placement of a security hologram, logo or other feature. Logos may be CNC milled or diamond cut.

FIG. 6 of 62/891,308 (E108) shows a diagram (perspective view) illustrating an assembly of a metal card body composed primarily of a metal layer (ML) 602 acting as a coupling frame (CF) with a slit (S) 604, contact pads (CP) 601 protruding through the non-conducting anodized metal layer (ML) 602 and a rear card body (RCB) 608 with an antenna structure (AS) 606 for fitting into a recess area in the front card body (FCB) 602. The antenna structure (AS) 606 couples with the slit (S) 604 and the module antenna (MA) 605 forming a coupling loop structure (CLS) 607 on a flexible circuit (FC).

FIG. 6 illustrates an exploded view of a metal card construction with contact pads 601 protruding through the front card body (FCB) 602, a slit (S) 604 extending from a right perimeter edge of the card body to an inner area. The rear card body (RCB) 608 may accommodate an antenna structure (AS) 606 to inductively couple with a module antenna (MA) 605 and a slit (S) 604. An adhesive film (AF) not shown joins the front card body (FCB) 602 to the rear card body (RCB) 608.

Reference is made to the following:
Title: "Anodized Aluminum Transaction Cards with RFID Slit Technology"
This disclosure relates to the field of RFID enabled transaction cards and, more particularly, transaction cards having at least one metal layer coated to make the surface non-conductive.
(E108)
Inventor(s): Finn
Ser. No. 62/891,308
Filing Date: 24 Aug. 2019

A transaction card having a non-conducting anodized aluminum card body may comprise one or more pockets or recesses, and at least one of a magnetic stripe, a laser signature panel, a hologram, and having an issuing bank and payment scheme logo laser etched or CNC milled into the card body.

The transaction card may have a stainless steel core or any metal layer with a slit having a first side and a second side. A first non-conducting anodized aluminum layer with slit is joined or attached to the first side of the stainless steel layer.

The transaction card may further comprise a stainless steel core layer with a slit having a first side and a second side. A first non-conducting anodized aluminum layer with slit is joined or attached to the first side of the stainless steel core layer. A second non-conducting anodized aluminum layer with slit is joined or attached to the second side of the stainless steel core layer.

The transaction card may in addition comprise a stainless steel core layer with slit having a first side and a second side. A first non-conducting anodized aluminum layer with a slit disguised by an aluminum oxide is joined or attached to the first side of the stainless steel core layer. A second non-conducting anodized aluminum layer with a slit disguised by an aluminum oxide is joined or attached to the second side of the stainless steel core layer.

The front and rear non-conducting anodized aluminum layers with slit may be coated with an ink and lacquer to camouflage the presence of the slit or slits.

The slit or slits in the metal layers extend from a perimeter edge to an area close to the module pocket, or the slit or slits commence from an area within the metal layer to the opening of the module pocket. An antenna structure as part of a coupling loop structure is closely coupled to the slit or slits. The antenna structure may touch the non-conducting anodized aluminum layer. Another antenna structure as part of the coupling loop structure is closely coupled to the module antenna of the transponder chip module.

The antenna structure may be used to pick-up surface currents around a discontinuity in the anodized aluminum or stainless steel layer, and such antenna structure may run perpendicular or parallel to the direction of the discontinuity. The antenna structure may wrap around partially or entirely the discontinuity in the form of a slit or the antenna structure may meander within the open area of the slit.

The transaction card may comprise of non-conducting anodized aluminum which may be used to house electronic components without the need to take measures to isolate/separate the electronics from the metal. A flexible circuit with an antenna structure may be attached directly to the anodized aluminum and in particular to overlap a slit for inductive coupling when the metal card body is exposed to an electromagnetic field generated by a reader.

The contact pads may protrude from openings in the non-conducting anodized card body, and may be located at the ISO positions ($C_1 \ldots C_8$) defined by ISO 7816.

In summary, an RFID enabled transaction card includes a non-conducting anodized aluminum card body having a module pocket to receive a dual interface chip module, and at least one of a magnetic stripe, a signature panel, a hologram, a payment scheme logo and or commercial indicia.

An RFID enabled transaction card may also include a stainless steel core or any metal layer to provide weight and tensile strength having a first side and a second side. A first non-conducting anodized aluminum layer is joined or attached to the first side of the stainless steel layer. The non-conducting anodized aluminum and stainless steel layer have a slit or slits extending from a perimeter edge to a position close to the module pocket receiving the dual interface chip module. The slit or slits may commence from any position in the metal layers and extend close to a module opening or to an area facilitating inductive coupling. The slit or slits may be disguised or camouflaged by an aluminum oxide growth or by an ink coating with a protective lacquer. The slit or slits may be masked with nylon for reinforcement.

An RFID enabled transaction card comprising of non-conducting anodized aluminum may be used to house electronic components without the need to take measures to isolate the electronics from the metal. A flexible circuit with an antenna structure may be attached directly to the anodized aluminum and in particular to overlap a slit for inductive coupling when the metal card body is exposed to an electromagnetic field.

Brushed Metal Effect to Hide a Slit

Brushed or dull polished metal is metal with a unidirectional satin finish. It is produced by polishing the metal with a 120-180 grit belt or wheel then softening with an 80-120 grit greaseless compound or a medium non-woven abrasive belt or pad. The intensity of the brushed finish is specified as a surface roughness and is typically 0.5-1.5 micrometers Ra. The brushed effect can be used to camouflage the presence of a slit in a metal card body.

Three-Dimensional Discontinuity and Opening Between Metal Layers

According to the Prior Art, a coupling frame (CF) may generally comprise a conductive, planar surface or element (such as a conductive layer, or a conductive foil) having an outer edge, and discontinuity such as a slit (S) or a non-conductive stripe (NCS) extending from the outer edge of the conductive surface to an interior position thereof. The coupling frame may be a curved surface, rather than being planar.

Most of the coupling frames may have a "continuous" surface, and may comprise a foil or sheet or layer of metal having a slit (an electrical discontinuity) for overlapping a module antenna and, in some cases having an appropriate opening (MO) for accommodating the mounting of a transponder chip module (TCM).

In use, a coupling frame may be disposed closely adjacent to (in close proximity, or juxtaposed with) a transponder chip module (TCM) having a module antenna (MA) so that the slit (S) overlaps (traverses, over or under) at least a portion of the module antenna. For example, the slit (S) may extend from a position external to the module antenna, crossing over (or overlapping) at least some of the traces of the module antenna, such as extending over all of the traces on one side of the module antenna and may further extend into the interior area (no-man's land) of the module antenna.

In dual interface metal cards according to the prior art, a stack of metal layers each with a slit at different orientations is laminated together to form a metal card body, acting as a coupling frame.

In the current invention, a slit on the same plane as the metal layer is a not a requirement. But rather the slit is replaced by a gap between the metal layers with a physical electrical interconnection being provided between said metal layers at a point, position close to a perimeter edge, or at the very edge of the metal card body formed by the metal layer sandwich. An additional slit may be formed in the metal layer which extends to an opening or a slot. An opening or slot in the metal layer may wrap around the metal card body from a perimeter edge. The gap may accommodate a dielectric medium such as an adhesive layer on a PET or PEN carrier, or an insulating layer such as a ceramic layer, or by means of circuit elements on a flexible or rigid substrate. The RFID chip module (with module antenna connected to an RFID chip, a coupling loop structure (CLS) with an antenna structure (AS) and in some instances a capacitor, all mounted on the flexible or rigid substrate may reside between the metal layers.

The electrical connection point, the metal edge, the opening and the additional slit in the metal layer or layers facilitate the concentration and distribution of surface currents. The component elements of the flexible or rigid substrate are arranged in such a manner to tap into the surface currents to drive the RFID chip.

FIG. 7 of 63/040,033 (E105) illustrates diagrams of planar traces of a helix antenna structure on the front (A side) and rear side (B side) of a flexible or rigid substrate (circuit board). The helix antenna (HA) module comprises a flexible or rigid substrate, connection signal inputs/outputs (terminal ends), plated copper traces and through-hole vertical interconnects. The circuit board includes vias with the antenna traces rotationally passing from side A to side B. This rotationally arrangement of the antenna traces from side A to side B allows for a tighter band of turns in tuning the resonance frequency. The terminal ends of the helix antenna module are electrically connected to an RFID device or to further antenna circuitry.

In application, the helix antenna (HA) module is sandwiched between two metal layers of a proximity card or smartcard with an opening and a discontinuity for each metal layer to function as a coupling frame (CF). The helix antenna (HA) module inductively couples with surface currents on the metal edges of the opening which wraps around both sides of the metal card body (MCB). The discontinuity in the form of a slit extends from the opening to a perimeter edge of the metal card body (MCB), whereby the slit follows the fold line on the edge of the card body.

Folded Metal Layer and Two Metal Layers Electrically Connected

A single metal layer with a slit and an opening which is folded on itself to form two metal layers on the fold line with a slit and opening may be replaced by two individual metal layers which are electrically connected by joining the metal layers at a single point, along a single edge or along a portion of the overlapping metal layers resulting in a slit from the non-connected metal layers in forming a coupling frame. The dimensional length and width of the slit and the shape and orientation of the slit in the two metal layers as well as the separation distance of the two metal layers will determine the intensity of the current density around the opening in the metal layers when exposed to an electromagnetic field. In the teachings set out below, the folded metal layer to form two metal layers to capture surface currents is exemplary and not limited to the scope of the invention. Further, the helix antenna module is also exemplary of an antenna structure to pick-up surface currents.

FIG. 13A of 63/040,033 (E105) presents diagrammatic views of a front surface of a metal layer double the size of an ID-1 card body with two fold lines, a cut-out (half sized opening) located at the top and bottom edge (left hand side) of the metal layer and a complete opening in the vertical center of the metal layer with a slit which commences at a perimeter edge of the metal layer and enters the opening. The metal layer with cut-outs, opening and slit is later folded on itself along both fold lines to form an ID-1 size card body.

FIG. 13B of 63/040,033 (E105) presents incremental diagrams illustrating a top view of a metal layer to form a folded ID-1 card body with two folds with each having a cut-out portion of an opening, a full size opening in the unfolded metal layer which later is concentric with the cut-out openings on the two folded wings of the metal layer. A slit commences at the perimeter edge of the unfolded section of the metal layer and enters the opening in said unfolded section. In addition, a top view of a folded ID-1 metal card body is provided showing an opening on the left hand side through the card body and a slit which runs along the perimeter edges and along the center position of the fold.

Although the slit is continuous as a result of the folded metal edges meeting in the center of the card body, it is feasible to electrically connect both folds at a point along the continuous slit to concentrate surface currents.

Reference is made to:
Title: Proximity Metal Cards
This disclosure relates to proximity metal cards, in particular laminated metal proximity cards with a folded metal edge on one side of the metal card body and a gap between the sandwich of metal layers on all other three sides, with the folded metal edge having a slit which terminates in an opening or window to function as a coupling frame, capable of operating in a "contactless" mode, meeting ISO 14443B or NFC/ISO 15693 for contactless communication.

(E105)
Inventor(s): Finn
Ser. No. 62/888,539
Filing Date: 18 Aug. 2019
(E105v2)
Inventor(s): Finn
Ser. No. 63/040,033
Filing Date: 17 Jun. 2020

Some of the disclosure(s) herein may also relate to an inductive coupling chip module (ICM) or a flexible circuit (FC) with a patch antenna (PA) or sense coil (SeC) a coupling loop structure (CLS) with an antenna structure (AS), embeddable in a metal housing, casing, foldable metal structure or a laminated metal layer stack-up construction.

In order to divert the surface currents from the surrounding area of a slit (S) or notch (N) and an opening to an area destined for the implanting of a transponder chip module (TCM) with a module antenna (MA) connected to an RFID chip, a flexible circuit (FC) may be used for inductive coupling and harvesting energy. Such flexible circuit (FC) may have a patch antenna (PA) (aka a sense coil (SeC)) to pick-up the surface currents around the area of the slit (S) or notch (N) and opening, conduct such current flows to a coupling loop structure (CLS) having a frame, circular, spiral or helix shape antenna structure (AS) on the flexible circuit (FC) which collects and distributes current flows and inductively couples with the module antenna (MA) of the transponder chip module (TCM) by means of the patch antenna (PA). The flexible circuit (FC) may be replaced by a rigid circuit (RC). For the purpose of clarity, a transponder chip module (with contact pads) may be replaced or interchanged by an RFID chip module (having no contact pads) for application in high and ultra-high frequency proximity cards.

The flexible circuit (FC) with a patch antenna (PA) or sense coil (SeC) to pick-up the surface currents around the area of a slit (S) or notch(es) (N) and an opening may be connected directly to the RFID chip without the need for a module antenna. In other words, the connection pads or terminal ends on the RFID chip are physically connected to the coupling loop structure (CLS) with an antenna structure (AS).

A Coil on Chip (CoC) device may also find application in HF and UHF proximity cards.

A contactless metal clamshell card, metal layered card or solid metal card adhering to the physical dimensions of ISO/IEC 7810 ID-1 format to serve as a proximity card (or "prox" card) in the application of identification, access control or payment may be prepared with a slot or aperture punched or laser-cut through the metal layer or layers. The slot through the metal layer(s) of the ISO card body format may have the dual purpose of allowing for electromagnetic reception and transmission to and from an embedded RFID chip module (without contact pads) or Coil on Chip (CoC) device interfacing with a coupling loop structure (CLS) sandwiched between the metal layers, and for attachment to a lanyard. The metal layers may have a slit which starts at a perimeter edge of the metal card body and terminates in the lanyard slot.

The lanyard slot or opening in the metal layer or layers may be prepared with an insulating insert or snap mechanism made of plastic, glass or wood to allow for an enlargement of the opening in the metal layer or layers, and or to protect any circuitry exposed in the opening area.

An RFID chip module with a module antenna (MA), a flexible circuit (FC) with patch antenna (PA) and a coupling loop structure (CLS) with antenna structure (AS), or a flexible circuit (FC) with an antenna structure (AS) connected to an RFID chip may reside under said insulating medium and simultaneously be adjacent or overlapping the metal layer or layers, slit and opening.

A slit (S) passing entirely through a metal layer or layers may extend from a perimeter edge of the metal card body (MCB) to a distance close to the lanyard slot or terminate in the lanyard slot.

A single metal layer may be folded on itself to form the metal card body (MCB) in ID-1 format. The metal layer or layers (ML) may be stamped and prepared with perforations for bending at one edge or two edges to form the metal card body (MCB). The metal layer or layers (ML) may have indents or pouches to accept an electronic component such as an RFID chip module. In addition, the metal layer or layers (ML) may have a slit (S) and when folded, the slit follows the direction of the fold at the edge of the metal card body. Ferrite may be used for shielding or for forming an inductive barrier between metal layers having current flows of opposite direction. The slit (s) along the edge of a metal card body (MCB) may terminate in an opening or window which may have a particular form and shape.

The metal layers of the card body may be hermetically sealed using an adhesive or the metal layers may be riveted together. The metal layers may be joined together using a ratchet mechanism or the metal layers may be welded together. In particular the metal layers may be joined together at one edge of the metal card body to avoid folding of a single metal layer.

The metal layers may be a combination of different metals such as Titanium, Stainless Steel or an Alloy, layered together, to regulate the weight of the proximity card. The metal layers of different material may be fused together to produce a composite structure.

The metal layers may be separated and fused together by a non-conducting oxide layer, a ceramic layer or a dielectric layer.

The joining and the electrical connection of the metal layers by means of spot welding or riveting may be used to direct the surface currents along the perimeter edges and within the metal card body (MCB). Such electrical connection points between metal layers to divert the surface currents to concentrate around an RFID chip module may be achieved with one or multiple connection points.

A slit in a metal layer or layers is replaced by the separation distance or gap between the metal layers. An RFID chip module may be embedded between said metal layers with the concentration density of current being manipulated by the electrical connection point(s) between the metal layers.

In a further embodiment of the invention, an RFID chip module or a flexible circuit with an antenna structure (AS) connected to an RFID chip is assembled between the metal layers adjacent, overlapping or surrounding the aforementioned electrical connection point(s). The RFID chip module or flexible circuit with an antenna structure (AS) connected to an RFID chip may further be disposed in an opening or window. The antenna structure on the flexible circuit (FC) may have a frame, circular, spiral or helix shape antenna formed around said opening or window to pick-up surface currents at or around the electrical connection point(s) between the metal layers. The physical joining of the metal layers to create an electrical connection point between the metal layers may be performed by means of laser welding, riveting or soldering. A recess or pouch in a metal layer or in both metal layers may be formed to house the RFID chip module or flexible circuit. The metal card body may be disposed with a slot to accept a lanyard while at the same time the aperture in the metal card body enhances the RF performance of the RFID chip module assembled adjacent or overlapping said slot or aperture. The slot or aperture passing through the entirety of the metal card body may be further disposed with a slit extending inward to an area around the electrical connection point(s). The RFID chip module disposed with a module antenna having a spiral, circular, frame or helix shape antenna may be assembled to be adjacent or overlapping the inward extending slit and/or slot. A variation in the construction of the proximity card or smartcard may support a slit extending from a perimeter edge on each metal layer to the lanyard slot to further enhance RF performance.

The slit may have a typographic form such as the contour of a signature. The sides of the proximity card may have indents or notches for handling.

Proximity cards or smartcards may comprise a metal layer or layers initially having approximately twice the dimensions of a standard ID-1 smartcard having a slit in the middle of the oversized metal layer which extends from a perimeter edge to a shaped opening or window in the metal. By folding the metal layer in the middle, aligning exactly with the slit, a proximity card having ID-1 dimensions which is ISO compliant may be formed. The ID-1 proximity card may further comprise of an antenna structure (AS) on a flexible or rigid circuit sandwiched between the folded metal layer with slit having an isolation gap between the folded metal layer on three sides of the metal card body, and on the fourth side having a folded metal edge with a slit extending to a shaped opening or window. The shaped opening or window may commence at the folded metal edge and extend from the metal edge to both faces (front and rear sides) of the metal card body with the shape of the opening or window at the edge resembling a thumb or curved form and the shaped opening or window partially revealing the antenna structure on the flexible or rigid circuit. The antenna structure (AS) or tracks may be routed on both sides of the exposed flexible or rigid circuit with its end portions connected directly to an RFID chip or via inductive coupling to an RFID chip module having a module antenna.

A sensor or light may be integrated into the antenna structure (AS), and the antenna structure (AS) may be protected by a transparent, translucent or opaque material. The geometry of the antenna structure (AS) may resemble a flat helix antenna design. The metal layers may be electrically connected to the doubled sided antenna structure. For the purpose of clarity, the folding of the metal layer may be at any of the four sides of the metal card body (MCB), the slit or slits may commence at any perimeter edge of the four sides, and the opening or openings in the metal layer (ML) to which the slit or slits transcend may commence at a card body edge and extend to a front face or an rear face of the metal card body (MCB).

In summary, proximity cards or smartcards can be manufactured from a metal layer or layers having approximately twice the dimensions of a standard ID-1 smartcard comprising of (i) a slit in the middle of the oversized metal layer which extends from a perimeter edge to a shaped opening or window and (ii) folding the metal layer in the middle to align exactly with the slit to form a proximity card having ID-1 dimensions which is ISO compliant; (iii) said ID-1 proximity card having an antenna structure (AS) on a flexible or rigid circuit sandwiched between the folded metal layer with slit (S) having an isolation gap between the folded metal layer on three sides of the metal card body (MCB), and on the fourth side having a folded metal edge with a slit extending to a shaped opening or window; (iv) said shaped opening or window commencing at the folded metal edge and extending from the edge to both faces (front and rear sides) of the metal card body with the shape of the opening or window at the edge resembling a thumb or curved form and the shaped opening or window partially revealing the antenna structure (AS) on the flexible or rigid circuit; and (V) said antenna structure (AS) or tracks routed on both sides of the exposed flexible or rigid circuit with its end portions connected directly to an RFID chip or via inductive coupling to an RFID chip module having a module antenna (MA). A sensor or light may be integrated into the antenna structure (AS), and the antenna structure (AS) may be protected by a transparent material. The geometry of the antenna structure (AS) may resemble a flat helix antenna design.

Title: RFID Enabled Metal Transaction Cards

This disclosure relates to improvements in RFID enabled transaction cards and removal of the discontinuity and continue to function as a coupling frame.

(E112)

Inventor(s): Finn

Ser. No. 62/960,178

Filing Date: 13 Jan. 2020

This application provides techniques for improving (i) coupling of an RFID enabled metal transaction card with a contactless reader; (ii) mechanical stability of the transaction card; (iii) the drop acoustics of the metal transaction card to retain the metal sound integrity; and the integration of electronic components therein.

The slit in a metal transaction card does not need to extend from a perimeter edge to a module opening resulting in a mechanical destabilization of the metal card body, and in some instances a slit is not required for contactless communication.

A discontinuous metal frame (DMF) or compensating loop (CL) is mounted to a perimeter edge of a metal card body camouflaging an underlying slit or slits in the metal card body (MCB), providing mechanical support around the card insertion area, and enhancing the decorative design of the card. The metal material for the DMF or CL may differ to the metal used in the card body, and the metal of the DMF or CL may be coated to provide electrical insulation. The discontinuous metal frame or compensating loop may be electrically isolated from the metal card body.

The discontinuous metal frame or compensating loop fits snuggly onto a stepped lip around the rim of the metal card body. The width of the lip may be approximately 8.5 mm with a depth of 300 µm. In other words, the discontinuous metal frame (DMF) or compensating loop (CL) fits onto the metal card body (MCB), with the metal card body being flush with, protruding over, or countersunk below the DMF or CL.

It also provides techniques for improving coupling between different components of a metal transaction card, such as between an antenna probe (AP) integrated within the area of a slit (S) or gap (G) in a coupling frame (CF) for the purpose of collecting surface currents to power an electronic component such as a fingerprint sensor or a dynamic display.

Further objects may include relaxing performance constraints on the coupling frame (CF) of a metal transaction card, including the possibility of eliminating the slit (S) altogether, especially in a transaction card comprising a metal substrate and a non-conductive substrate. The module antenna (MA) of the transponder chip module (TCM) may overlap the interface of the two materials, namely at the junction between the conductive and non-conductive materials to pick-up the surface currents. Alternatively, a sense coil (SeC) on a flexible circuit (FC) may overlap the interface between the conductive and non-conductive materials for inductive coupling and to redirect the surface currents for purpose of driving an electronic component.

Multiple slits (S) or gaps (G) at different locations in a metal card body (MCB) may be coupled to multiple sense coils (SeC) to individually drive multiple components. Notably, the slit (S) or gap (G) may not need to extend to the module opening (MO) in order to operate as a coupling frame (CF).

The application is also directed to metal transaction cards produced from metal inlays in sheet format or from an endless web of metal. The combination of laser cutting and CNC milling can be optimized to maximize the production throughput of RFID enabled metal transaction cards.

FIG. 3 of 62/960,178 is a diagrammatic view of a front surface of a metal transaction card having a discontinuous metal frame (DMF) with a slit (S) assembled around the perimeter edge of a metal card body (MCB).

FIG. 3 is a diagrammatic view of a front surface of a metal transaction card having a discontinuous metal frame (DMF) with a slit (S) assembled around the perimeter edge of a metal card body (MCB). The discontinuous metal frame (DMF) conceals a slit in the metal card body (MCB) which begins at a perimeter edge and extends to a module opening (MO) or an area close to the module opening (MO). The metal frame with slit may be approximately 8.5 mm in width and have a thickness of 300 µm. The metal frame may be made of any suitable metal and may be coated with an insulating medium, such as a diamond like carbon coating. The discontinuous metal frame (DMF) is electrically isolated from the metal card body (MCB).

FIG. 4 of 62/960,178 is a perspective view (exploded) of a metal transaction card comprising a solid metal card body (MCB) with a discontinuous metal frame (DMF).

FIG. 4 is a perspective view (exploded) of a metal transaction card comprising a solid metal card body (MCB) with a discontinuous metal frame (DMF) with a slit (S). A cavity or module opening is shown to accept an 8-pin transponder chip module (11.8 mm×13.00 mm) with its mold mass extending into the metal card body (MCB) having a recess or opening to match the dimensions of the mold mass (7 mm×7 mm). The metal card body (MCB) has a ledge (~460 µm) around its perimeter edge to support the discontinuous metal frame (DMF) with a thickness of 300 µm and a width of approximately 8.5 mm. Therefore, the front surface of the metal card body (MCB) may be flush with the discontinuous metal frame (DMF) or may protrude over the discontinuous metal frame (DMF), or sink below the discontinuous metal frame (DMF).

The metal card body (MCB) may also have ceramic inserts for aesthetic purposes or for electrical separation of the metals. The ceramic material may be alumina oxide (Al2O3), zirconia oxide (ZrO2), silicon carbide (SiC) or silicon nitride (Si3N4).

In summary, an RFID enabled metal transaction card comprising (i) a transponder chip module (TCM) having a RF payment chip (IC) and a module antenna (MA), (ii) a coupling frame (CF) in the form of a metal card body (MCB) having an electrical discontinuity comprising a slit (S) and (iii) a discontinuous metal frame (DMF) assembled to the metal card body (MCB). The discontinuous metal frame (DMF) is electrically isolated from the metal card body (MCB) and may be coated with an insulating medium. The DMF camouflages the slit in the metal card body and mechanically stabilizes the structure of the card body, especially during insertion in an automatic teller machine (ATM) or point of sale (POS) terminal.

The metal ledge (ML) in the module opening (MO) of the coupling frame (CF) or metal card body (MCB) may overlap the antenna tracks of the module antenna (MA) of the transponder chip module (TCM).

Techniques for improving coupling between different components of a metal transaction card are provided, such as between an antenna probe (AP) integrated within the area of a slit (S) or gap (G) in a coupling frame (CF) for the purpose of collecting surface currents to power an electronic component such as a fingerprint sensor or a dynamic display.

Relaxing performance constraints on the coupling frame (CF) of a metal transaction card are discussed, including the possibility of eliminating the slit (S) altogether, especially in a transaction card comprising a metal substrate and a non-conductive substrate. The module antenna of a transponder chip module may overlap the interface of the two materials, namely at the junction between the conductive and non-conductive materials to pick-up the surface currents.

Multiple slits (S) or gaps (G) at different locations in a metal card body can be coupled to multiple sense coils to individually drive multiple components. Notably, the slit (S) or gap (G) may not need to extend to the module opening (MO) in order to operate as a coupling frame (CF).

Instant Issuance of Embedded Metal Cards

A pre-laminated metal inlay with array of card body sites, comprising a metal core (single or dual layer metal inlay) having an appropriate thickness with a synthetic layer laminated to each side (front and rear side of the metal inlay) to increase the overall thickness of the sandwich to be ISO conform or slightly below ISO card thickness for further processing in an instant issuance machine/kiosk. The front and rear synthetic layers may be white or transparent. The rear layer may comprise a signature panel and a magnetic stripe.

In a final manufacturing step, the pre-laminated metal inlay may be reduced to card bodies for processing of single embedded metal cards in an instant bank card issuance machine. The machine may print graphics to the reverse side of the film to be laminated to a single card body. The film or overlay may be laser engravable. A hologram foil may be hot-stamped to the card body.

Title: Metal Inlays to Produce Dual Interface Metal Core Smartcards

This disclosure relates to dual interface embedded metal transaction cards (aka metal core) for processing in instant issuance machines, describing the card features in terms of their stack-up construction and mechanical characteristics.

(E101)
Inventor(s): Finn
Ser. No. 62/885,327
Filing Date: 12 Aug. 2019
(E101v2)
Inventor(s): Finn
Ser. No. 62/979,422
Filing Date: 21 Feb. 2020
(E111)
Inventor(s): Finn
Ser. No. 62/912,701
Filing Date: 9 Oct. 2019
(E104v2)
Inventor(s): Finn
Ser. No. 62/986,612
Filing Date: 6 Mar. 2020

Instant Issuance of Embedded Metal Cards

The processing operation(s) performed on standard plastic cards by known instant issuance card processing equipment includes one or more of printing, laminating, magnetic stripe encoding, applying holographic foil patches, programming of a chip embedded in the card, card flipping or duplexing, and the like.

A plastic card is printed on by transferring an adhesive to a surface of the plastic card from a thermal transfer ribbon using a thermal print-head. The technique permits the addition of high value features, such as three-dimensional features, matte finishes, metallic or metallic appearing features, optical structures, and the like, to the surfaces of plastic cards. Other printing techniques include DOD inkjet printing.

It is an object of the current disclosure to take blank metal transaction card bodies with an embedded chip module for processing in an instant bank card issuance machine. The metal card bodies (ID-1 format) fed into the issuance machines may have a thickness which is ISO compliant (7810) or very slightly thinner than the mean value of 0.76 mm. The machine may print graphics to the reverse side of a transfer film to be laminated to a single metal card body. The film or overlay may be laser engravable.

The blank metal transaction cards may further comprise of a QR code or barcode for authentication, an edge to edge non-magnetic high tensile strength stainless steel layer with some degree of flexibility and a laser reactive layer on which information and data can be printed and inscribed to its reverse side. Card owner credentials may also be printed on an adhesive layer, protected by an overlay layer.

A holographic patch may be used to camouflage the presence of a slit in a metal face transaction card. The metal surface may be laser engraved followed by the application of a hard coat layer.

A typical representation of a blank metal transaction card may have the following stack-up construction:

| | |
|---|---|
| Front Transparent, Translucent, White or Colored PVC | 0.0076 inches |
| Adhesive layer | 0.0025 inches |
| 301 Stainless Steel 10 mil Metal Core | 0.0100 inches |
| Adhesive layer | 0.0025 inches |
| Transparent, Translucent, White or Colored PVC | 0.0050 inches |
| Rear Laser reactive layer with magnetic stripe | 0.0035 inches |
| Pre-lamination thickness: | 0.0325 inches |

Post Lamination Thickness: 0.0295 inches (750 μm), with the card body weighing approximately 13 grams. The adhesive layer can be significantly reduced to approximately 25 μm, while at the same time increasing the thickness of the plastic layers or the core metal layer.

The metal card body may be flexible so that it can be processed in an instant issuance machine.

An alternative build may be as follows:

| | |
|---|---|
| Transparent/Clear, Translucent, White or Colored PVC/PC/PETG | 0.0060 inches |
| Adhesive layer | 0.0025 inches |
| 301 Stainless Steel 10 mil Metal Core | 0.0100 inches |
| Adhesive layer | 0.0025 inches |
| Transparent/Clear, Translucent, White or Colored PVC/PC/PETG | 0.0050 inches |
| Laser reactive layer (overlay with adhesive backing)/Mag Stripe | 0.0035 inches |
| Pre-lamination thickness: | 0.0295 inches |
| Post Lamination Thickness: 0.0272 inches (690 μm) | |

Instant Issuance Card with Transfer Film

The blank metal transaction card may have a thickness within the ISO limits prior to insertion in a card issuance machine which applies a dry coating retransfer film to the front or rear card body. The thickness of the film may be 8 to 10 μm. The card body may not be rigid, but rather have a certain degree of flexibility to move smoothly from the input stage, through the machine, to the output stage.

In summary, blank dual interface metal containing transaction cards may be processed in instant issuance machines or printers. The transaction cards may have a certain degree of flexibility rather than been rigid, and the thickness of the card bodies may be within the ISO specification after the application of a dry coated retransfer film with a thickness of 8 microns. The metal layer or slug may be laser scribed with a payment scheme logo or name, with the laser cut passing through the entirety of the metal layer. The plastic layers sandwiching the metal core (metal layer or slug) may be white or transparent. The weight of the card being determined by the thickness and size of the metal layer or slug, being selected to retain flexibility. Windows in a plastic layer may be used to show the metallic effect. The surface of the cards may be coated to avoid static and for easy transport from the hopper to the card transport system.

Title: "Metallic Smart Cards"

This disclosure relates to dual interface metal transaction cards comprising of two metal layers with at least one slit in each metal layer separated by an adhesively coated dielectric and laminated to synthetic layers to form a metal face transaction card with the objective that the drop acoustics of the metal transaction card sound like metal and not plastic. Retention of the metal sound requires careful selection of the adhesive system and the dielectric (carrier); the thickness of the adhesive layers and the carrier; the melt temperature of the adhesive; the crosslinking processing stage of the adhesive; the choice of each metal layer and their thickness; the choice and thickness of the synthetic layers and the lamination cycle or cycles and its or their respective lamination parameters (pressure, temperature and dwell time). The choice of the adhesive system and the carrier also impacts the ageing of the milling tools used to reduce an inlay of a given format to individual card bodies, in chamfering the card body edges at an angle, and forming a pocket in each card body for later insertion of a dual interface chip module.

(E114v2)

Inventor(s): Finn

Ser. No. 63/031,571

Filing Date: 29 May 2020

It is an objective to produce metal acoustic multilayered transaction cards, minimizing the sound absorption caused by the synthetic and bonding layers, to retain the metal sound integrity, achieved by careful selection of the adhesive system and insulating dielectric used in the assembly of the interlayers.

It is a further objective to produce metal transaction cards by laminating metal-to-metal and metal-to-plastic under temperature, pressure and time using an adhesive system that does not reactivate in a later process step when temperature is applied to the laminated structure. In CNC machining the laminated structure to extract individual card bodies, also referred to as singulation, the thermal influence from the milling process should not cause the adhesive to melt at the edges of the cut. If the adhesive is soft and tacky, it will impair the cutting process and reduce the lifetime of the milling tools.

Therefore, it is imperative that the adhesive system is delivered as a partially cured epoxy or B-staged epoxy adhesive that converts to the C-stage during the lamination process by applying temperature and pressure. This C-stage state should be the final reaction stage of the thermosetting resin where the epoxy is mostly insoluble and infusible.

The dielectric layer may be constructed from a 25 μm Polyethylene Naphthalate (PEN) film coated on both sides with a 25 μm coating of an epoxy based thermosetting adhesive system.

The adhesive system may be a modified epoxy polyester adhesive with a melt point of approx. 105±1° C. (220±30° F.), matching the unique properties of the synthetic layers. Alternatively, an epoxy-resin adhesive system may be selected with an operating temperature of 150-170° C. for prelamination of the metal layers (pressure of ≥50 N/cm$^2$/ ≥73 psi for 40 min.), prior to laminating to the synthetic layers.

To support a single metal layer with a slit in a card body construction, the underlying layers may include a layer of fiberglass, carbon fiber or a rigid textile. To strengthen two metal layers with opposing slits, the dielectric between the metal layers may also be made from a fiber (e.g. glass or carbon) or any suitable composite material.

Different metal layers with different acoustic properties may be used in the card construction, such as the combination of titanium and stainless steel.

(E114)
Inventor(s): Finn
Ser. No. 63/014,142
Filing Date: 23 Apr. 2020
Metallic Acoustic Sound of a Metal Face or Hybrid Transaction Card It is an objective that the metal card body retains its metallic acoustic sound when tossed on a hard surface, by careful selection of the adhesive system and dielectric between metal layers, the type of metal used in the card construction, and any panel or insert for fitting into the metal card body. A metal card with a dielectric or an adhesive layer between metal layers renders the drop acoustics of the card to sound like plastic rather than metal, because of the dampening effect of the insulating medium between the metal layers.

Different metal layers may be used in the card construction, such as the combination of different metals such as titanium and stainless steel. Other metals, such as brass may also be chosen.

The dielectric carrier layer may be constructed from a 25 μm Polyethylene Naphthalate (PEN) film coated on both sides with a 25 μm coating of an epoxy based thermosetting adhesive system.

The adhesive system plays an important role in maintaining the drop acoustics of the metal card. A hard setting epoxy on a dielectric carrier layer such as PEN, PET or PC has the advantage that after laminating the metal layers (25-up format) together, the epoxy does not re-melt and become tacky from the heat generation caused by the CNC milling (singulation process) in reducing the 25-up laminated metal inlay to individual card bodies.

The stack-up construction of a "Metal Face" transaction card having a front metal surface with a flat and solid color may have the following dimensions, and to maintain the metal sound integrity the traditional dielectric of a PET film is replaced by a PEN film with a front and rear adhesive coating, in addition two different metal substrates may be used, namely Titanium and Stainless Steel.

The metal cards can be digitally printed using UV inks and protected by a UV hard coat as proposed below. Or the metal layer can be screen printed with a primer and ink, protected by a lacquer, enamel or resin, and baked at elevated temperature.

A logo of a payment scheme and or an issuing bank may be mechanically engraved into the ink-baked metal layer having a flat color, and in a subsequent production process, a UV hard coat layer (aka diamond coat) on a release layer may be laminated to the mechanically engraved metal layer to protect its surface.

The hard coat layer is characterized by significant UV absorption. The clear or colored UV hard coat layer may also be sprayed on, mist-coated, or screen printed to the metal surface.

The slit in each metal layer can be filled with a UV curing epoxy or a two-component adhesive, dispensed as a microfluidic droplet for in situ bonding of the slit under pressure and vacuum control.

| | |
|---|---|
| UV HARD COAT | UV Diamond coat with low activation temperature on a release carrier layer, the thickness of the UV Diamond Coat is 2-3 μm |
| ARTWORK | Ink: 0.5-0.6 mils, digitally printed flexible ink Primer: 0.3-0.4 mils, digitally printed primer |
| METAL | Metal Inlay (2 metal layers of 6 mils and 10 mils, each metal layer having a slit with a specific design, with the metal layers separated by a 75 μm adhesively coated PEN dielectric) 19 mils One layer of Metal is Stainless Steel, while the other layer may be Titanium |
| ADHESIVE | PEN with an adhesive layer on both sides 3 mils |
| CLEAR PVC | Transparent PVC, digitally printed (note Indigo (corona) treated material on top helps with the adhesion to the PEN) 6 mils |
| PRINTED INFO | Ink: 0.6 mils Primer: 0.3-0.4 mils |
| CLEAR PVC + BLACK SILVER MAGNETIC STRIPE | Overlay with magnetic stripe 2.5 mils |
| ELEMENTS (not shown) | Signature panel and hologram |
| Total thickness: | 32.5 mils (826 μm) Pre-lamination |

FIG. 6 of 63/014,142 is a cross-sectional view (exploded, and partially perspective) of a "Metal Face" transaction card showing a stacking of layers for a transaction card construction. The two metal layers are separated by a double-sided adhesively coated dielectric carrier layer. An inductive coupling chip module for inserting in openings (module opening) in the layers of the transaction card is shown.

FIG. 7 of 63/014,142 is a cross-sectional view (exploded, and partially perspective) of a "Metal Face" transaction card showing a stacking of layers for a transaction card construction. The two metal layers are separated by three layers, comprising of a first thermosetting adhesive layer, a dielectric layer, and a second thermosetting adhesive layer. An inductive coupling chip module for insertion or implanting into the module opening in the layers of the transaction card is shown.

The metal layers may be pre-laminated together with the first thermosetting adhesive layer, the dielectric carrier layer as an insulation separation layer, and the second thermosetting adhesive layer.

The adhesive structure on both sides of the PEN carrier may be delivered after the B-stage process, and the adhesive layers may be reactivated in the lamination press process to achieve a non-reversible C-stage in which the adhesive does not melt, flow or become sticky.

A laminate as illustrated in FIG. 6 may be constructed from 25 μm Polyethylene Naphthalate (PEN) coated on both sides with a 25 μm coating of an epoxy based adhesive system, with a press lamination temperature of 170° C. for 30 minutes at a pressure of 10.5 kg/cm² (150 psi). As the operating temperature of the laminate is higher than the permissible processing temperature of the synthetic layers (e.g. PVC), the metal layers may be prelaminated first, before final lamination with the synthetic layers.

It is also feasible to use laminates based on 25 µm (1 mil) Polyethylene Naphthalate (PEN) film coated with low flow modified epoxy polyester adhesive, double sided, with a melt point of 105° C.±1° C. The shelf life of the laminate is typically 6 months, however, the adhesive will continue to cure at ambient temperature and raise the melt point as it continues to cross link. This can be slowed (or basically stopped) by storing in a freezer.

The thickness of the epoxy layer(s) and the thickness of the carrier layer play an important role in maintaining the metallic sound of a metal containing transaction card. The melt temperature of the thermosetting epoxy should match the glass transition temperature of the synthetic layers which are laminated to the metal layer or layers.

In summary, to maintain the metal sound of a metal containing transaction card with two metal layers adhesively attached to each other, a dielectric carrier layer may be used with a special thermosetting adhesive system.

The thermosetting resin and the choice of dielectric have an impact on the drop acoustics of a metal transaction card and on the life of the milling tools used to produce metal card bodies.

Before laminating metal layers in a card stack-up construction using an adhesive system (double-sided coated dielectric film) to bond the metal layers together, the adhesive system comprises of an uncured thermosetting epoxy resin in which the material softens when heated in the lamination press. The adhesive system before the lamination process is in an intermediate stage (B-stage) in the reaction of the thermosetting epoxy resin. After lamination, the characteristics of the final cured resin in the C-stage exhibits high thermal properties and does not soften under the influence of heat during the CNC milling process.

The dielectric layer may be constructed from a 25 µm Polyethylene Naphthalate (PEN) film coated on both sides with a 25 µm coating of an epoxy based thermosetting adhesive system.

The dielectric may also be made from a fiber (e.g. glass or carbon) or any suitable composite material.

Different metal layers with different acoustic properties may be used in the card construction, such as the combination of titanium and stainless steel.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A metal containing transaction card comprising:
    a transponder chip module having a front face and a rear face, comprising:
    a contact pad arrangement disposed on the front face of the module;
    an RFID chip with a planar antenna having multiple windings and conductive traces disposed on the rear face of the module; and
    a coupling frame;
    wherein the coupling frame comprises:
    a metal layer or metal card body having a periphery;
    an opening in the metal layer for receiving a mold mass or chip encapsulation of the transponder chip module; and
    a slit extending through the metal layer or metal card body from the periphery of the metal layer or metal card body in the direction of the opening;
    wherein at least a portion of the slit overlaps at least a portion of the windings of the planar antenna and a portion of the connection bridge and plating line.

2. The metal containing transaction card of claim 1, wherein:
    the slit does not extend to the opening.

3. The metal containing transaction card of claim 1, wherein:
    the slit follows a contour of the module antenna.

4. The metal containing transaction card of claim 1, further comprising:
    a connection bridge disposed on the front face of the module.

5. The metal containing transaction card of claim 1, wherein:
    the slit is representative of any electrical discontinuity extending through the metal layer or metal card body.

6. The metal containing transaction card of claim 1, wherein:
    the coupling frame extends over substantially the entire area of the metal containing transaction card.

7. The metal containing transaction card of claim 1, wherein:
    the periphery of the metal layer or metal card body comprises an outer edge of the metal layer or metal card body; and
    the opening of the metal layer or metal card body comprises an inner edge of the metal layer or metal card body.

8. The metal containing transaction card of claim 1, wherein:
    the slit does not extend to the area for receiving the mold mass or chip encapsulation of the transponder chip module.

9. The metal containing transaction card of claim 1, wherein:
    the slit follows a contour of the planar antenna.

10. The metal containing transaction card of claim 1, further comprising:
    a connection bridge disposed on the front face of the module.

11. The metal containing transaction card of claim 1, wherein:
    the slit is representative of any electrical discontinuity extending through the metal layer or metal card body.

12. The metal containing transaction card of claim 1, wherein:
    the coupling frame extends over substantially the entire area of the metal containing transaction card.

13. The metal containing transaction card of claim 1, wherein:
    the slit does not extend to the opening.

14. The metal containing transaction card of claim 1, wherein:
    the slit follows a contour of the module antenna.

15. The metal containing transaction card of claim 1, further comprising:
    a connection bridge disposed on the front face of the module.

16. The metal containing transaction card of claim 1, wherein:
the slit is representative of any electrical discontinuity extending through the metal layer or metal card body.

17. The metal containing transaction card of claim 1, wherein:
the coupling frame extends over substantially the entire area of the metal containing transaction card.

18. The metal containing transaction card of claim 1, wherein:
the periphery of the metal layer or metal card body comprises an outer edge of the metal layer or metal card body; and
the opening of the metal layer or metal card body comprises an inner edge of the metal layer or metal card body.

19. A metal containing transaction card comprising:
a transponder chip module having a front face and a rear face, comprising:
a contact pad arrangement disposed on the front face of the module;
an RFID chip with a planar antenna having multiple windings and conductive traces disposed on the rear face of the module; and
a coupling frame;
wherein the coupling frame comprises:
a metal layer or metal card body having a periphery;
an area without an opening for receiving a mold mass or chip encapsulation of the transponder chip module; and
a slit extending through the metal layer or metal card body from the periphery in the direction of the area for receiving the mold mass or chip encapsulation of the transponder chip module;
wherein at least a portion of the slit overlaps at least a portion of the windings of the planar antenna.

20. A metal containing transaction card comprising:
a transponder chip module having a front face and a rear face, comprising:
a contact pad arrangement disposed on the front face of the module;
an RFID chip with a planar antenna having multiple windings and conductive traces disposed on the rear face of the module; and
a coupling frame;
wherein the coupling frame comprises:
a metal layer or metal card body having a periphery;
an opening for receiving a mold mass or chip encapsulation of the transponder chip module; and
a slit extending through the metal layer or metal card body from the periphery to an area underlying the module antenna;
wherein the slit enters the area underlying the module antenna and follows the path of its windings without entering the module opening and at least a portion of the slit overlaps at least a portion of the module antenna.

* * * * *